US012383874B2

(12) United States Patent
Willey et al.

(10) Patent No.: US 12,383,874 B2
(45) Date of Patent: Aug. 12, 2025

(54) EXHAUST AFTERTREATMENT ASSEMBLY WITH A MIXER HAVING A MIXING PLATE THAT IS CRESCENT SHAPED

(71) Applicant: Cummins Emission Solutions Inc., Columbus, IN (US)

(72) Inventors: Donald Edward Willey, Huddersfield (GB); Ryan Aaron Petersen, Greenwood, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 18/909,471

(22) Filed: Oct. 8, 2024

(65) Prior Publication Data

US 2025/0135414 A1 May 1, 2025

Related U.S. Application Data

(60) Provisional application No. 63/545,845, filed on Oct. 26, 2023.

(51) Int. Cl.
*B01F 25/431* (2022.01)

(52) U.S. Cl.
CPC ........ *B01F 25/4316* (2022.01); *B01F 25/431* (2022.01); *B01F 25/4315* (2022.01); *B01F 25/431971* (2022.01); *B01F 25/43151* (2022.01); *B01F 25/43161* (2022.01); *F01N 2240/20* (2013.01)

(58) Field of Classification Search
CPC ................ B01F 25/431; B01F 25/4315; B01F 25/43151; B01F 25/4316; B01F 25/43161; B01F 25/431971; F01N 2240/20
USPC .................................. 60/324; 366/337, 340
See application file for complete search history.

(56) References Cited

U.S. PATENT DOCUMENTS

| | | | |
|---|---|---|---|
| 9,341,097 | B2 | 5/2016 | Bays et al. |
| 10,697,342 | B2 | 6/2020 | Abhyankar et al. |
| 2009/0019843 | A1 | 1/2009 | Levin et al. |

(Continued)

OTHER PUBLICATIONS

Kanaris et al., "Design of a Novel μ-Mixer," Fluids 2018, 3(1), 10 (published Jan. 28, 2018) (available at https://doi.org/10.3390/fluids3010010) (last accessed Oct. 8, 2024).

(Continued)

*Primary Examiner* — Jorge L Leon, Jr.
(74) *Attorney, Agent, or Firm* — Foley & Lardner LLP

(57) ABSTRACT

An exhaust aftertreatment assembly includes a tubular conduit and a mixer. The tubular conduit has a central axis. The mixer is disposed in the tubular conduit. The mixer includes a first mixing plate and a second mixing plate. The first mixing plate is crescent shaped. The first mixing plate includes a first plate convex edge and a first plate concave edge. The first plate convex edge is attached to the tubular conduit. The first plate concave edge intersects the first plate convex edge at a first plate first point and a first plate second point. The second mixing plate is crescent shaped. The second mixing plate includes a second plate convex edge and a second plate concave edge. The second plate convex edge is attached to the tubular conduit. The second plate concave edge intersects the second plate convex edge.

16 Claims, 56 Drawing Sheets

(56) References Cited

U.S. PATENT DOCUMENTS

2011/0305103 A1* 12/2011 McGuire ........... B01F 25/43161
366/337
2013/0333363 A1* 12/2013 Joshi .................. B01F 25/3141
60/324
2023/0008192 A1 1/2023 Kinnunen et al.

OTHER PUBLICATIONS

Maus, P. "Area of Crescent Calculator" ("last updated May 15, 2024") (available at: https://www.omnicalculator.com/math/crescent-area. (last accessed Oct. 8, 2024).

Weisstein, Eric W. "Lune." From Mathworld—A Wolfram Web Resource ("last updated Oct. 1, 2024") (available at https://mathworld.wolfram.com/Lune html) (last accessed Oct. 8, 2024).

* cited by examiner

EXHAUST AFTERTREATMENT ASSEMBLY WITH A MIXER HAVING A MIXING PLATE THAT IS CRESCENT SHAPED

CROSS-REFERENCE TO RELATED PATENT APPLICATIONS

The present application claims the benefit of and priority to U.S. Provisional Patent Application No. 63/545,845, filed on Oct. 26, 2023, which is incorporated herein by reference in its entirety.

TECHNICAL FIELD

The present disclosure relates generally to mixers for exhaust aftertreatment systems for an internal combustion engine.

BACKGROUND

The exhaust of internal combustion engines, such as diesel engines, includes nitrogen oxide (NOx) compounds. It is desirable to reduce NOx emissions to comply with environmental regulations, for example. To reduce NOx emissions, a treatment fluid may be dosed into the exhaust by a doser assembly within an aftertreatment system. The treatment fluid facilitates conversion of a portion of the exhaust into non-NOx emissions, such as nitrogen ($N_2$), carbon dioxide ($CO_2$), and water ($H_2O$), thereby reducing NOx emissions. These aftertreatment systems may include a mixer that facilitates mixing of the treatment fluid and the exhaust. Increased mixing of the treatment fluid and the exhaust may lead to more efficient conversion of NOx to non-NOx emissions. Mixers can take various forms, each of which has benefits and consequences to operation of an engine system. For example, mixers may increase backpressure on an engine, which may decrease power and/or efficiency of an engine system.

SUMMARY

In one embodiment, an exhaust aftertreatment assembly includes a tubular conduit and a mixer. The tubular conduit has a central axis. The mixer is disposed in the tubular conduit. The mixer includes a first mixing plate and a second mixing plate. The first mixing plate is crescent shaped. The first mixing plate includes a first plate convex edge and a first plate concave edge. The first plate convex edge is attached to the tubular conduit. The first plate concave edge intersects the first plate convex edge at a first plate first point and a first plate second point. The second mixing plate is crescent shaped. The second mixing plate includes a second plate convex edge and a second plate concave edge. The second plate convex edge is attached to the tubular conduit. The second plate concave edge intersects the second plate convex edge at a second plate first point and a second plate second point. A plane in which the first mixing plate extends and a plane in which the second mixing plate extends are oblique to the central axis of the tubular conduit. The plane in which the first mixing plate extends intersects the plane in which the second mixing plate extends inside of the tubular conduit.

In another embodiment, an exhaust aftertreatment assembly includes a tubular conduit and a mixer. The tubular conduit has a central axis. The mixer is disposed in the tubular conduit. The mixer includes a first mixing plate and a second mixing plate. The first mixing plate is crescent shaped. The first mixing plate includes a first plate convex edge and a first plate concave edge. The first plate convex edge is attached to the tubular conduit. The second mixing plate is crescent shaped. The second mixing plate includes a second plate convex edge and a second plate concave edge. The second plate convex edge is attached to the tubular conduit. The first mixing plate and the second mixing plate are positioned relative to the tubular conduit such that the central axis extends between the first plate concave edge and the second plate concave edge. A plane in which the first mixing plate extends and a plane in which the second mixing plate extends are oblique to the central axis of the tubular conduit.

In another embodiment, an exhaust aftertreatment assembly includes a tubular conduit having a central axis a mixer disposed in the tubular conduit. The mixer includes a first mixing plate and a second mixing plate. The first mixing plate includes a first plate convex edge attached to the tubular conduit and a first plate concave edge opposite the first plate convex edge. The second mixing plate includes a second plate convex edge attached to the tubular conduit, and a second plate concave edge opposite the second plate convex edge. The first mixing plate and the second mixing plate are positioned relative to the tubular conduit such that the central axis extends between the first plate concave edge and the second plate concave edge. A plane in which the first mixing plate extends intersects a plane in which the second mixing plate extends inside of the tubular conduit.

BRIEF DESCRIPTION OF THE DRAWINGS

The disclosure will become more fully understood from the following detailed description, taken in conjunction with the accompanying Figures, wherein like reference numerals refer to like elements unless otherwise indicated, in which.

Figure 1:
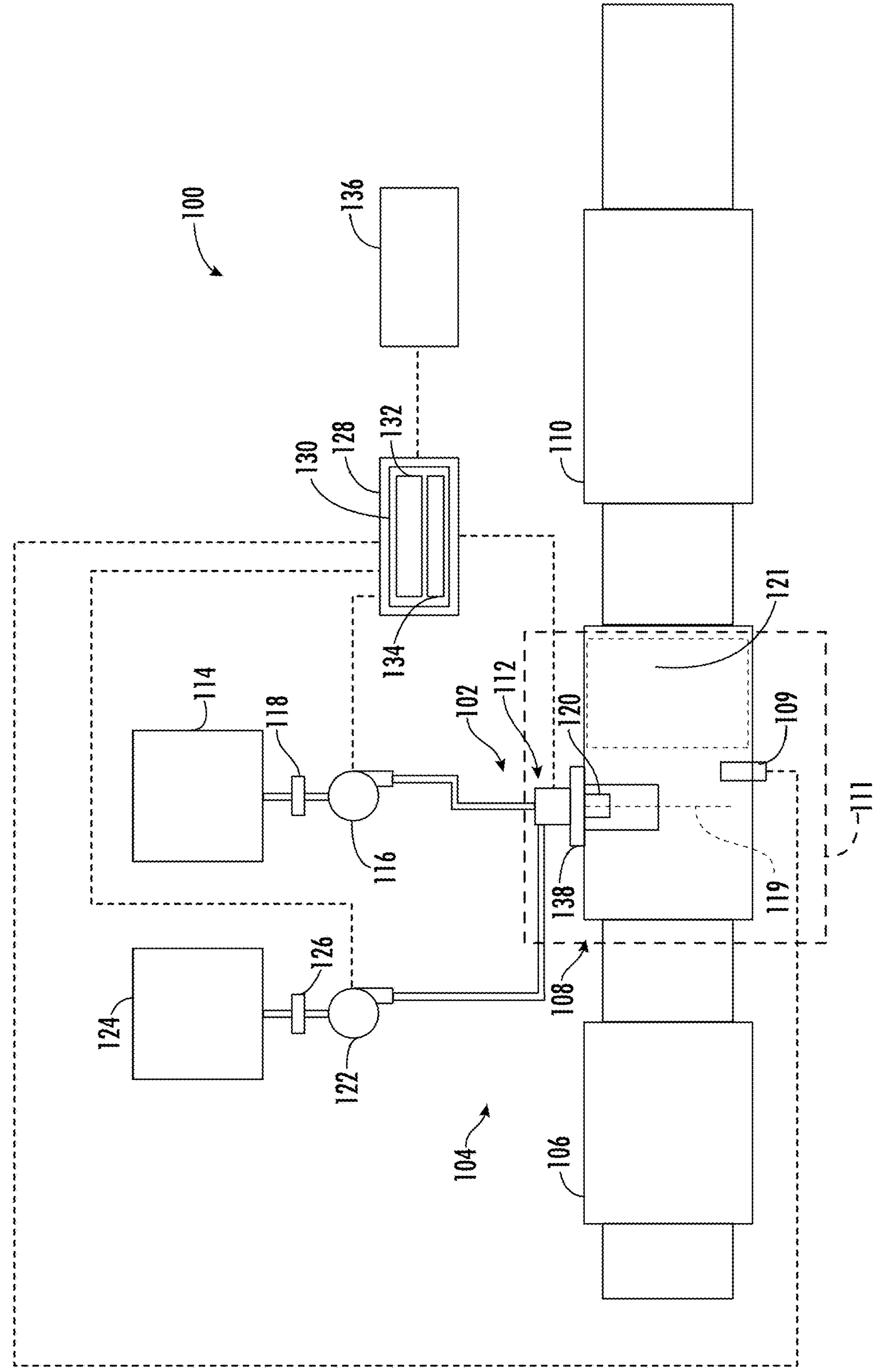
FIG. 1 is a block schematic diagram of an example exhaust aftertreatment system.
Figure 2:
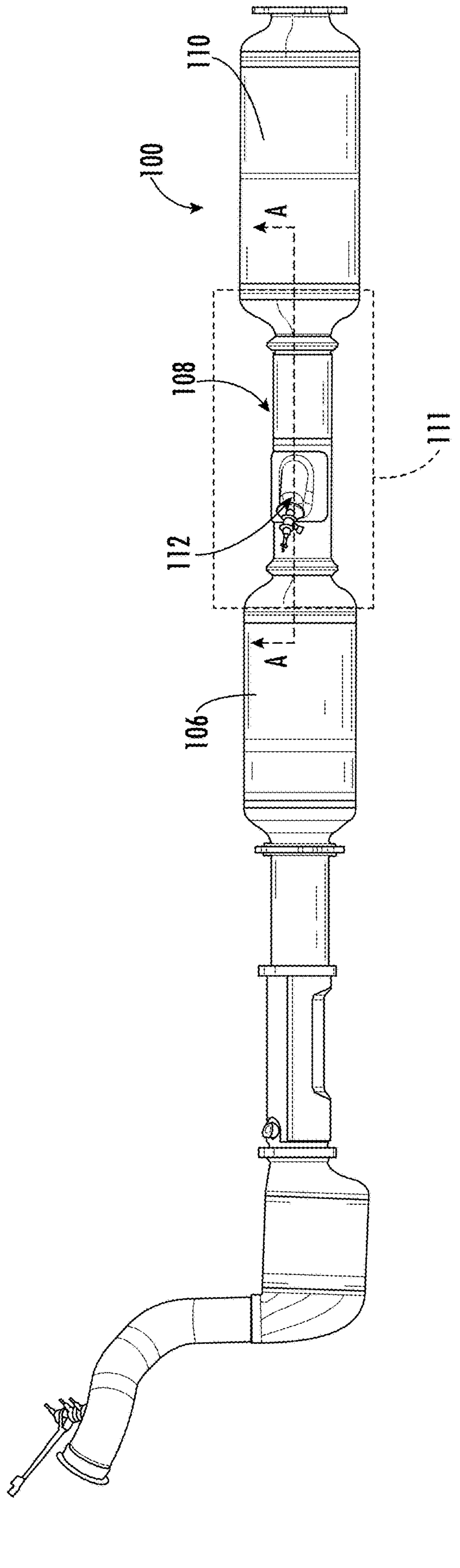
FIG. 2 is a top view of a portion of the exhaust aftertreatment system of FIG. 1.
Figure 3:
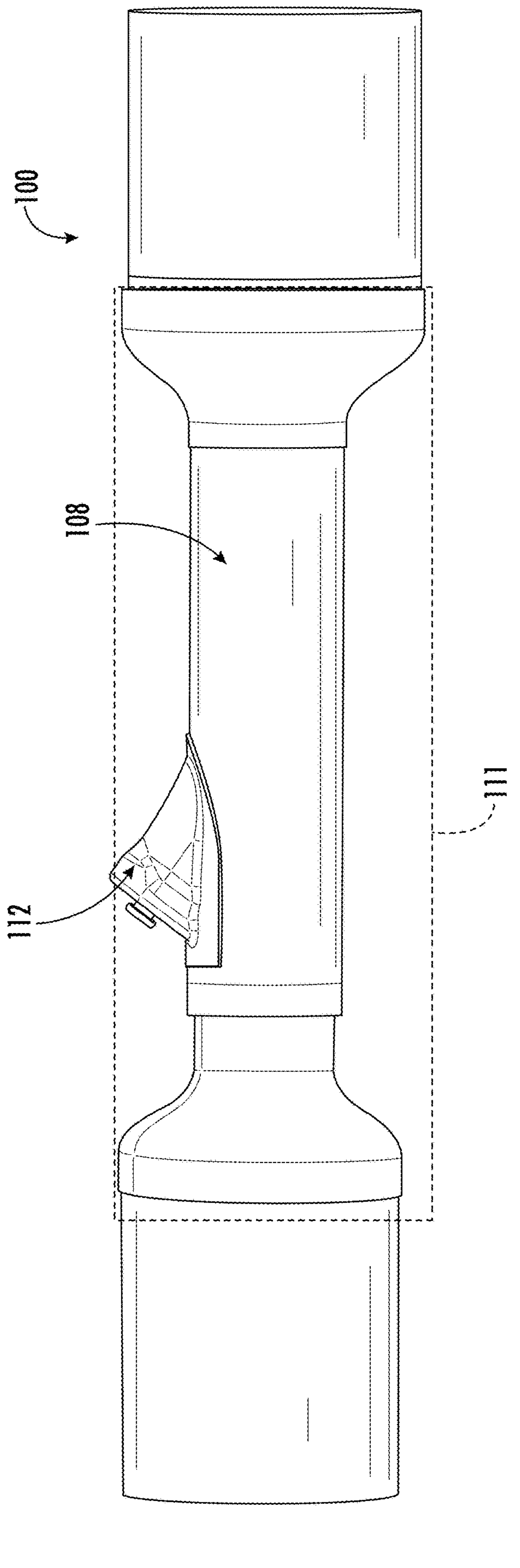
FIG. 3 is a side view of a portion of the exhaust aftertreatment system of FIG. 2.

It will be recognized that the Figures are schematic representations for purposes of illustration. The Figures are provided for the purpose of illustrating one or more implementations with the explicit understanding that the Figures will not be used to limit the scope or the meaning of the claims.

DETAILED DESCRIPTION

Following below are more detailed descriptions of various concepts related to, and implementations of, methods, apparatuses, and for providing a mixer for an exhaust aftertreatment assembly of an internal combustion engine. The various concepts introduced above and discussed in greater detail below may be implemented in any of a number of ways, as the described concepts are not limited to any particular manner of implementation. Examples of specific implementations and applications are provided primarily for illustrative purposes.

I. Overview

Internal combustion engines (e.g., diesel internal combustion engines, etc.) produce exhaust that is often treated by a doser assembly within an exhaust aftertreatment system. The doser assembly typically treats exhaust using a treatment fluid (e.g., reductant, hydrocarbon, etc.) released from the doser assembly by an injector of a doser. The treatment fluid, such as the reductant, may be adsorbed by a catalyst member. The adsorbed treatment fluid in the catalyst member functions to reduce NOx in the exhaust. The treatment fluid, such as the hydrocarbon, may increase a temperature of the exhaust to reduce NOx in the exhaust. The doser assembly is mounted on a component of the exhaust aftertreatment system. For example, the doser assembly may be mounted on a decomposition reactor, an exhaust conduit, a panel, or other similar components of the exhaust aftertreatment system.

Mixing the exhaust with the treatment fluid improves the reduction of NOx in the exhaust. A device can be used to facilitate mixing between the exhaust and the treatment fluid through turbulent flow (e.g., turbulence, etc.). Turbulence in the form of swirling (e.g., eddies, etc.) improves the mixing characteristics of a fluid. For example, swirling of the exhaust causes dispersal of treatment fluid within the exhaust, thereby improving the mixing between the exhaust and the treatment fluid. However, a device in a flow path of the treatment fluid may be prone to collecting (e.g., accumulating, etc.) deposits of the treatment fluid. These deposits may reduce a mixing efficiency of the device and a flow rate of the exhaust and/or the treatment fluid within a conduit that the device is within or fluidly coupled to.

Implementations herein are directed to an exhaust aftertreatment system that includes a tubular conduit that is configured to receive exhaust and treatment fluid with a mixer disposed inside of the tubular conduit. The mixer includes crescent shaped mixing plates which each extend on a plane that is oblique to the central axis of the tubular conduit. The angle of the crescent shaped mixing plates relative to the central axis facilitate turbulent, spiraling flow of the exhaust and the treatment fluid through the mixer body by directing exhaust and treatment fluid towards an outer periphery of the tubular conduit. The swirling motion also induces shear on downstream faces of the crescent shaped mixing blades. As a result of this shear, formation of deposits of the treatment fluid on the downstream faces of the crescent shaped mixing blades is prevented or minimized. The mixing plates may be arranged in the tubular conduit such that the planes in which each mixing plate extend intersect inside of the tubular conduit. The mixing plates may be flat and may be positioned such that the central axis extends in between the concave edges of the mixing plates. These arrangements may beneficially provide mixing of the exhaust and treatment fluid while minimizing cost relative to other mixers that are suspended within a conduit, for example.

II. Overview of Exhaust Aftertreatment Systems

FIG. 1 depicts an exhaust aftertreatment system 100 having an example treatment fluid delivery system 102 for an exhaust conduit system 104. The exhaust aftertreatment system 100 includes the treatment fluid delivery system 102, a particulate filter 106 (e.g., a diesel particulate filter (DPF)), a tubular conduit 108, and a catalyst member 110 (e.g., SCR catalyst member, etc.).

The exhaust aftertreatment system 100 includes an exhaust aftertreatment assembly 111. The exhaust aftertreatment assembly 111 includes the tubular conduit 108. In various embodiments, the exhaust aftertreatment assembly 111 includes other components of the exhaust aftertreatment system 100, such as components of the treatment fluid delivery system 102.

The particulate filter 106 is configured to (e.g., structured to, able to, etc.) remove particulate matter, such as soot, from exhaust flowing in the exhaust conduit system 104. The particulate filter 106 includes an inlet, where the exhaust is received, and an outlet, where the exhaust exits after having particulate matter substantially filtered from the exhaust and/or converting the particulate matter into carbon dioxide. In some implementations, the particulate filter 106 may be omitted.

The tubular conduit 108 functions as a decomposition chamber (e.g., decomposition chamber, reactor, reactor pipe, conduit, etc.). The tubular conduit 108 is configured to receive the exhaust from the particulate filter 106 and a treatment fluid from the treatment fluid delivery system 102. The treatment fluid may be, for example, a reductant (e.g., urea, diesel exhaust fluid (DEF), Adblue®, a urea water solution (UWS), an aqueous urea solution (e.g., AUS32, etc.), and/or other similar fluids) or a hydrocarbon (e.g., fuel, oil, additive, etc.). When the reductant is introduced into the exhaust, reduction of emission of undesirable components (e.g., NOx, etc.) in the exhaust may be facilitated. When the hydrocarbon is introduced into the exhaust, the temperature of the exhaust may be increased (e.g., to facilitate regeneration of components of the exhaust aftertreatment system 100, etc.). For example, the exhaust aftertreatment system 100 may include a spark plug 109 (e.g., igniter, etc.) configured to increase the temperature of the exhaust by combusting the hydrocarbon within the exhaust. The tubular conduit 108 includes an inlet in fluid communication with the particulate filter 106 to receive the exhaust containing NOx emissions and an outlet for the exhaust, NOx emissions, ammonia, and/or treatment fluid to flow to the catalyst member 110.

The treatment fluid delivery system 102 includes a doser assembly 112 (e.g., dosing module, etc.) configured to dose the treatment fluid into the tubular conduit 108 (e.g., via an injector). The doser assembly 112 is mounted to the tubular conduit 108 such that the doser assembly 112 may dose the treatment fluid into the exhaust flowing through the exhaust conduit system 104. The doser assembly 112 may include an insulator (e.g., vibrational insulator, thermal insulator, etc.) interposed between a portion of the doser assembly 112 and a portion of the tubular conduit 108 on which the doser assembly 112 is mounted. The insulator may mitigate transfer of vibrations and/or heat from the tubular conduit 108 to the doser assembly 112.

The doser assembly 112 is fluidly coupled to (e.g., fluidly configured to communicate with, etc.) a treatment fluid source 114. The treatment fluid source 114 may include multiple treatment fluid sources 114. The treatment fluid source 114 may be, for example, a diesel exhaust fluid tank containing Adblue®. A treatment fluid pump 116 (e.g., supply unit, etc.) is used to pressurize the treatment fluid from the treatment fluid source 114 for delivery to the doser assembly 112. In some embodiments, the treatment fluid pump 116 is pressure-controlled (e.g., controlled to obtain a target pressure, etc.). The treatment fluid pump 116 includes a treatment fluid filter 118. The treatment fluid filter 118 filters (e.g., strains, etc.) the treatment fluid prior to the treatment fluid being provided to internal components (e.g., pistons, vanes, etc.) of the treatment fluid pump 116. For example, the treatment fluid filter 118 may inhibit or prevent the transmission of solids (e.g., solidified treatment fluid, contaminants, etc.) to the internal components of the treatment fluid pump 116. In this way, the treatment fluid filter 118 may facilitate prolonged desirable operation of the treatment fluid pump 116. In some embodiments, the treatment fluid pump 116 is coupled (e.g., fastened, attached, affixed, welded, etc.) to a chassis of a vehicle associated with the exhaust aftertreatment system 100.

The doser assembly 112 includes at least one injector 120. Each injector 120 is configured to dose the treatment fluid into the exhaust (e.g., within the tubular conduit 108, etc.) along an injection axis 119. The exhaust aftertreatment assembly 111 also includes a mixer 121 (e.g., a swirl generating device, a vane plate, inlet plate, deflector plate, etc.) (e.g., in addition to the tubular conduit 108, etc.). At least a portion of the mixer 121 is located within the tubular conduit 108. The mixer 121 is configured to receive exhaust from the tubular conduit 108 and treatment fluid from the injector 120, such that the injection axis 119 extends into the mixer 121. The mixer 121 is also configured to facilitate mixing of the exhaust and the treatment fluid. The mixer 121 is configured to facilitate swirling (e.g., tumbling, rotation, etc.) of the exhaust and mixing (e.g., combination, etc.) of the exhaust and the treatment fluid so as to disperse the treatment fluid within the exhaust downstream of the mixer 121. By dispersing the treatment fluid within the exhaust (e.g., to obtain an increased uniformity index, etc.) using the mixer 121, reduction of emission of undesirable components in the exhaust is enhanced or a temperature of the exhaust may be increased.

In some embodiments, the treatment fluid delivery system 102 also includes an air pump 122. In these embodiments, the air pump 122 draws air from an air source 124 (e.g., air intake, etc.) and through an air filter 126 disposed upstream of the air pump 122. Additionally, the air pump 122 provides the air to the doser assembly 112 via a conduit. In these embodiments, the doser assembly 112 is configured to mix the air and the treatment fluid into an air-treatment fluid mixture and to provide the air-treatment fluid mixture into the tubular conduit 108. In other embodiments, the treatment fluid delivery system 102 does not include the air pump 122 or the air source 124. In such embodiments, the doser assembly 112 is not configured to mix the treatment fluid with air.

The spark plug 109, the doser assembly 112, and the treatment fluid pump 116 are also electrically or communicatively coupled to a treatment fluid delivery system controller 128. The treatment fluid delivery system controller 128 may control the spark plug 109 to ignite the treatment fluid in the tubular conduit 108. The treatment fluid delivery system controller 128 controls the doser assembly 112 to dose the treatment fluid into the tubular conduit 108. The treatment fluid delivery system controller 128 may also control the treatment fluid pump 116.

The treatment fluid delivery system controller 128 includes a processing circuit 130. The processing circuit 130 includes a processor 132 and a memory 134. The processor 132 may include a microprocessor, an application-specific integrated circuit (ASIC), a field-programmable gate array (FPGA), etc., or combinations thereof. The memory 134 may include, but is not limited to, electronic, optical, magnetic, or any other storage or transmission device capable of providing a processor, ASIC, FPGA, etc. with program instructions. This memory 134 may include a memory chip, Electrically Erasable Programmable Read-Only Memory (EEPROM), Erasable Programmable Read Only Memory (EPROM), flash memory, or any other suitable memory from which the treatment fluid delivery system controller 128 can read instructions. The instructions may include code from any suitable programming language. The memory 134 may include various modules that include instructions which are configured to be implemented by the processor 132.

In various embodiments, the treatment fluid delivery system controller 128 is configured to communicate with a central controller 136 (e.g., engine control unit (ECU), engine control module (ECM), etc.) of an internal combustion engine having the exhaust aftertreatment system 100. In some embodiments, the central controller 136 and the treatment fluid delivery system controller 128 are integrated into a single controller.

In some embodiments, the central controller 136 is communicable with a display device (e.g., screen, monitor, touch screen, heads up display (HUD), indicator light, etc.). The display device may be configured to change state in response to receiving information from the central controller 136. For example, the display device may be configured to change between a static state (e.g., displaying a green light, displaying a "SYSTEM OK" message, etc.) and an alarm state (e.g., displaying a blinking red light, displaying a "SERVICE NEEDED" message, etc.) based on a communication from the central controller 136. By changing state, the display device may provide an indication to a user (e.g., operator, etc.) of a status (e.g., operation, in need of service, etc.) of the treatment fluid delivery system 102.

The tubular conduit 108 is located upstream of the catalyst member 110. As a result, the treatment fluid is injected upstream of the catalyst member 110 such that the catalyst member 110 receives a mixture of the treatment fluid and exhaust. The treatment fluid droplets undergo the processes of evaporation, thermolysis, and hydrolysis to form non-NOx emissions (e.g., gaseous ammonia, etc.) within the exhaust conduit system 104.

The catalyst member 110 includes an inlet in fluid communication with the tubular conduit 108 from which exhaust and treatment fluid are received and an outlet in fluid communication with an end of the exhaust conduit system 104.

The exhaust aftertreatment system 100 may further include an oxidation catalyst member (e.g., a diesel oxidation catalyst (DOC)) in fluid communication with the exhaust conduit system 104 (e.g., downstream of the catalyst member 110 or upstream of the particulate filter 106) to oxidize hydrocarbons and carbon monoxide in the exhaust.

In some implementations, the particulate filter 106 may be positioned downstream of the tubular conduit 108. For instance, the particulate filter 106 and the catalyst member 110 may be combined into a single unit. In some implementations, the doser assembly 112 may instead be positioned downstream of a turbocharger or upstream of a turbocharger.

The exhaust aftertreatment system 100 also includes a doser mounting bracket 138 (e.g., mounting bracket, coupler, plate, etc.). The doser mounting bracket 138 couples the doser assembly 112 to a component of the exhaust aftertreatment system 100. The doser mounting bracket 138 is configured to mitigate the transfer of heat from the exhaust passing through the exhaust conduit system 104 to the doser assembly 112. In this way, the doser assembly 112 is capable of operating more efficiently and desirably than other doser assemblies which are not able to mitigate the transfer of heat. Additionally, the doser mounting bracket 138 is configured to aid in reliable installation of the doser assembly 112. This may decrease manufacturing costs associated with the exhaust aftertreatment system 100 and ensure repeated desirable installation of the doser assembly 112.

In various embodiments, the doser mounting bracket 138 couples the doser assembly 112 to the tubular conduit 108. In some embodiments, the doser mounting bracket 138 couples the doser assembly 112 to an exhaust conduit of the exhaust conduit system 104. For example, the doser mounting bracket 138 may couple the doser assembly 112 to an exhaust conduit of the exhaust conduit system 104 that is upstream of the tubular conduit 108 or to an exhaust conduit of the exhaust conduit system 104 that is downstream of the tubular conduit 108. In some embodiments, the doser mounting bracket 138 couples the doser assembly 112 to the particulate filter 106 and/or the catalyst member 110. The location of the doser mounting bracket 138 may be varied depending on the application of the exhaust aftertreatment system 100. For example, in some exhaust aftertreatment systems 100, the doser mounting bracket 138 may be located further upstream than in other exhaust aftertreatment systems 100. Furthermore, some exhaust aftertreatment systems 100 may include multiple doser assemblies 112 and therefore may include multiple doser mounting brackets 138.

FIGS. 2-9 illustrate various embodiments of the exhaust aftertreatment system 100. The doser assembly 112 is configured to inject treatment fluid into the tubular conduit 108.

The injection axis 119 may extend into the tubular conduit 108 at an angle relative to a central axis 205 of the tubular conduit 108. For example, in some embodiments, the injection axis 119 may be coincident with the central axis 205 of the tubular conduit 108. In other embodiments, the injection axis 119 may be perpendicular to the central axis 205 of the tubular conduit 108. In yet other embodiment, the injection axis 119 may be parallel to the central axis 205 of the tubular conduit 108.

III. Overview of Example Mixers

Figure 8:
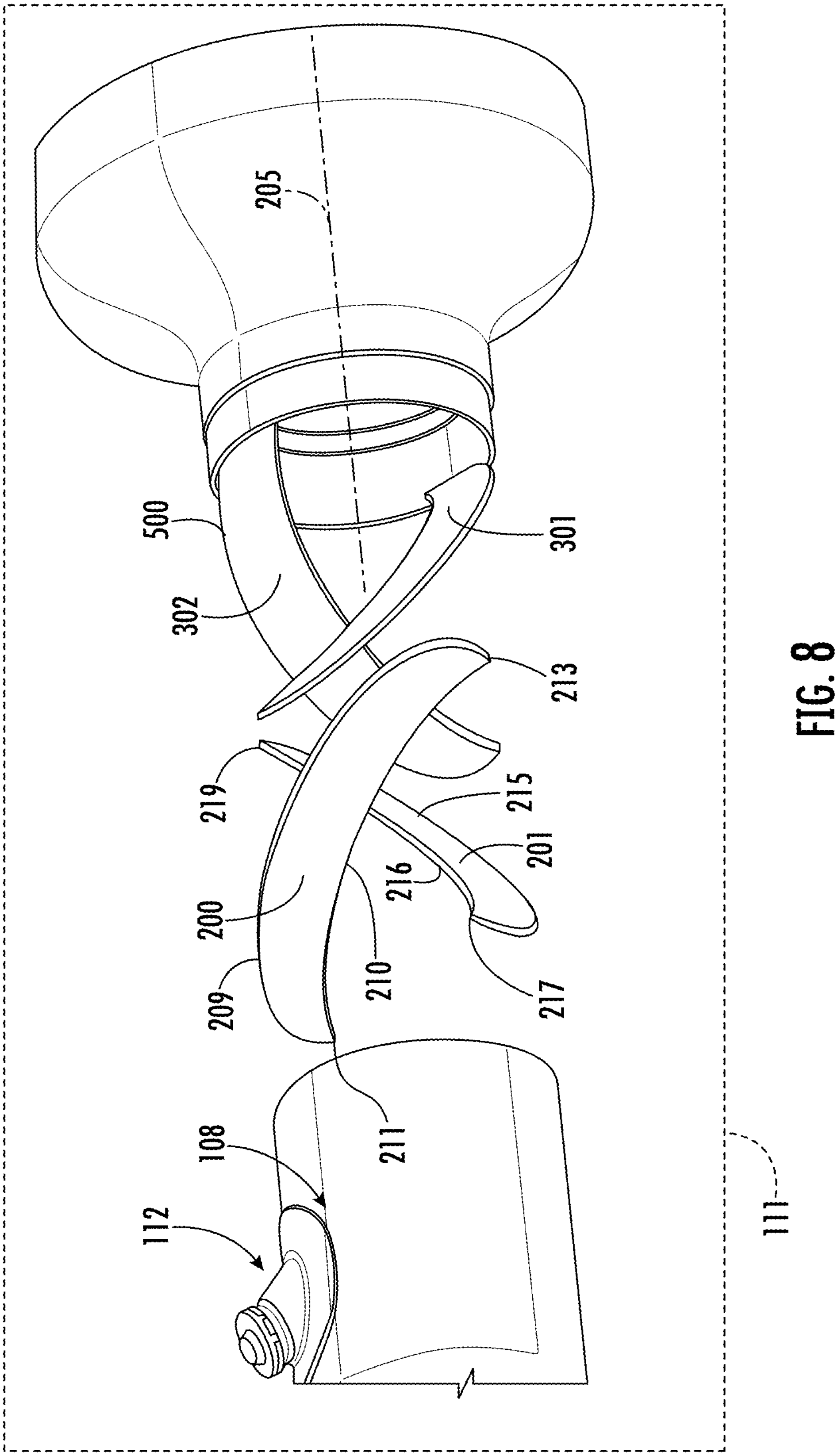
FIG. 8 is a perspective view of the exhaust aftertreatment system of FIG. 3 with a portion of a tubular conduit hidden, according to various embodiments.
Figure 9:
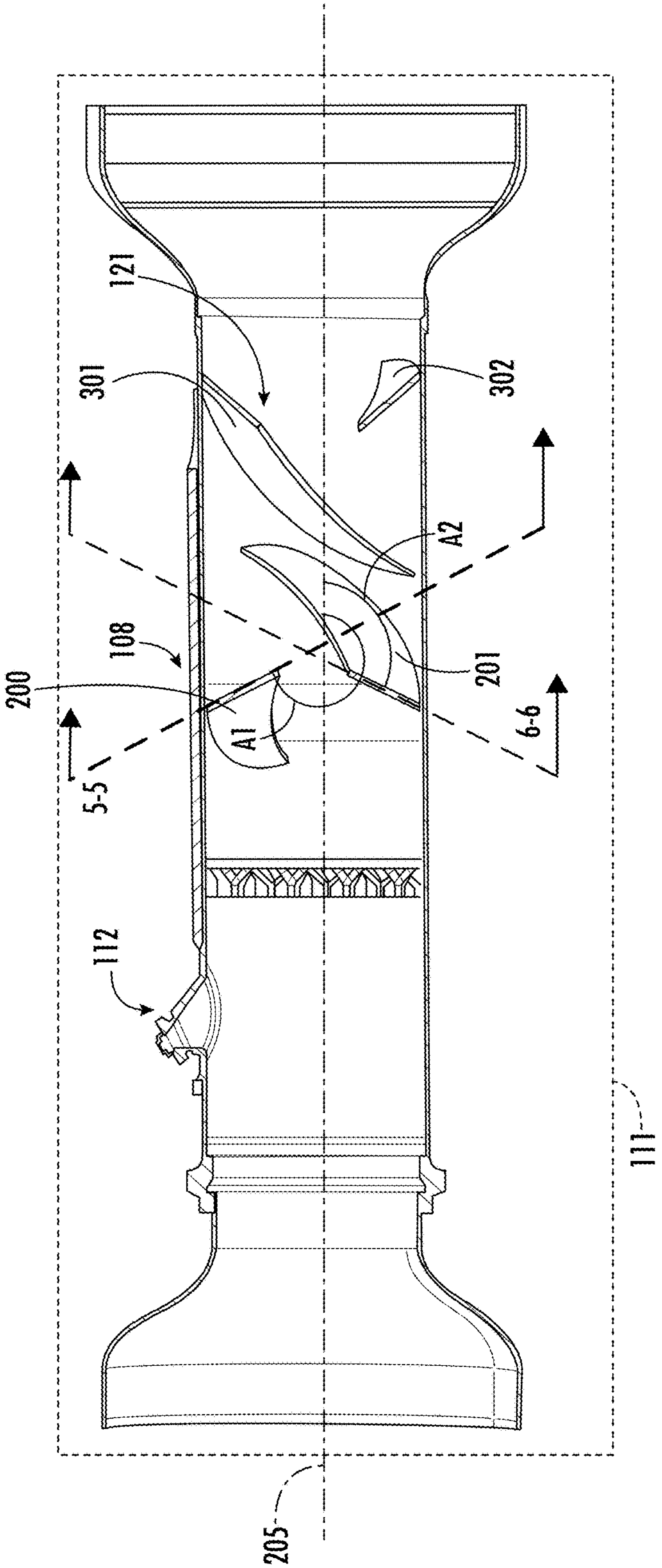
FIG. 9 is a cross-sectional view of the exhaust aftertreatment system of FIG. 8 taken along plane A-A in FIG. 2.
Figure 10:
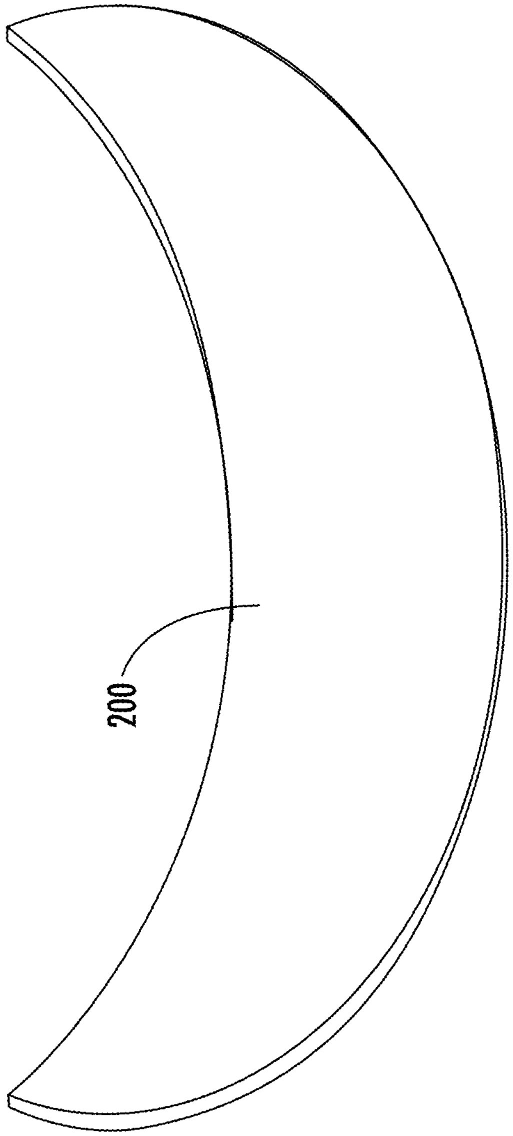
FIG. 10 is a front view of a first mixing plate, according to various embodiments.

FIGS. 4-9 illustrate portions of the exhaust aftertreatment system 100 including the mixer 121, according to various embodiments. The mixer 121 includes crescent shaped mixing blades, including a first mixing plate 200 (e.g., blade, etc.) and a second mixing plate 201 (e.g., blade, etc.). As is explained in more detail herein, the first mixing plate 200 and the second mixing plate 201 facilitate swirling of the exhaust within the tubular conduit 108, and therefore swirling and mixing of the exhaust and the treatment fluid. FIG. 10 illustrates a flat view of the first mixing plate 200 according to various embodiments. The first mixing plate 200 may include an edge chamfer to provide a flush fit between the first mixing plate 200 and the tubular conduit 108.

In various embodiments, the second mixing plate 201 is identical to the first mixing plate 200. It is understood that one configuration for the first mixing plate 200 may be utilized for the first mixing plate 200 when the same or another configuration for the first mixing plate 200 may be utilized for the second mixing plate 201. Similarly, description herein of the first mixing plate 200 similarly applies to any other mixing plates (e.g., the second mixing plate 201, etc.) unless otherwise indicated to the contrary.

As utilized herein, "crescent shaped" means a shape that is bounded by two circular arcs of unequal radii, where the shape does not include the center of either circle defining the circular arcs. A "crescent" is a type of lune which is a shape that is bounded by two circular arcs of unequal radii.

In some embodiments, the second mixing plate 201 is identical to the first mixing plate 200. This identical relationship may reduce complexity associated with manufacturing the exhaust aftertreatment system 100. In other embodiments, the second mixing plate 201 is different from the first mixing plate 200. These differences may enable tailoring of the exhaust aftertreatment system 100 to produce a target effect on the flow of the exhaust. This target effect may be causing the treatment fluid to have a target uniformity index within the exhaust, for example. In some embodiments, the exhaust aftertreatment system 100 includes only a single mixing plate, the first mixing plate 200, and does not include the second mixing plate 201.

The tubular conduit 108 is configured to receive treatment fluid and exhaust through an inlet end 202 of the tubular conduit. The mixer 121 induces an at least partially rotational flow of a mixture of the exhaust and treatment fluid. The mixer 121 disrupts and directs the flow of exhaust around the central axis 205 to cause rotation of the exhaust and the treatment fluid within the tubular conduit 108 to facilitate mixing of the exhaust and the treatment fluid within the tubular conduit 108 and downstream of the tubular conduit 108.

Figure 4:
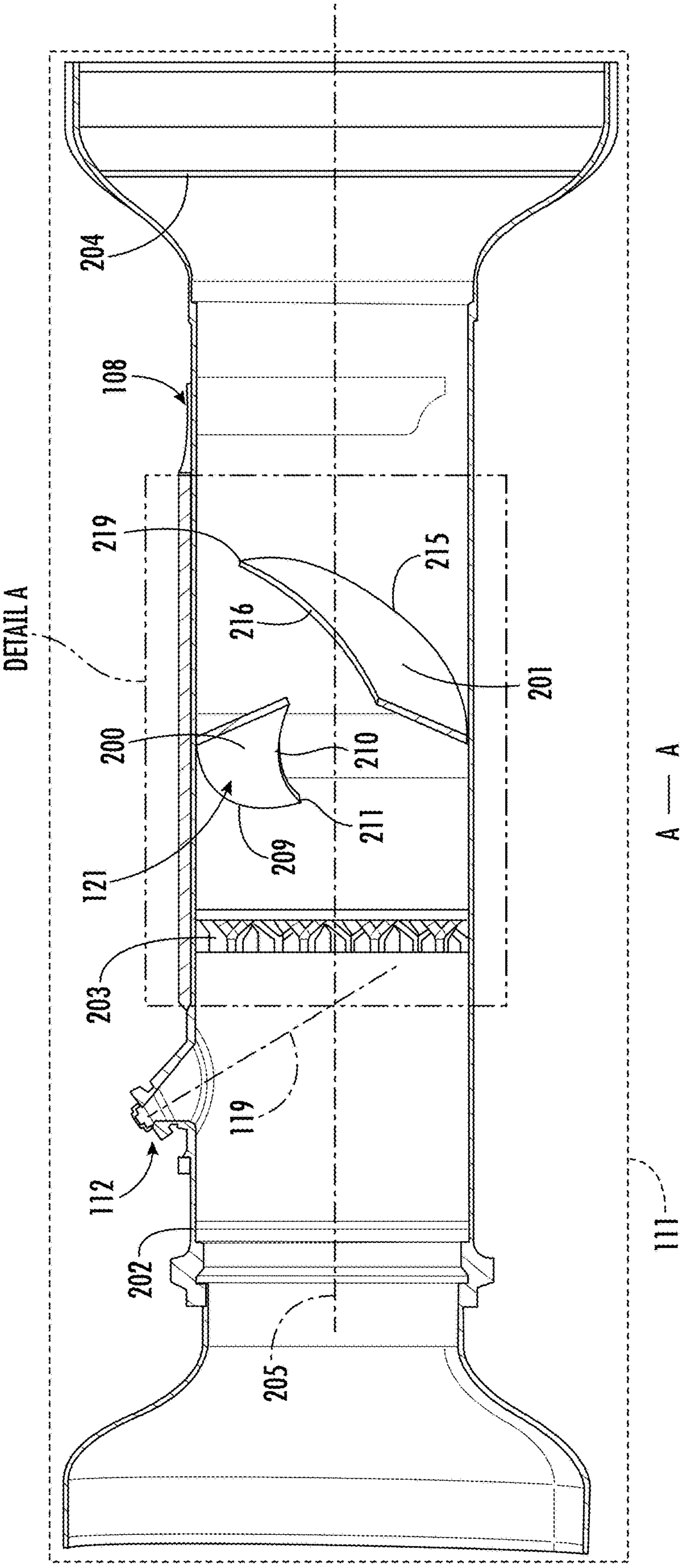
FIG. 4 is a cross-sectional view of the exhaust aftertreatment system of FIG. 3 taken along plane A-A in FIG. 2, according to various embodiments.

As shown in FIG. 4, the mixer 121 also includes a fine mixer 203 (e.g., in addition to the first mixing plate 200 and the second mixing plate 201, etc.). The fine mixer 203 includes a perforated plate with one or more angled projections (e.g., baffles, etc.) such that exhaust may flow directly through the fine mixer and into a region between the first mixing plate 200 and second mixing plate 201. The fine mixer 203 is located downstream of the doser assembly 112 and upstream of the first mixing plate 200. The fine mixer 203 disrupts flow and increases turbulence such that the exhaust and treatment fluid begins to mix before the exhaust enters the region between the first mixing plate 200 and second mixing plate 201. Additionally, the fine mixer 203 functions to break up droplets of the treatment fluid received from the doser assembly 112.

In various embodiments, the mixer 121 also includes a perforated plate 204. The perforated plate 204 is located downstream of the second mixing plate 201, such that if there are more than two mixing plates (e.g., a third mixing plate in addition to the first mixing plate 200 and the second mixing plate 201, etc.) in the mixer 121, the perforated plate 204 is located between the most downstream mixing plate and an outlet of the tubular conduit 108. The perforated plate 204 disrupts flow such that it reduces the turbulence of the flow prior to the flow being provided to the catalyst member 110. The perforated plate 204 increases the laminar region of the exhaust flow before the exhaust enters the region downstream of the tubular conduit 108, such as the catalyst member 110. In this way, the perforated plate 204 enhances operation of the catalyst member 110.

The fine mixer 203 and/or the perforated plate 204 may be omitted in some applications. For example, the mixer 121 may include only the first mixing plate 200, the second mixing plate 201, and the perforated plate 204 downstream of the second mixing plate 201, and not include the fine mixer 203. The mixer 121 may also include only the first mixing plate 200, the second mixing plate 201, and the fine mixer 203 located upstream of the first mixing plate 200, and not include the perforated plate 204. In another example, the mixer 121 may include only the first mixing plate 200 and the second mixing plate 201, and not include the fine mixer 203 or the perforated plate 204.

Figure 5:
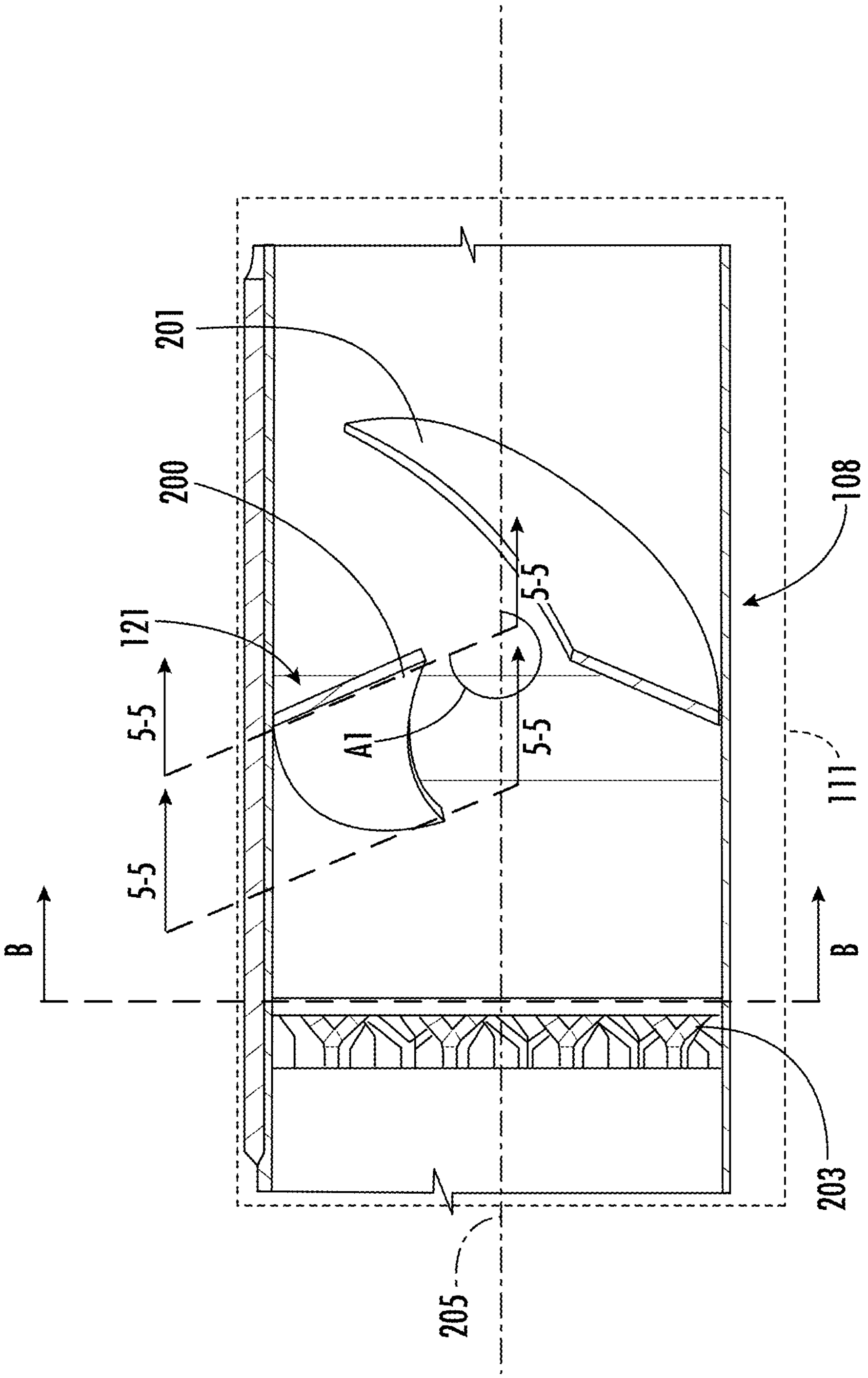
FIG. 5 is a view of DETAIL A in FIG. 4.
Figure 6:
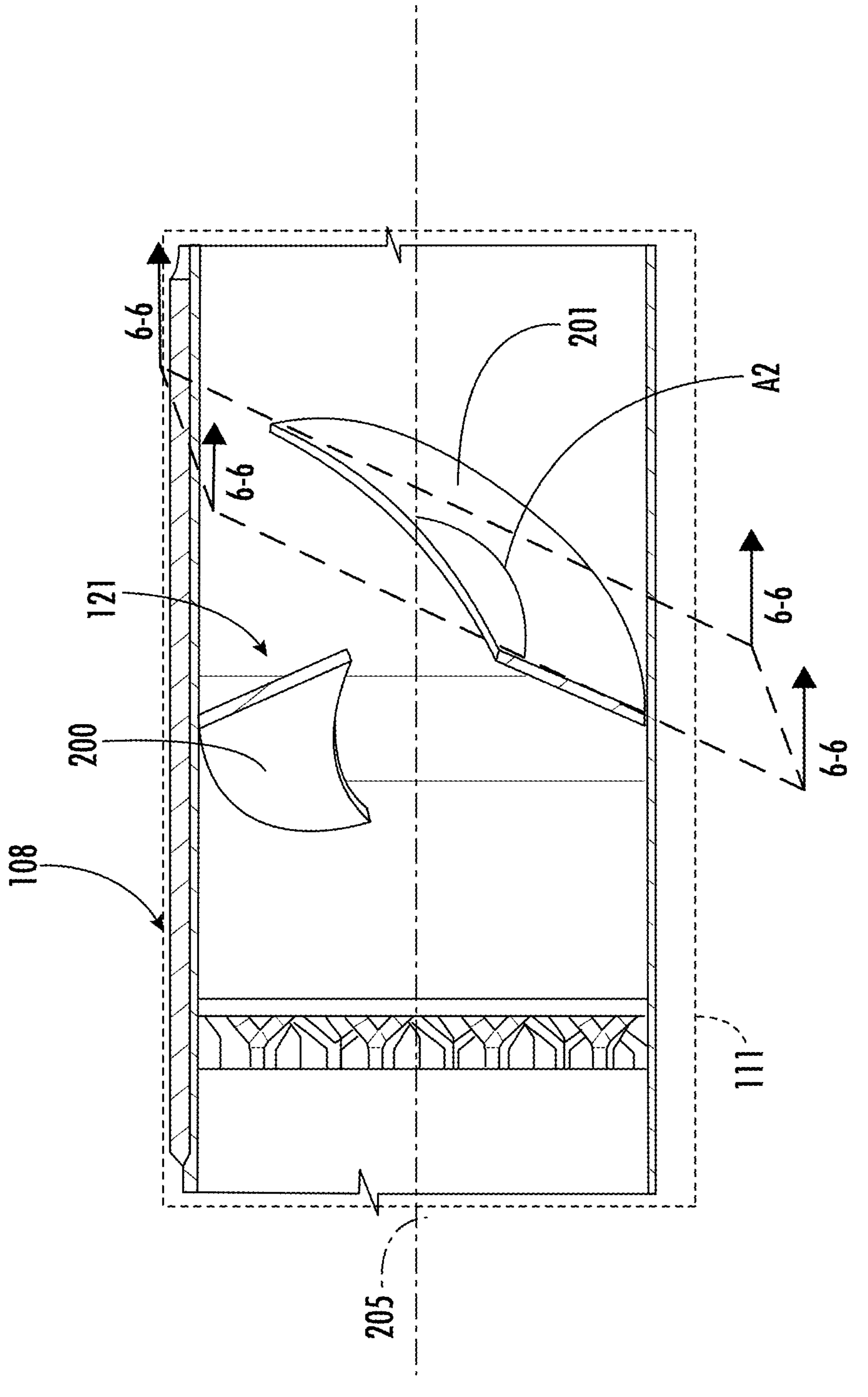
FIG. 6 is another view of DETAIL A in FIG. 4.

As shown in FIG. 5, the first mixing plate 200 extends in a plane 5-5 which is oblique to (e.g., angled relative to, not perpendicular with, not parallel to, not perpendicular with and not parallel to, etc.) the central axis 205 of the tubular conduit 108 (e.g., see FIG. 5 angle A1). As shown in FIG. 6, the second mixing plate 201 also extends in a plane 6-6 which is oblique to the central axis 205 of the tubular conduit 108 (e.g., see FIG. 6 angle A2). The angle of the plane 5-5 in which the first mixing plate 200 and the angle of the plane 6-6 in which the second mixing plate 201 extends relative to the central axis 205 of the tubular conduit 108 (e.g., A1 and A2, respectively) enables rotation of the exhaust and treatment fluid within the tubular conduit 108 by directing exhaust and fluid toward the outer periphery of the tubular conduit 108.

The angles for all of the mixing plates (e.g., the first mixing plate 200, the second mixing plate 201, etc.) are all measured in the same direction (e.g., clockwise, counterclockwise, etc.). As depicted in FIGS. 5 and 9 and described herein, A1 and A2 are measured in the clockwise direction. In other embodiments, A1 and A2 are measured in the counterclockwise direction (i.e., the same angular amounts described herein are instead measured in the counterclockwise direction). For example, the discussion of A1 being between 181° and 269°, inclusive, below is depicted in the clockwise direction, but it is understood that the A1 may also be between 181° and 269°, inclusive, in the counterclockwise direction.

In various embodiments, A1 is between 181° and 269°, inclusive. In various embodiments, A2 is between 91° and 179°, inclusive. In various embodiments, A1 is between 200° and 250°, inclusive. In various embodiments, A2 is between 110° and 170°, inclusive. Additionally, in some embodiments, A1 is between 200° and 250°, inclusive, and A2 is between 110° and 170°, inclusive. In some embodiments, A1 is between 22° and 230°, inclusive. In some embodiments, A2 is between 130° and 140°, inclusive.

A relationship between A1 and A2 is important to operation of the mixer 121. In various embodiments, A1 is equal to A2+X, where X is between 90° and 110°. In some embodiments, X is 0100.

As shown in FIG. 9, in some embodiments, the oblique angle of the plane in which the first mixing plate 200 and the second mixing plate 201 extend (e.g., A1 and A2, respectively) relative to the central axis 205 may be selected such that A2=360°−A1. As a result, the first mixing plate 200 and second mixing plate 201 mirror each other relative to the central axis 205 of the tubular conduit 108. In various embodiments, A1 is equal to 225° and A2 is equal to 135°.

As illustrated in FIG. 4, the first mixing plate 200 includes a first plate concave edge 210 and a first plate convex edge 209. The first plate convex edge 209 intersects the first plate concave edge 210 at a first plate first point 211 and a first plate second point 213 (shown in FIG. 8). The first plate convex edge 209 of the first mixing plate 200 enables the first mixing plate 200 to be coupled to the tubular conduit 108 along an entire outer periphery of the first mixing plate 200 (e.g., the first plate convex edge 209). This enhances structural stability and minimizes bypassing of the rotational region between the first mixing plate 200 and second mixing plate 201 by the exhaust traveling between the tubular conduit 108 and the first mixing plate 200.

As discussed above, every mixer is defined by a backpressure. The mixer 121 is configured such that the backpressure is minimized. One aspect of this configuration is the first plate concave edge 210 which provides a path for exhaust to travel along the central axis 205. The first plate convex edge 209 also facilitates rotational flow of the exhaust as the exhaust passes over the first mixing plate 200 and into the downstream region of the tubular conduit 108.

Similarly, the second mixing plate 201 includes a second plate convex edge 215 and a second plate concave edge 216. The second plate concave edge 216 intersects the second plate convex edge 215 at a second plate first point 217 and a second plate second point 219. The second plate convex edge 215 of the second mixing plate 201 enables the second mixing plate 201 to be coupled to the tubular conduit 108 along an entire outer periphery of the second mixing plate 201 (e.g., the second plate convex edge 215). This enhances structural stability and minimizes bypassing of the rotational region between the first mixing plate 200 and second mixing plate 201 by traveling between the tubular conduit 108 and the second plate convex edge 215.

Another aspect of the configuration of the mixer 121 that provides minimized backpressure is the second plate concave edge 216 which provides a path for exhaust to travel along the central axis 205. The second plate concave edge 216 also facilitates rotational flow of the exhaust as the exhaust passes over the second mixing plate 201.

As illustrated in FIG. 9, the planes in which the first mixing plate 200 and second mixing plate 201 extend intersect in the tubular conduit 108. In some embodiments, the plane 5-5 in which the first mixing plate 200 extends intersects the second mixing plate 201 at a midpoint of the second plate convex edge 215 (e.g., between the second plate first point 217 and the second plate second point 219). In other embodiments, the plane 5-5 along which the first mixing plate 200 extends intersects the second mixing plate 201 at another point along the second plate convex edge 215. In other embodiments, the first mixing plate 200 and the second mixing plate 201 are spaced apart along the central axis 205 such that the plane 5-5 in which the first mixing plate 200 extends will not intersect the plane 6-6 in which the second mixing plate 201 extends within the tubular conduit 108.

In some embodiments, such as illustrated in FIG. 5, the first mixing plate 200 and the second mixing plate 201 are flat (e.g., disposed along a plane, not bent, not twisted). In these embodiments, the first mixing plate 200, the first plate convex edge 209, and first plate concave edge 210 are all coincident to the plane 5-5 In which the first mixing plate 200 extends inside of the tubular conduit 108. The second mixing plate 201, the second plate convex edge 215, and second plate concave edge 216 are also all coincident to the plane 6-6 in which the second mixing plate 201 extends inside of the tubular conduit 108.

In other embodiments, the first mixing plate 200 is not flat, such that the first plate convex edge 209, the first plate concave edge 210, and/or all or part of the first mixing plate 200 are not all coincident with the plane 5-5 in which the first mixing plate 200 extends. For example, the first mixing plate 200 may be helically shaped such that the first plate convex edge 209, the first plate concave edge 210, and the first mixing plate 200 are not coincident with the same plane 5-5 in which the first mixing plate 200 extends. In other embodiments, the second mixing plate 201 is not flat, such that the second plate convex edge 215, the second plate concave edge 216, and/or all or part of the second mixing plate 201 are not all entirely coincident with the plane 6-6 in which the second mixing plate extends. The second mixing plate 201 may be helically shaped such that the second plate convex edge 215, the second plate concave edge 216, and the second mixing plate 201 are not coincident with the same plane 6-6 in which the second mixing plate 201 extends.

Figure 7:
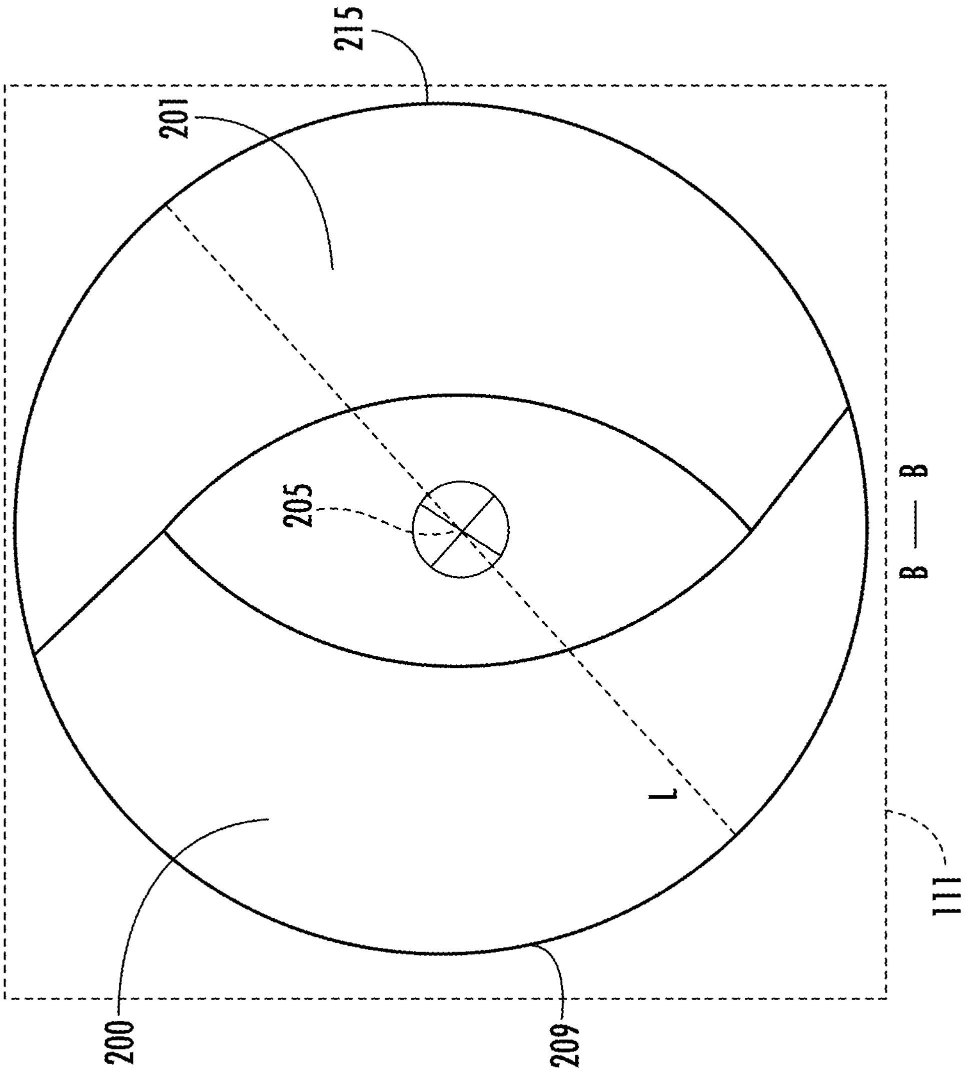
FIG. 7 is a cross-sectional view of the exhaust aftertreatment system of FIG. 5 taken along plane B-B in FIG. 5.

The first mixing plate 200 and second mixing plate 201 are attached to the tubular conduit 108 such that the central axis 205 of the tubular conduit 108 extends between the first plate convex edge 209 and the second plate concave edge 216 (e.g., the central axis 205 does not intersect the first mixing plate 200 or the second mixing plate 201). As a result, as illustrated in FIG. 7, a line segment L could be drawn from the tubular conduit inlet view A-A coincident with the first plate convex edge 209 and second plate convex edge 215 through the central axis 205 of the tubular conduit 108. This arrangement mitigates backpressure because there is a path through which exhaust can flow directly between the first mixing plate 200 and second mixing plate 201 without being blocked by the first mixing plate 200 or the second mixing plate 201.

In some embodiments, such as illustrated in FIG. 5 and FIG. 8, the first mixing plate 200 or the second mixing plate 201, or both, do not include perforations or textured surfaces. Such a configuration of the first mixing plate 200 and the second mixing plate 201 may decrease a cost associated with producing the first mixing plate 200 and the second mixing plate 201.

In other embodiments, either the first mixing plate 200 or second mixing plate 201, or both, include perforations and/or textured surfaces (e.g., louvers, flanges, raised patterns, or circular perforations). Perforations may mitigate backpressure by facilitating another path through which exhaust could travel through the first mixing plate 200 and/or the second mixing plate 201. The perforations may cover the entirety of the first mixing plate 200 and/or second mixing plate 201. The textured surfaces may cover the entirety of the first mixing plate 200 and/or second mixing plate 201. The textured surfaces may cover only one side (e.g., the upstream side) of the first mixing plate 200 and/or second mixing plate 201.

In some embodiments, either the first mixing plate 200 or second mixing plate 201, or both, have an airfoil shape. Such a configuration may provide flow along the first mixing plate 200 and/or the second mixing plate 201 in a manner that enhances swirl and therefore mixing of the treatment fluid and exhaust.

In one embodiment, as illustrated in FIG. 8, the mixer 121 includes a third mixing plate 301 and a fourth mixing plate 302. The third mixing plate 301 and the fourth mixing plate 302 are positioned at a 90-degree angle measured clockwise around the central axis 205 of the tubular conduit 108 relative to the first mixing plate 200 or the second mixing plate 201. A midpoint of a third plate convex edge 500 of the third mixing plate 301 is positioned 90 degrees clockwise relative to a midpoint of the first plate convex edge 209 of the first mixing plate 200 and the central axis 205 of the tubular conduit 108.

The third mixing plate 301 may be positioned such that a midpoint of the third plate convex edge 500 is positioned 90 degrees measured clockwise around the central axis 205 of the tubular conduit 108 relative to a midpoint of the first plate convex edge 209 or the second plate convex edge 215. Arranging additional mixing plates (e.g., the third mixing plate 301 and fourth mixing plate 302) at 90-degree angles facilitates a continuous rotational flow of exhaust between the first mixing plate 200 and most downstream mixing plate (e.g., the fourth mixing plate 302 in FIG. 8) in the tubular conduit 108.

Figure 11:
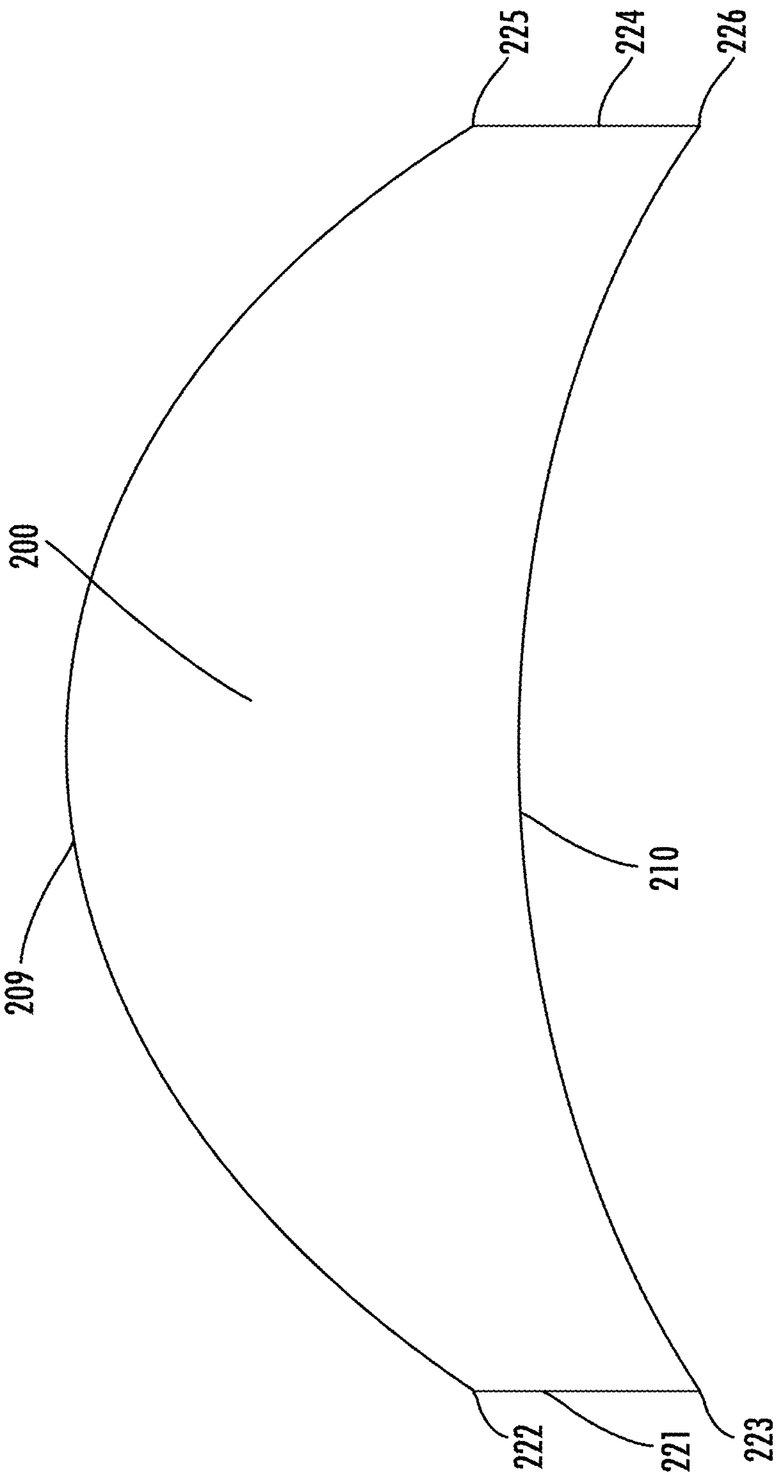
FIG. 11 is a front view of a first mixing plate, according to various embodiments.

FIG. 11 illustrates an embodiment of the first mixing plate 200 being a truncated crescent shape with a first connecting edge 221 and a second connecting edge 224. The first plate convex edge 209 and first plate concave edge 210 intersect the first connecting edge 221 at a first connecting point 222 and a second connecting point 223, respectively. The first plate convex edge 209 and first plate concave edge 210 intersect the second connecting edge 224 at a third connecting point 225 and a fourth connecting point 226, respectively.

Figure 12:
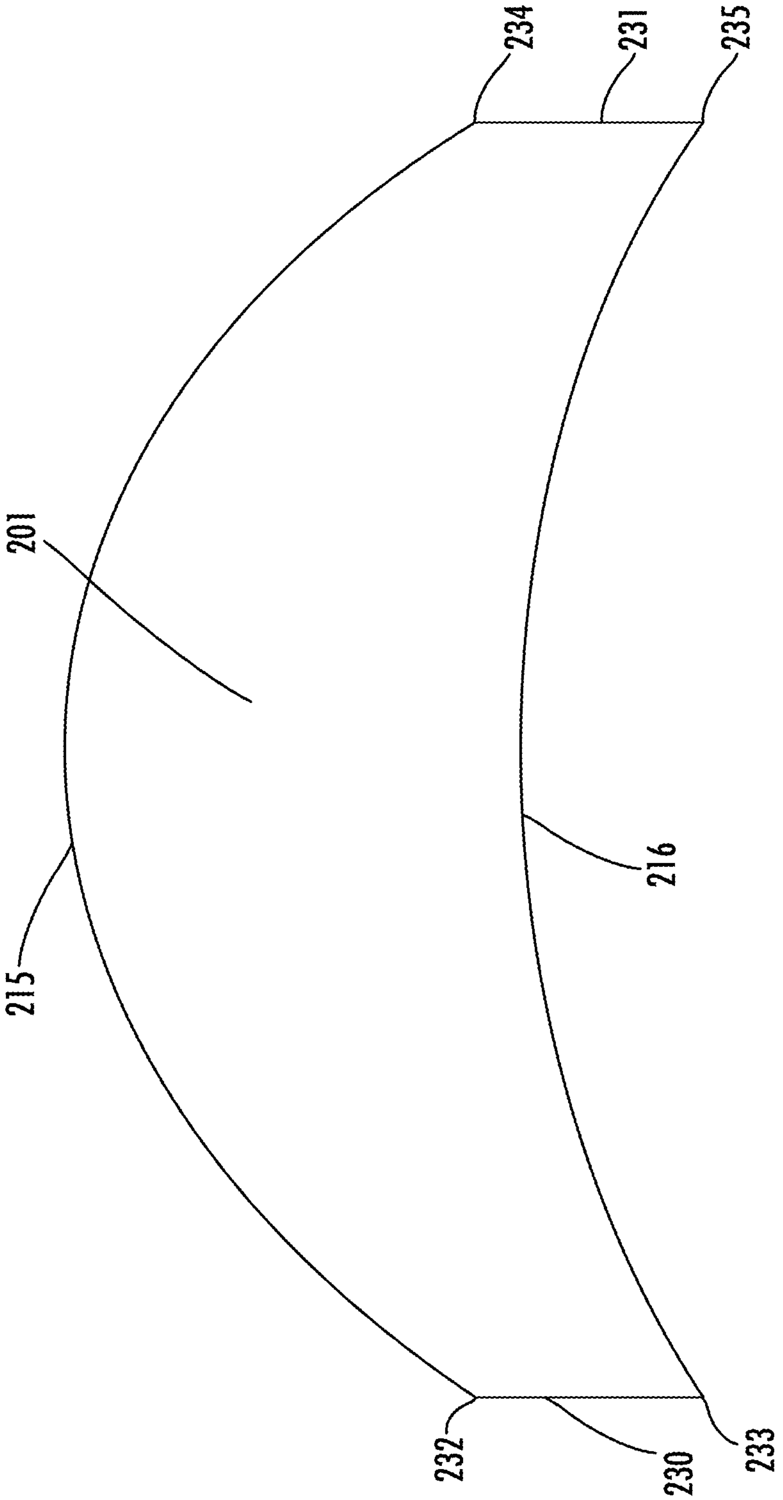
FIG. 12 is a front view of a second mixing plate, according to various embodiments.
Figure 13:
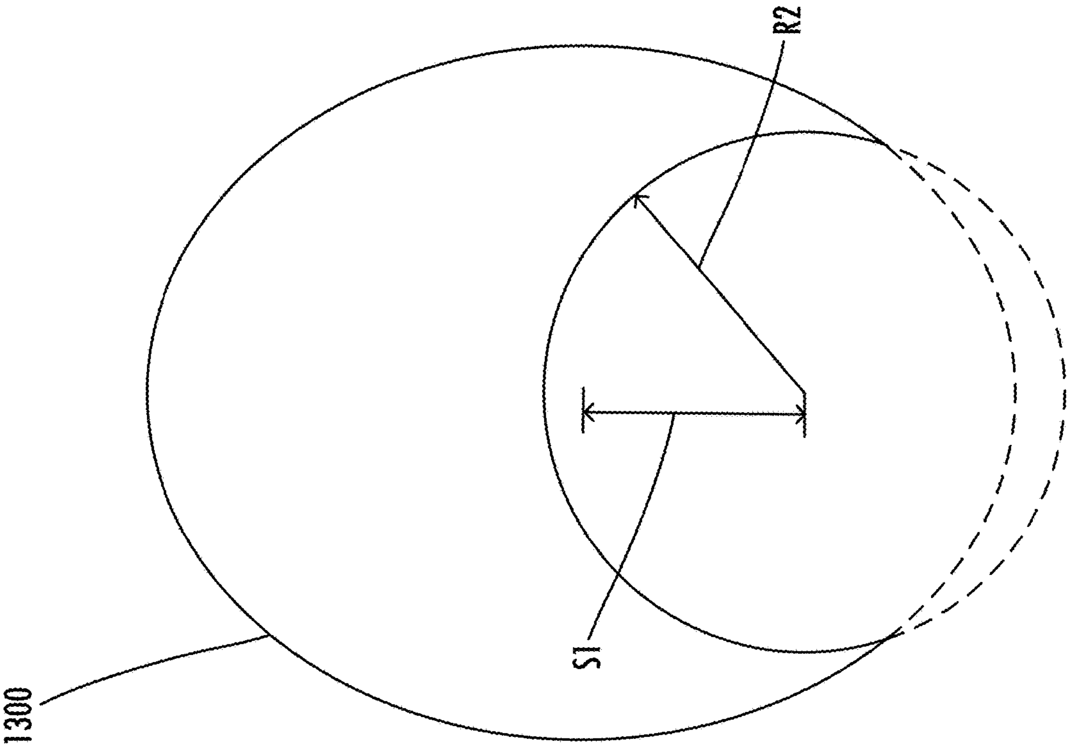
FIG. 13 is a front view of a first mixing plate, according to various embodiments.
Figure 14:
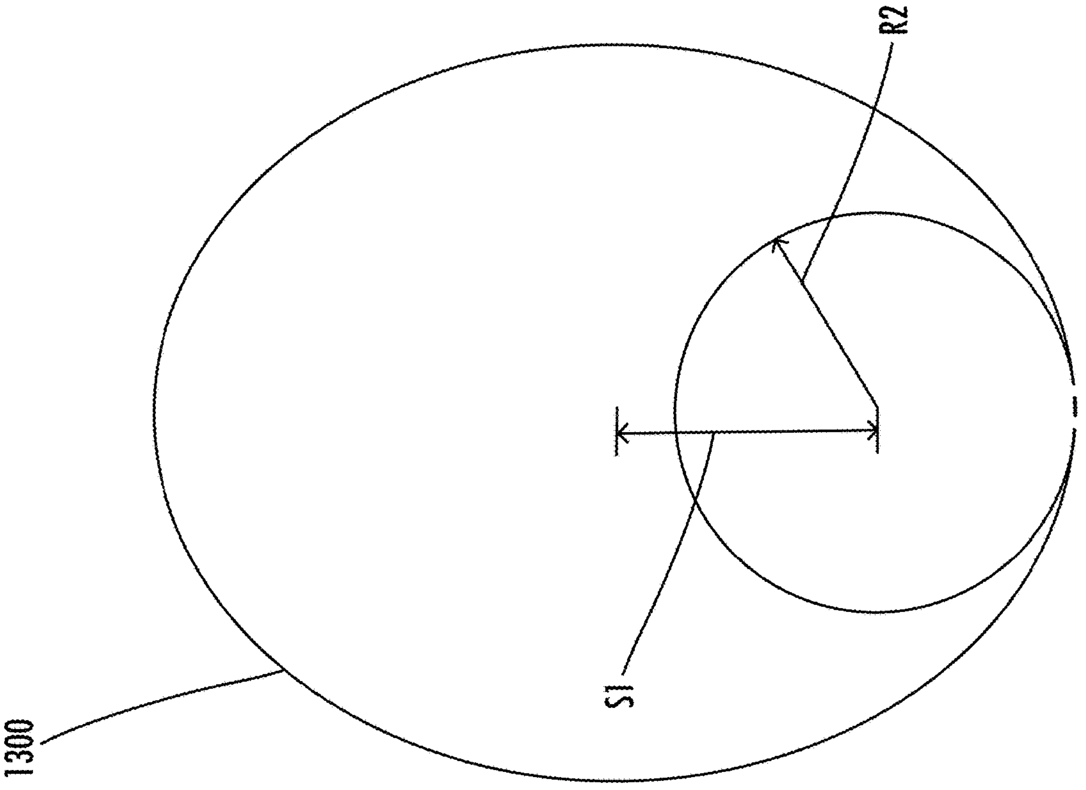
FIG. 14 is a front view of a first mixing plate, according to various embodiments.
Figure 15:
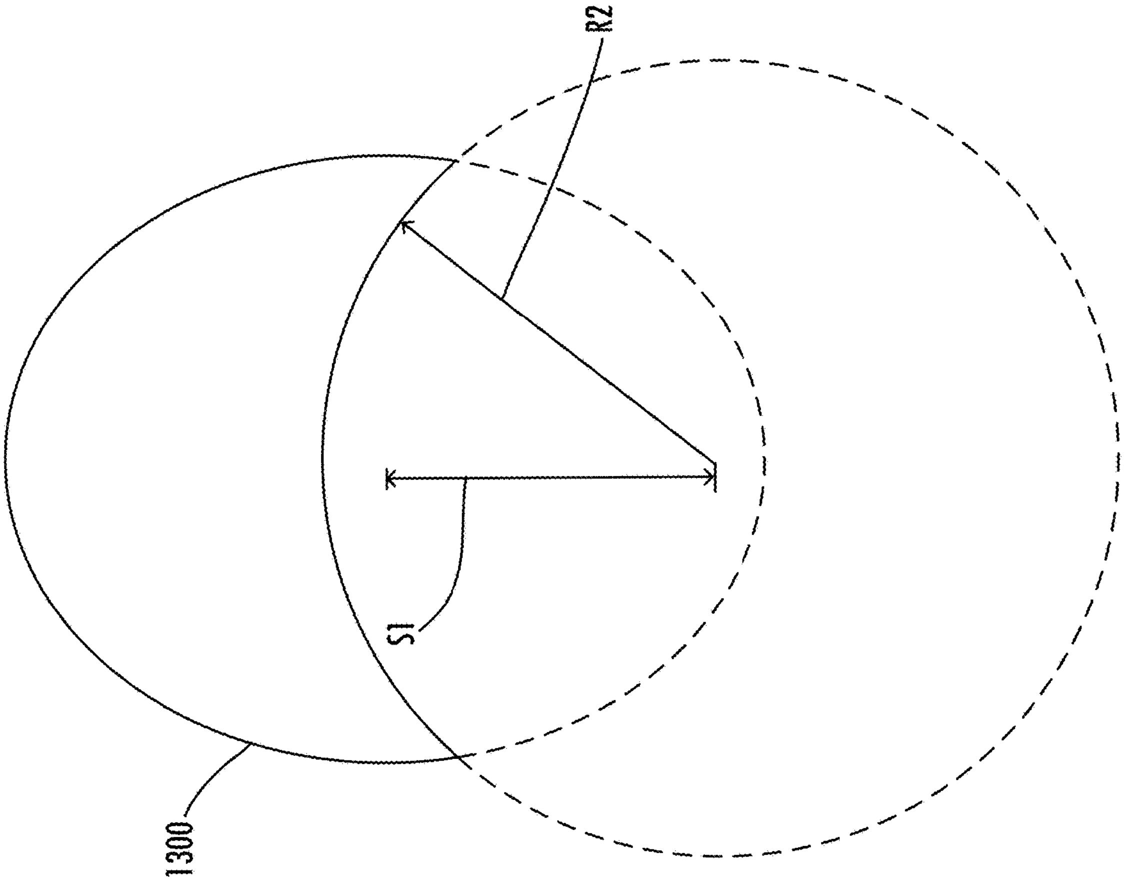
FIG. 15 is a front view of a first mixing plate, according to various embodiments.
Figure 16:
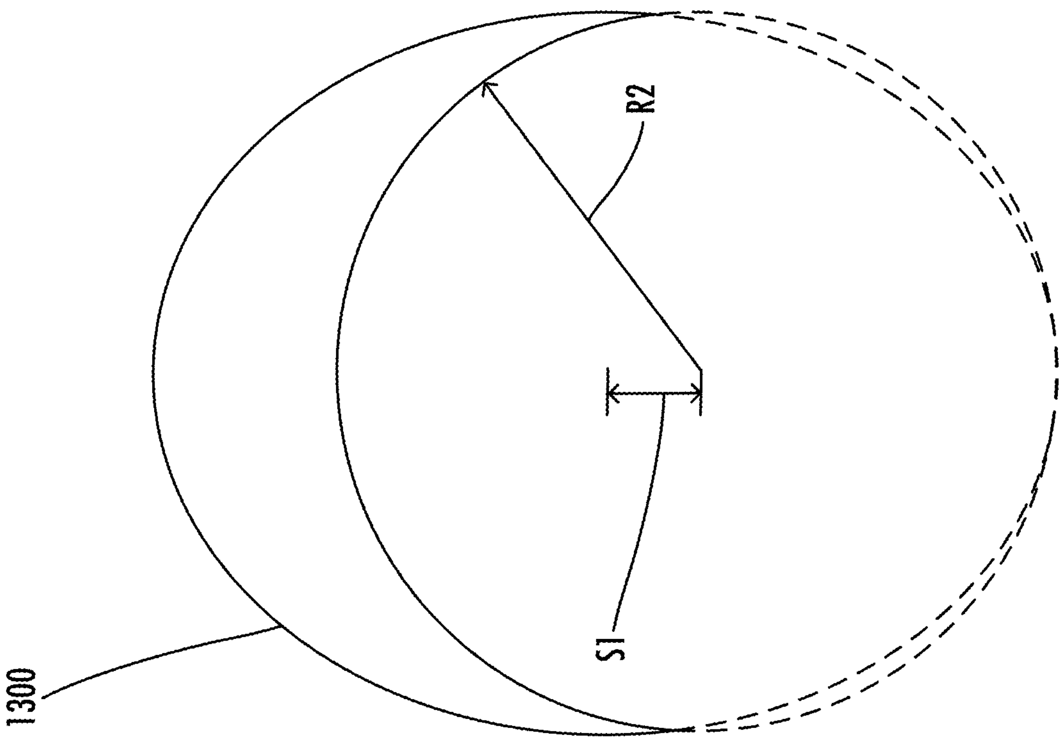
FIG. 16 is a front view of a first mixing plate, according to various embodiments.
Figure 17:
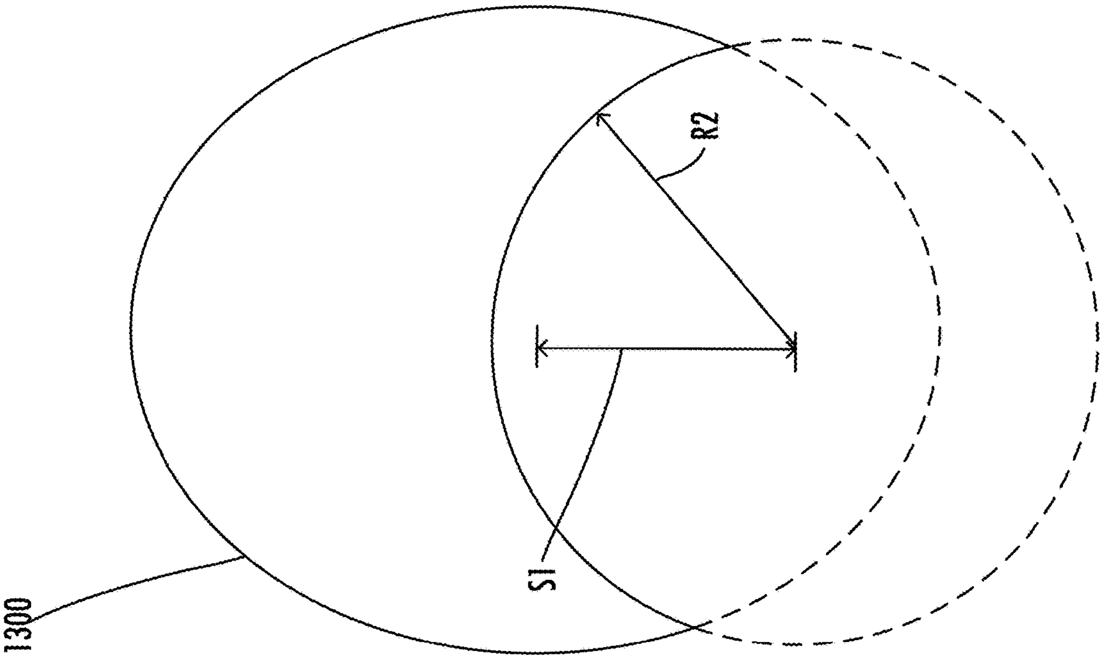
FIG. 17 is a front view of a first mixing plate, according to various embodiments.
Figure 18:
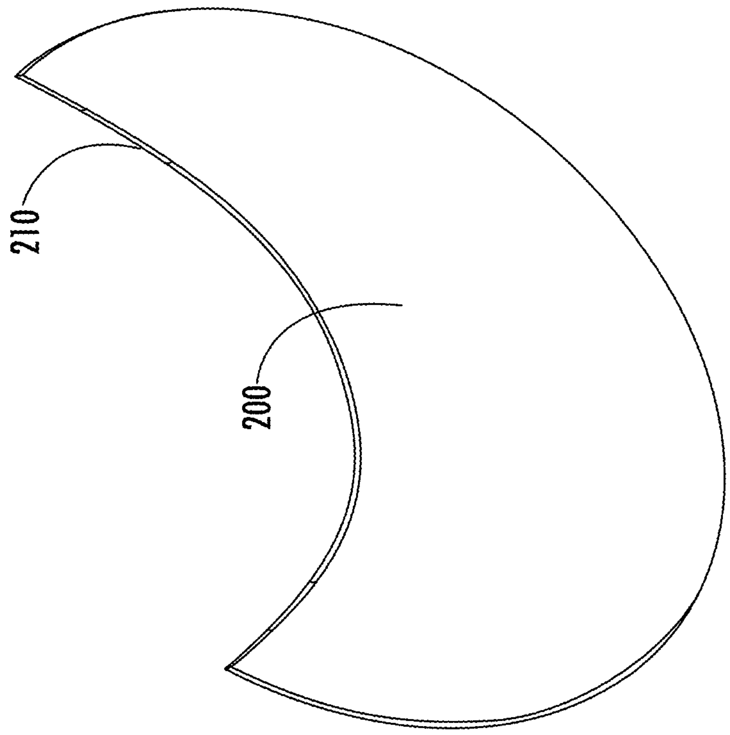
FIG. 18 is a perspective view of a first mixing plate, according to various embodiments.

FIG. 12 illustrates an embodiment of the second mixing plate 201 being a truncated crescent shape with a third connecting edge 230 and a fourth connecting edge 231. The second plate convex edge 215 and second plate concave edge 216 intersect the third connecting edge 230 at a fifth connecting point 232 and a sixth connecting point 233, respectively. The second plate convex edge 215 and second plate concave edge 216 intersect the fourth connecting edge 231 at a third connecting point 234 and a fourth connecting point 2356, respectively.

The aforementioned connecting edges may be straight (e.g., linear), circular, or an irregular geometric shape (e.g., a line that bends/curves between the distal and proximal end). The mixer 121 may possess a combination of crescent shaped mixing plates which have convex and concave edges that intersect at a point (e.g., as shown in FIG. 4), and crescent shaped mixing plates with boundaries (e.g., as shown in FIGS. 11 and 12).

The first mixing plate 200 is formed from a blank 1300 (e.g., stamping, etc.). The blank 1300 is elliptical such that the first plate convex edge 209 extends along the tubular conduit 108. The blank 1300 cannot be circular because of the angle A1 at which the first mixing plate 200 is located. The blank 1300 is shown in FIGS. 13-19, according to various embodiments. The tubular conduit 108 has a first radius R1. The first mixing plate 200 has a longest diameter and a shortest diameter. In various embodiments, the shortest diameter of the first mixing plate 200 is equal 2R1.

In FIGS. 13-17, the first plate concave edge 210 is formed using a cut formed by a single circle with a second radius R2. In various embodiments, R2 is between 0.55R1 and 2R1, inclusive. In some embodiments, R2 is equal to R1.

The single circle is located such that a center of the single circle is separated from a center of the blank 1300 by a first separation S1. S1 is less than R2. Additionally, the first mixing plate 200 is configured such that 0.01(R2−S1) and 0.9(R2−S1), inclusive. In various embodiments, R2−S1 is equal to 0.15T, where T is the longest diameter of the blank 1300.

The first mixing plate 200 can be tailored for a target application by varying R2 and S1. FIGS. 13-17 illustrate various variations of the first mixing plate 200 with different R2 and S1.

Figure 19:
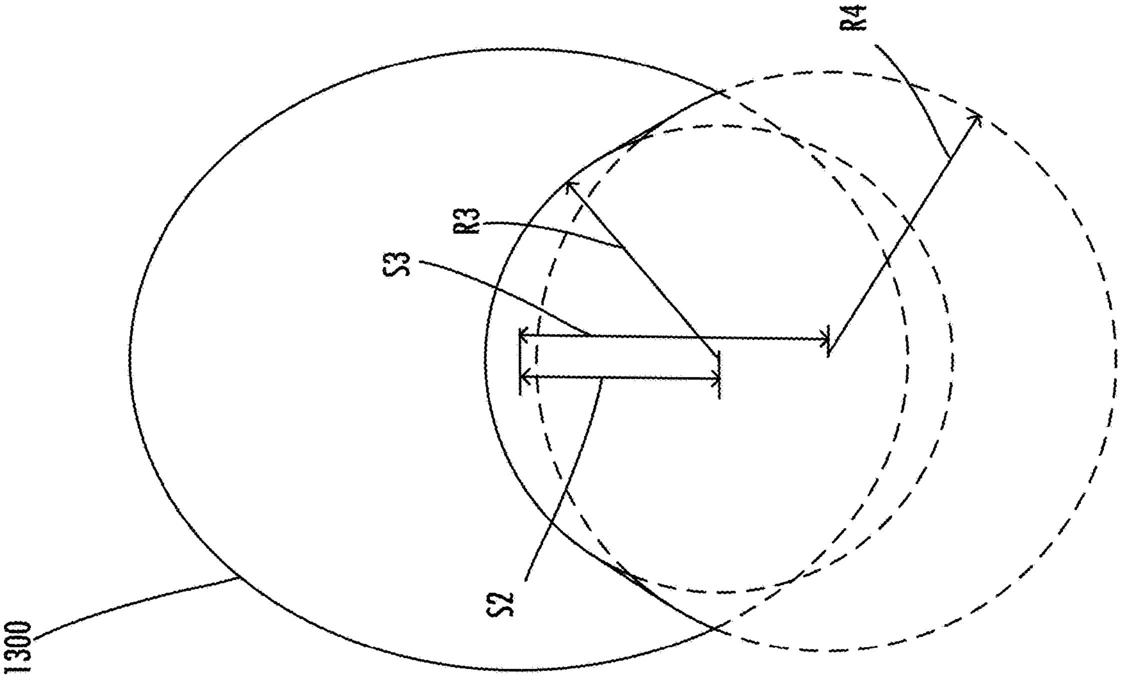
FIG. 19 is a front view of a first mixing plate, according to various embodiments.

FIG. 19 illustrates an embodiment where the first plate concave edge 210 is formed using a cut formed by a second circle with a second radius R3 and a third circle with a third radius R4. Use of two circles to form the first plate concave edge 210 rather than one circle provides additional capabilities for fine tuning performance of the first mixing plate 200, such as the impact of the first mixing plate 200 on increasing back pressure and adjusting intensity of swirl provided by the first mixing plate 200. The first plate concave edge 210 includes two flat portions that extend between the second circle and the first circle adjacent junctions between the second circle and the first circle. These flat portions enable removal of a point that otherwise extends along the junction between the second circle and the first circle.

The center of the second circle is separated from the center of the blank 1300 by a second separation S2, and the center of the third circle is separated from the center of the second circle by a third separation S3. R3 is less than R4. S2 is less than R3, and S3 is less than R4. Additionally, S2 is less than S3.

The blank 1300 is cut (e.g., using a punch, using a laser, etc.) such that material overlapped by the first circle and material overlapped by the second circle is removed. This removal forms the first plate concave edge 210, which has three portions, two of which are arcs of the second circle and one of which is an arc of the first circle. The arc of the first circle is positioned between the two arcs of the second circle. The two sections of the first plate concave edge 210 adjoining the arc of the first circle to the arcs of the second circle includes flat portions that avoid creation of points between the arc of the first circle and the arcs of the second circle.

Figure 20:
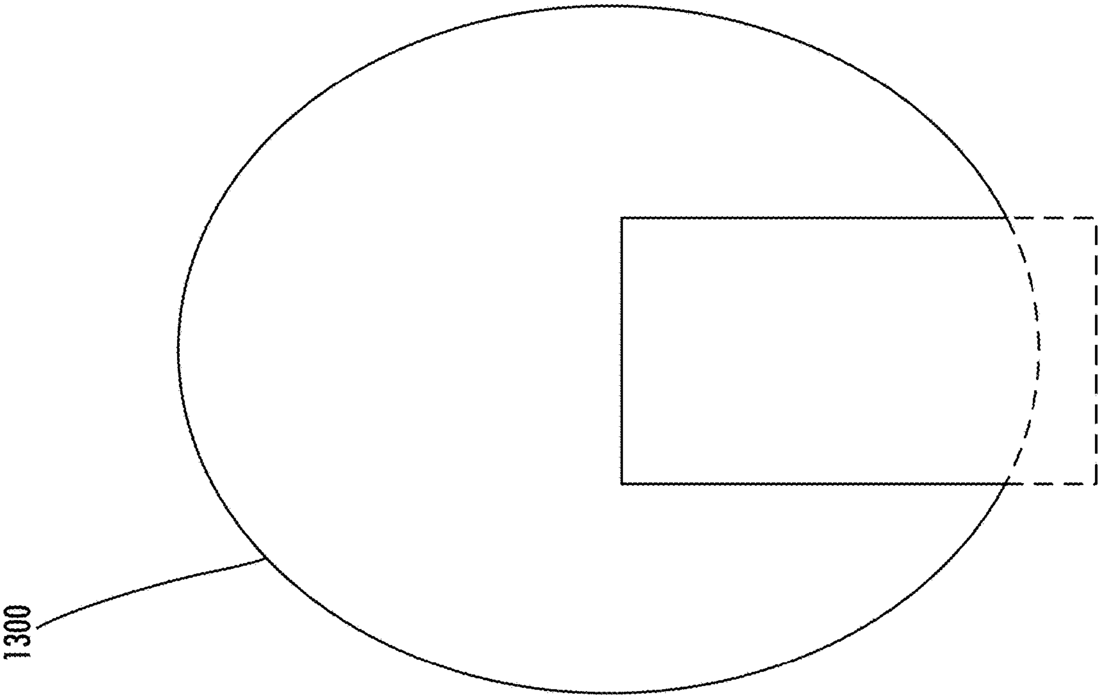
FIG. 20 is a front view of a first mixing plate, according to various embodiments.
Figure 21:
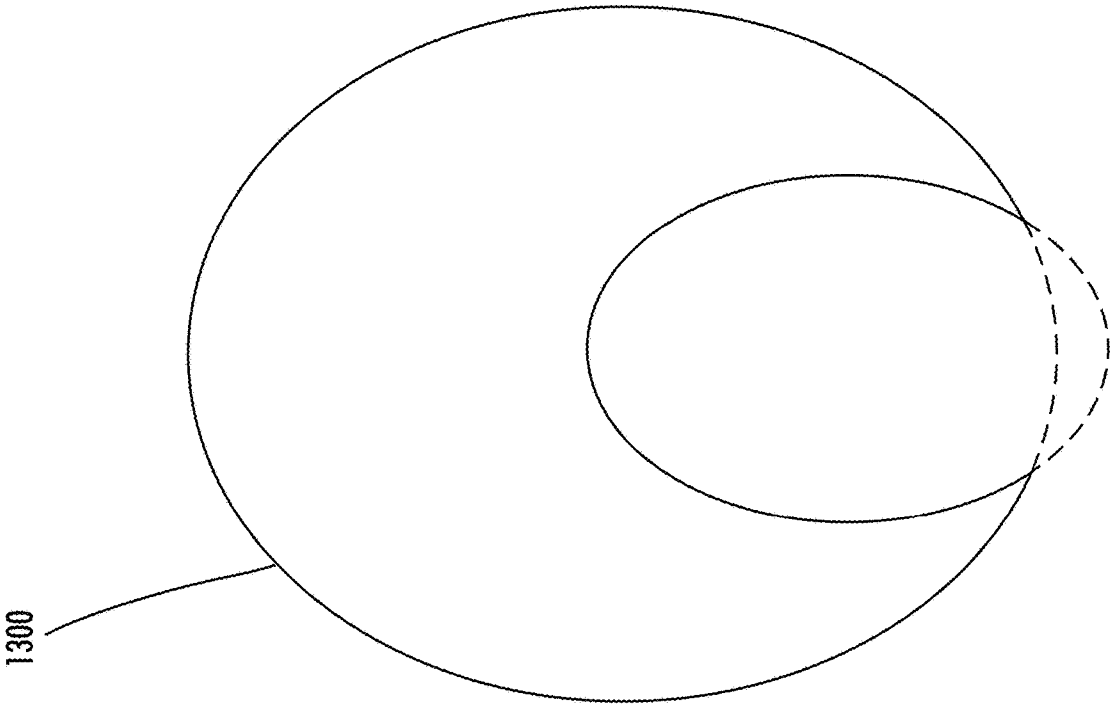
FIG. 21 is a front view of a first mixing plate, according to various embodiments.

FIGS. 20 and 21 illustrate formation of the first plate concave edge 210 using a cut formed by a non-circular shape (e.g., square, rectangle, ellipse, triangular, etc.). Use of a non-circular shape to form the first plate concave edge 210 rather than one or more circles provides an ability to tune the back pressure and/or intensity of swirl while providing a mechanism for increasing impingement of particles on the first mixing plate 200.

Figure 22:
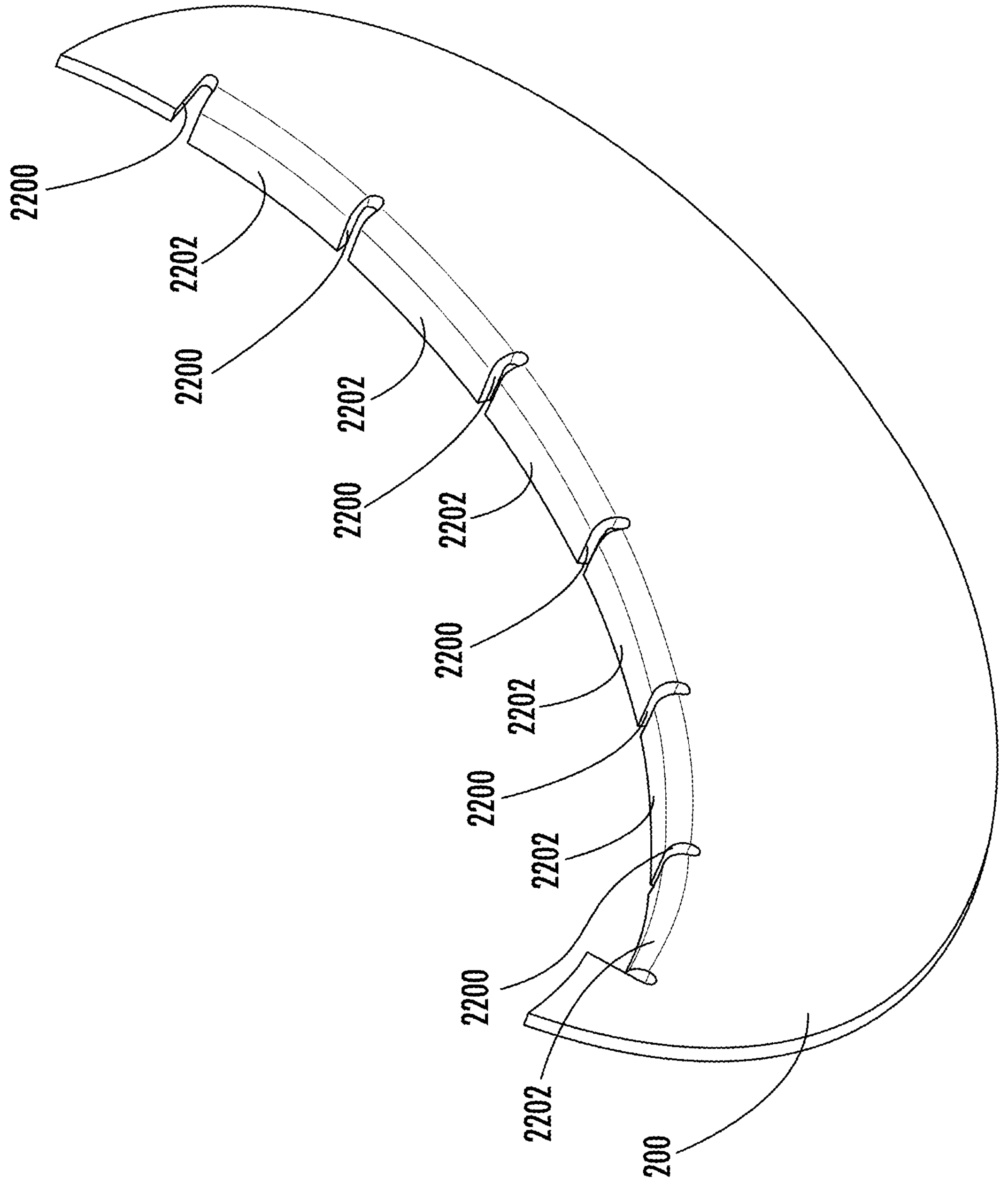
FIG. 22 is a perspective view of a first mixing plate, according to various embodiments.
Figure 23:
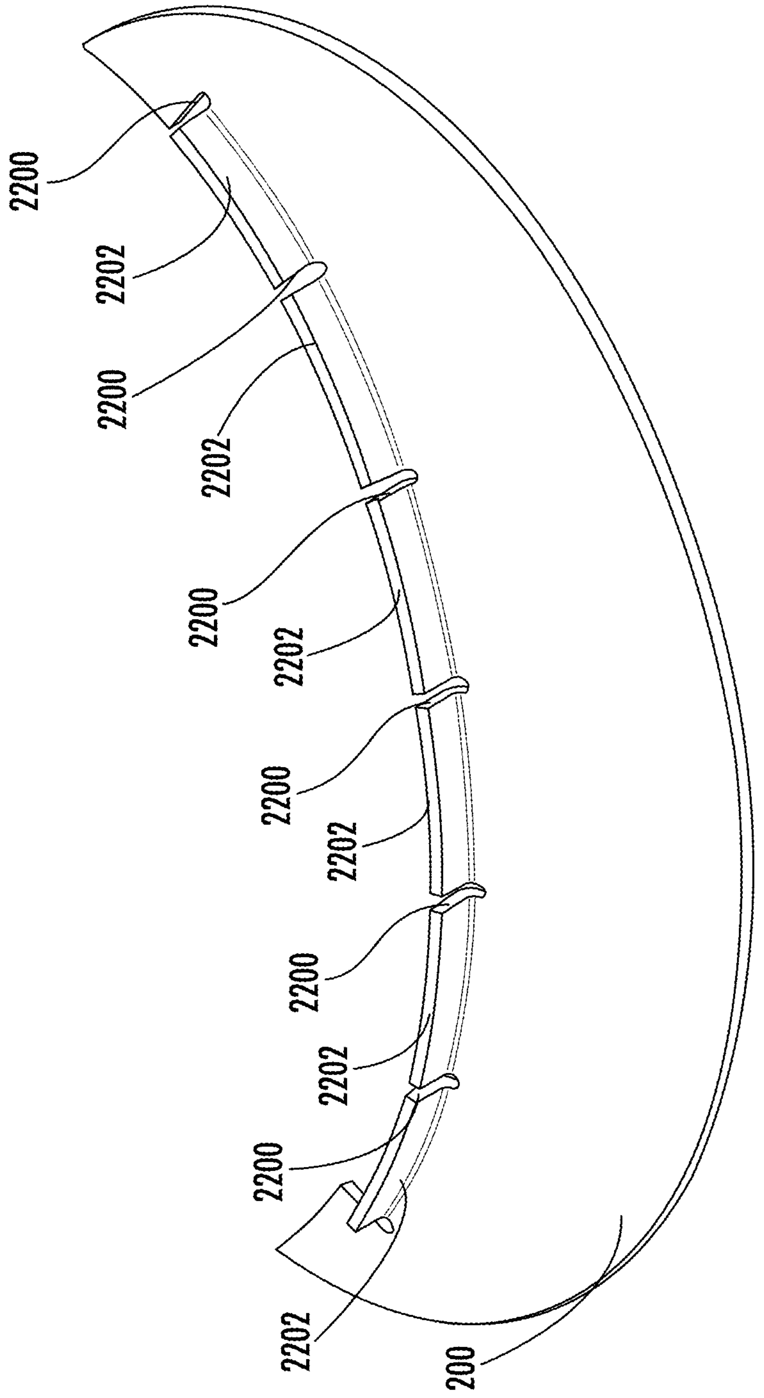
FIG. 23 is a perspective view of a first mixing plate, according to various embodiments.

FIGS. 22 and 23 illustrate the first mixing plate 200 according to various embodiments where the first plate concave edge 210 includes a plurality of edge slots 2200 (e.g., cuts, etc.) and a plurality of edge tabs 2202 (e.g., flanges, baffles, etc.). Each of the edge tabs 2202 is positioned between two of the edge slots 2200. The edge slots 2200 enable each of the edge tabs 2202 to be bent (e.g., deflected, etc.) away from a body of the first mixing plate 200.

By variously bending each of the edge tabs 2202, an impact of the first plate concave edge 210 on the exhaust gas can be tailored for a target application. For example, the amount of tumble provided to the exhaust gas by each of the edge tabs 2202 is related to, and therefore can be controlled by, the amount to which each of the edge tabs 2202 is bent. By increasing the bend, increased tumble to the exhaust gas may be provided. Moreover, the location of these increases can be controlled by bending some of the edge tabs 2202 different amounts. For example, the edge tabs 2202 at the ends of the first plate concave edge 210 may be bent more than the edge tabs 2202 between the ends of the first plate concave edge 210. In various embodiments, each of the edge tabs 2202 is bent an angle Y away from the body of the first mixing plate 200, where Y is −90° to 90°, inclusive.

The edge tabs 2202 may also be bent in different directions relative to the body of the first mixing plate 200. For example, some of the edge tabs 2202 may be bent in a clockwise direction and extend over a first side of the body of the first mixing plate 200 while others of the edge tabs 2202 may be bent in a counterclockwise direction and extend over a second side of the body of the first mixing plate 200, where the second side is opposite the first side. The shape, size, and arrangement of the edge tabs 2202 may be variously selected such that the first mixing plate 200 is tailored for a target application. Additionally, the edge tabs 2202 can provide a direct impingement device, which may increase decomposition of the treatment fluid and improve efficiency of components of the exhaust aftertreatment system 100, such as the catalyst member 110.

Each of the edge slots 2200 is defined by a length W. In various embodiments, W is between 0.02R1 and 0.2 R1, inclusive. Some of the edge slots 2200 may have larger W than others of the edge slots 2200, thereby enabling one or more of the edge tabs 2202 to be bent a larger amount than others of the edge tabs 2202.

Figure 24:
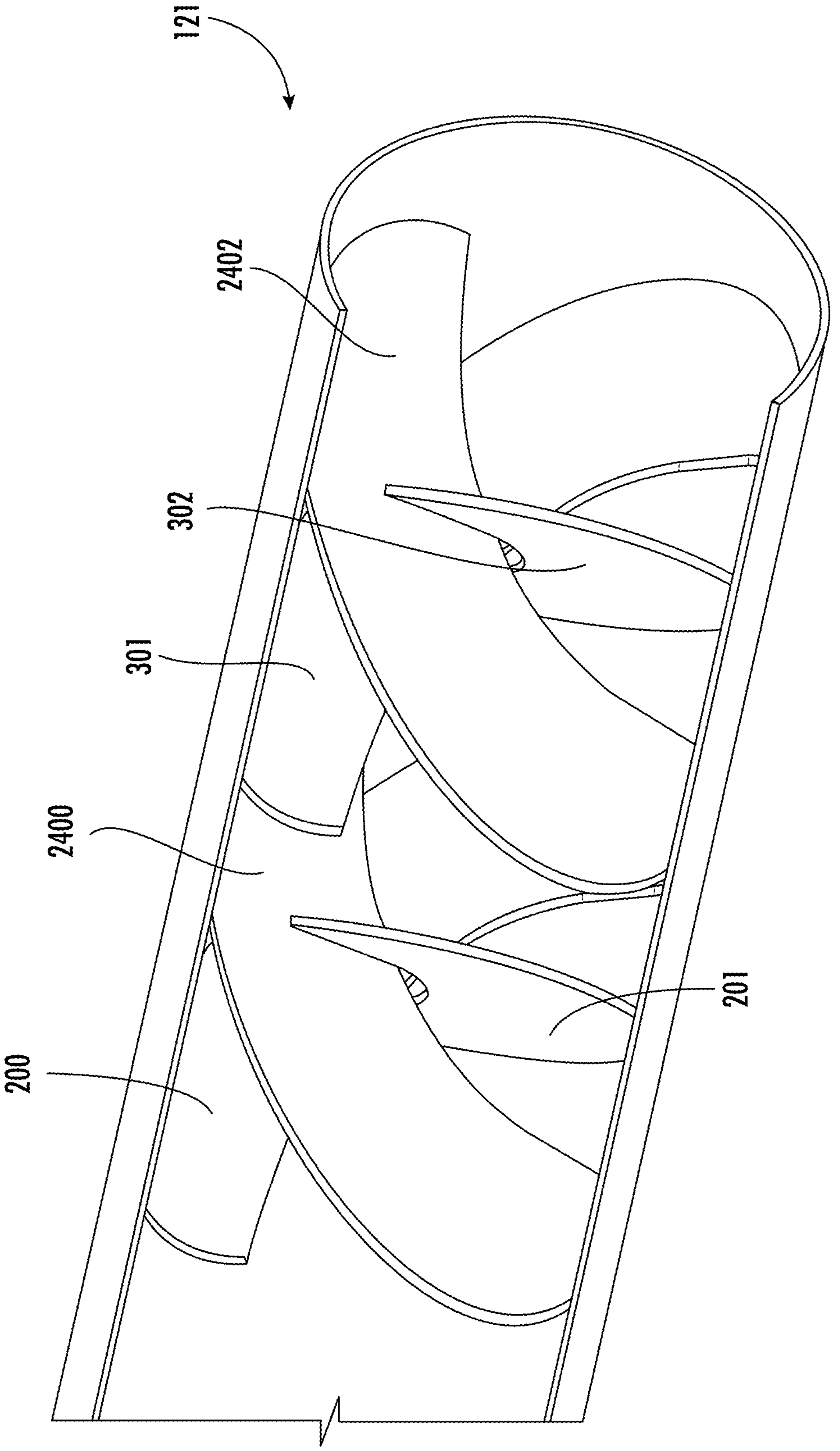
FIG. 24 is a perspective view of the exhaust aftertreatment system of FIG. 3 with a portion of a tubular conduit hidden, according to various embodiments.
Figure 25:
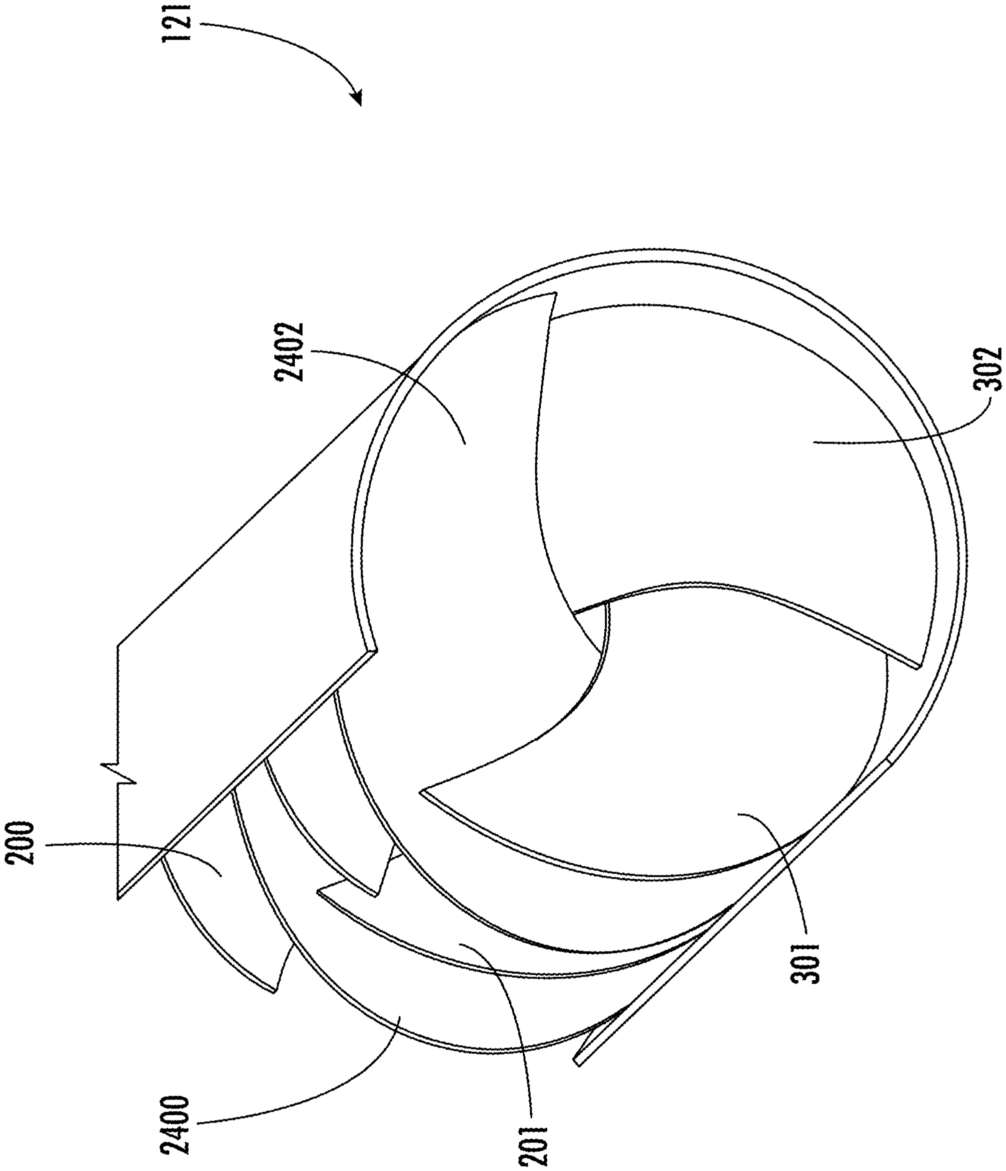
FIG. 25 is another perspective view of the exhaust aftertreatment system of FIG. 3 with a portion of a tubular conduit hidden, according to various embodiments.

FIGS. 24 and 25 illustrate the mixer 121 including the third mixing plate 301, the fourth mixing plate 302, as well as a fifth mixing plate 2400 and a sixth mixing plate 2402. The fifth mixing plate 2400 is positioned between the first mixing plate 200 and the second mixing plate 201, and the sixth mixing plate 2402 is positioned between the third mixing plate 301 and the fourth mixing plate 302. This creates an overlap between the fifth mixing plate 2400 and both the first mixing plate 200 and the second mixing plate 201, as well as an overlap between the sixth mixing plate 2402 and both the third mixing plate 301 and the fourth mixing plate 302. As discussed above, each of the mixing plates can be variously configured and positioned within the tubular conduit 108 such that the mixer 121 is tailored for a target application.

For example, the mixing plates can be grouped in sets, such as a first set including the first mixing plate 200, the second mixing plate 201, and the fifth mixing plate 2400, and a second set including the third mixing plate 301, the fourth mixing plate 302, and the sixth mixing plate 2402. The angular position of each mixing plate about the central axis 205 of the tubular conduit 108 can be based on to the number of mixing plates in the set divided by 360°. For example, where three mixing plates are included in a set, such as is shown in FIG. 24 with the first mixing plate 200, the second mixing plate 201, and the fifth mixing plate 2400, each mixing plate is separated from another mixing plate by 120°. This results in a complete rotation of the exhaust gas through the set of mixing plates.

Figure 26:
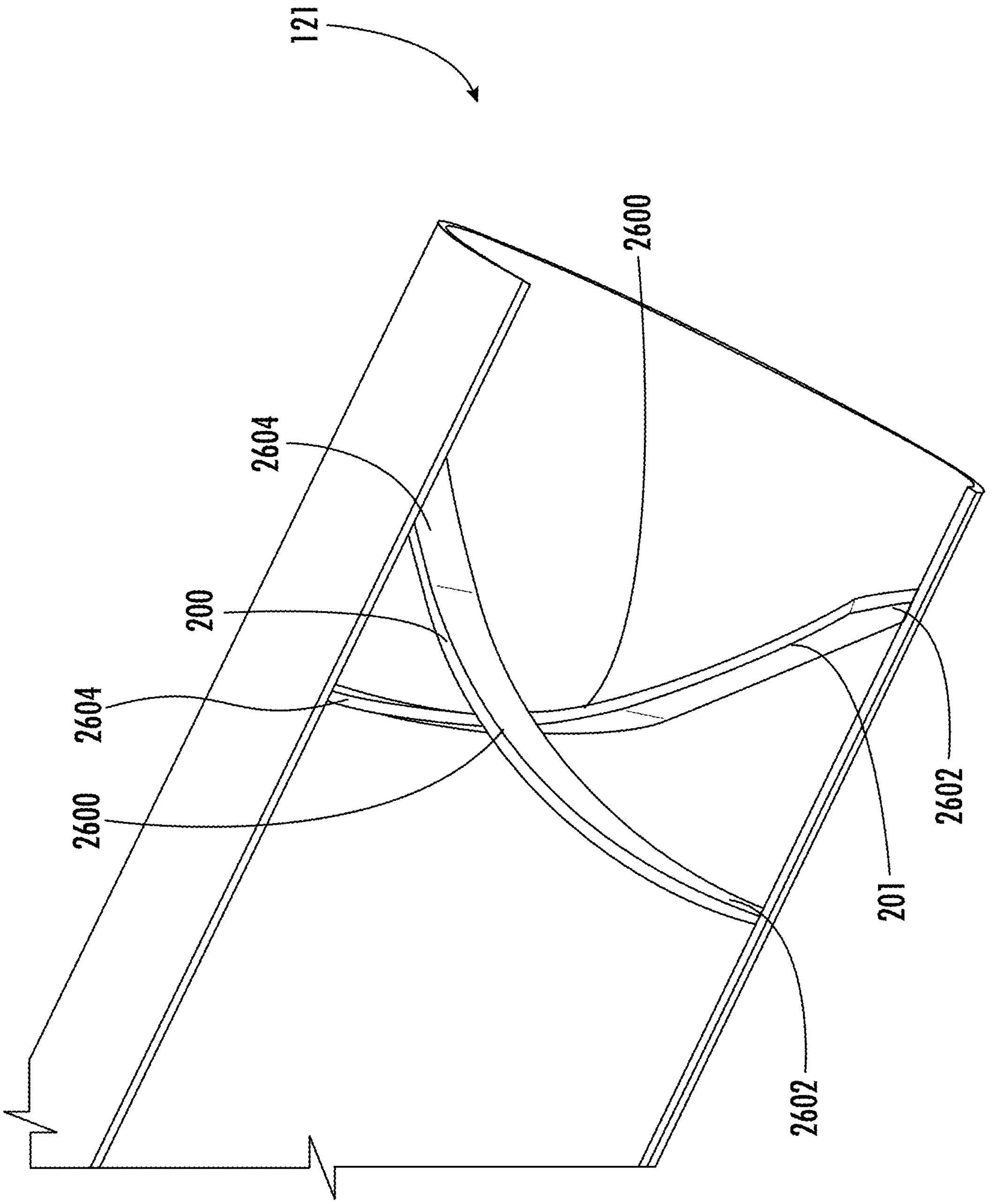
FIG. 26 is a perspective view of the exhaust aftertreatment system of FIG. 3 with a portion of a tubular conduit hidden, according to various embodiments.
Figure 27:
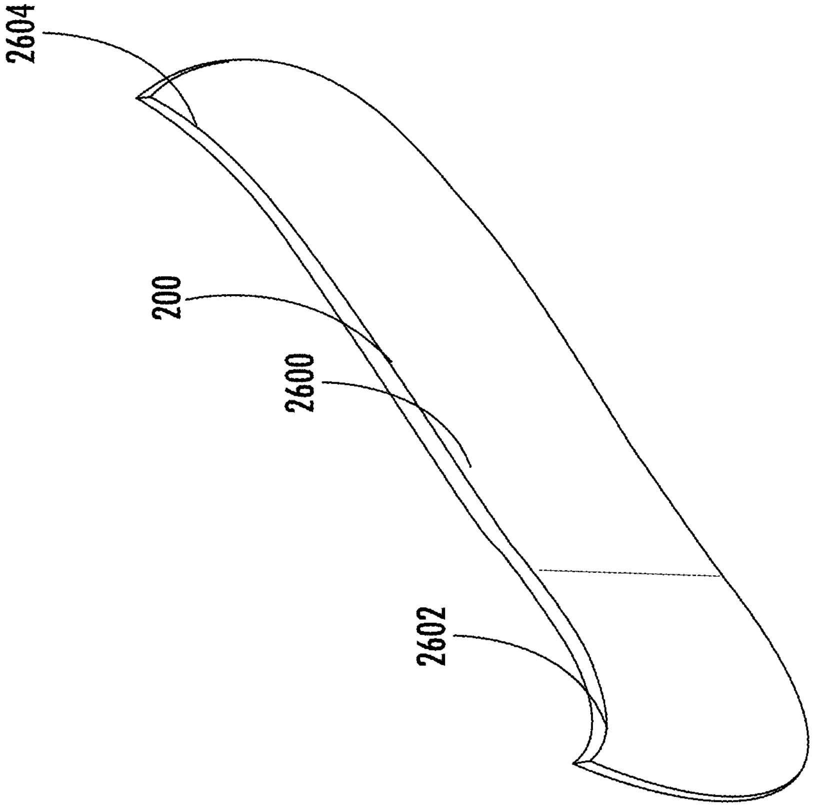
FIG. 27 is a perspective view of a first mixing plate, according to various embodiments.
Figure 28:
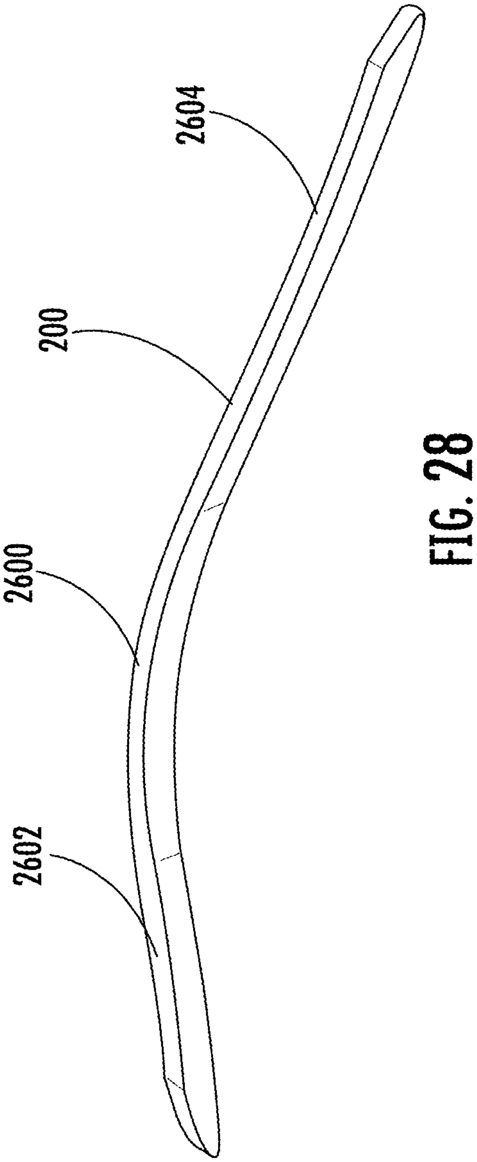
FIG. 28 is a perspective view of a first mixing plate, according to various embodiments.
Figure 29:
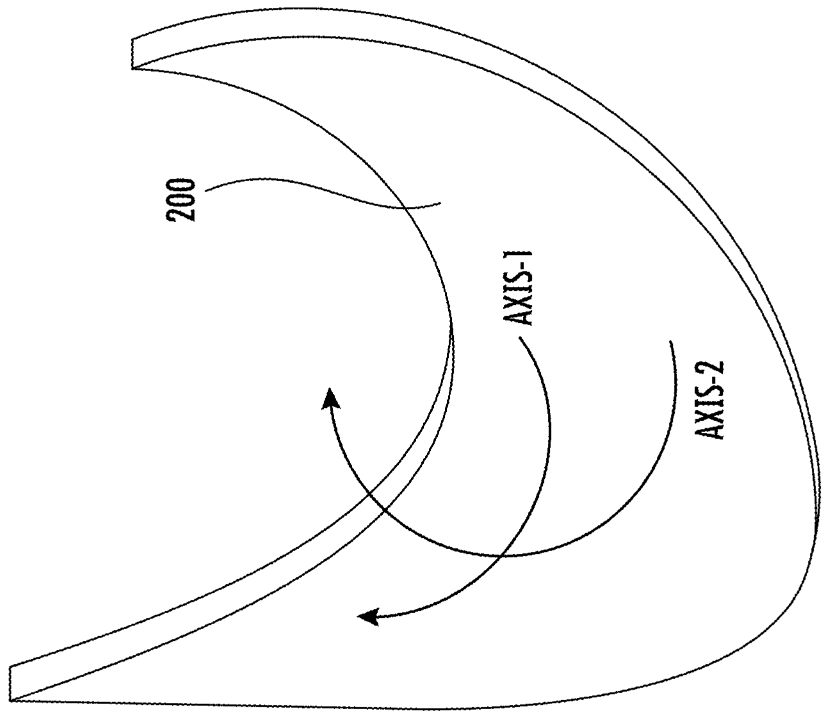
FIG. 29 is a perspective view of a first mixing plate, according to various embodiments.
Figure 30:
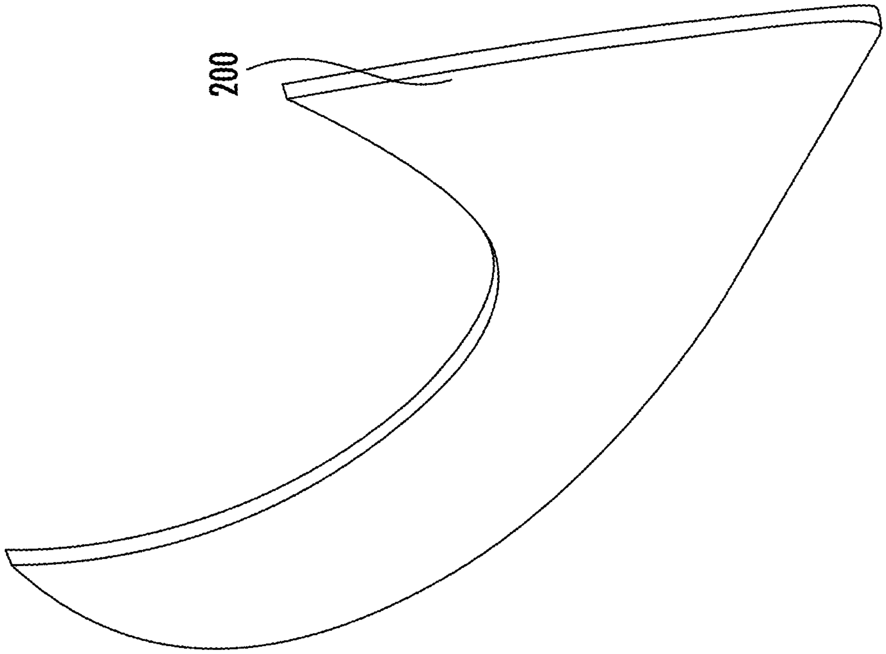
FIG. 30 is a perspective view of a first mixing plate, according to various embodiments.
Figure 31:
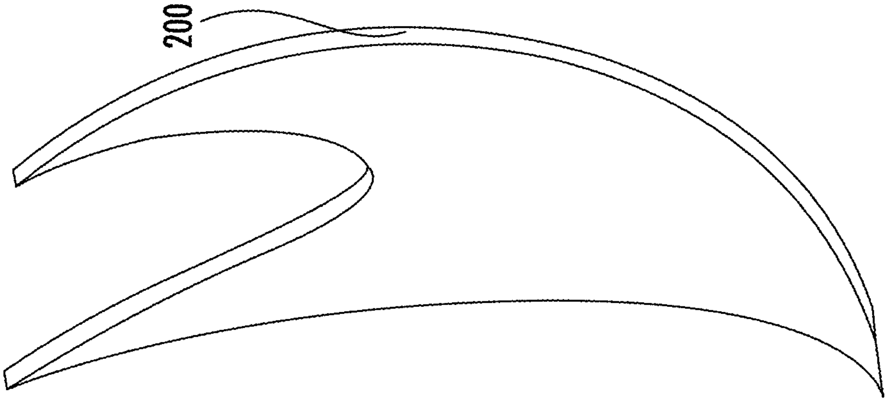
FIG. 31 is a perspective view of a first mixing plate, according to various embodiments.
Figure 32:
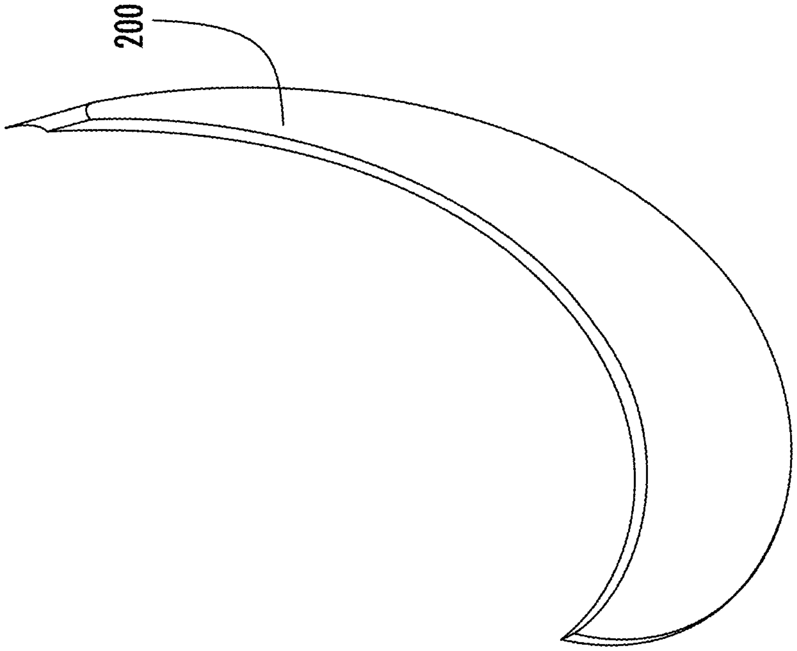
FIG. 32 is a perspective view of a first mixing plate, according to various embodiments.
Figure 33:
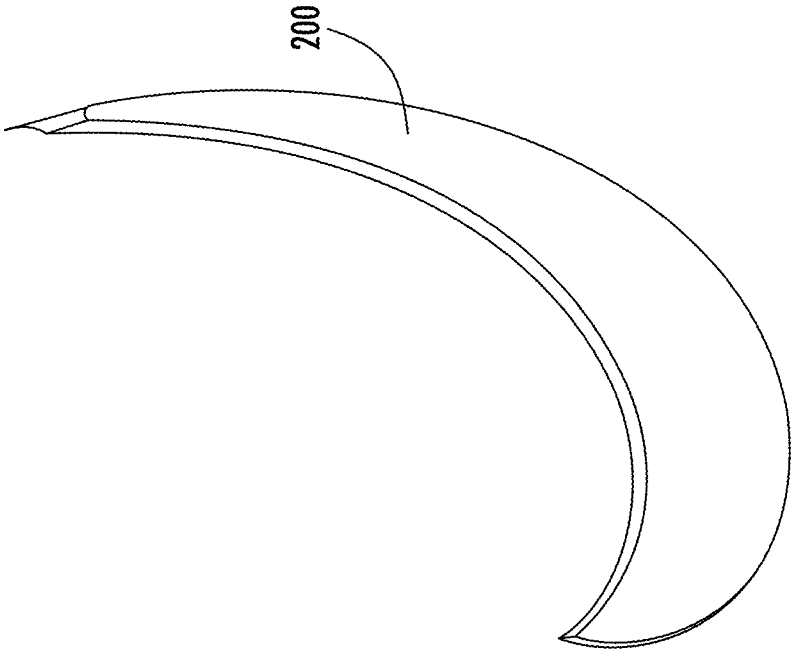
FIG. 33 is a perspective view of a first mixing plate, according to various embodiments.
Figure 34:
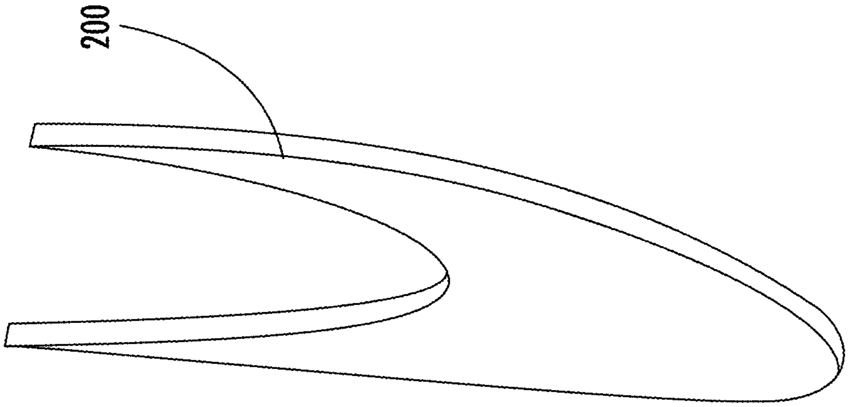
FIG. 34 is a perspective view of a first mixing plate, according to various embodiments.
Figure 35:
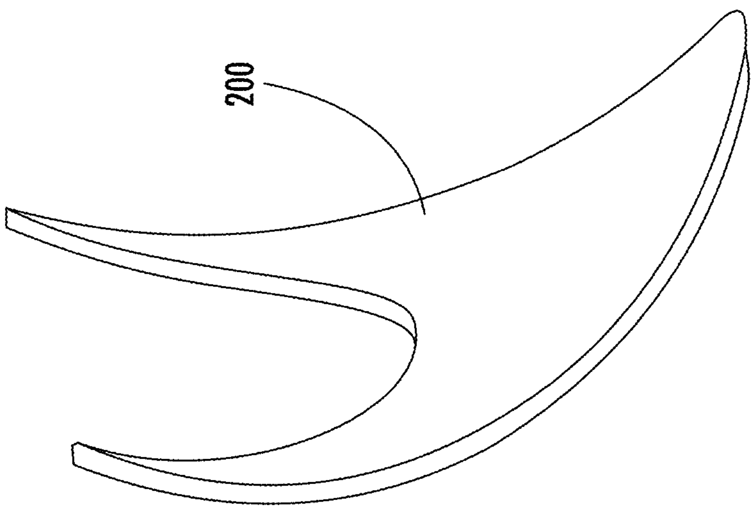
FIG. 35 is a perspective view of a first mixing plate, according to various embodiments.

FIGS. 26-28 illustrate another embodiment where the first mixing plate 200 and the second mixing plate 201 are profiled to include a bent portion 2600 (e.g., curved portion, etc.) between a first end portion 2602 and a second end portion 2604. The bent portion 2600 enables the first end portion 2602 and the second end portion 2604 to be positioned closer together or further apart when measured along the central axis 205 of the tubular conduit 108. Additional bent portions may be included such that a profile of the first mixing plate 200 can be tailored for a target application. Each of the bent portions may be bent an amount up to 90°, for example. The bent portion 2600 may enable the first mixing plate 200 to provide a relatively low pressure drop, which may be advantageous in various applications.

FIGS. 29-35 illustrate other embodiments where the first mixing plate 200 is bent along two axes to provide curved surfaces in multiple directions. In this embodiment, the axes are orthogonal, but other orientations of the axes, and additional axes, may be utilized such that the first mixing plate 200 is tailored for a target application.

The first mixing plate 200 is bent a first angular amount K1 around the first axes and a second angular amount K2 about the second axes. In various embodiments, K1 is greater than or equal to R1 and K2 is greater than or equal to R1. For example, K1 may be greater than R1 while K2 is equal to R1. In another example, K1 may be greater than R1 while K2 is equal to 5R1. This arrangement of the first mixing plate 200 provides fine tuning of the pressure drop and tumble provided by the first mixing plate 200. Additionally, this arrangement increases shear force across the first mixing plate 200 to mitigate formation of deposits on the first mixing plate.

Figure 36:
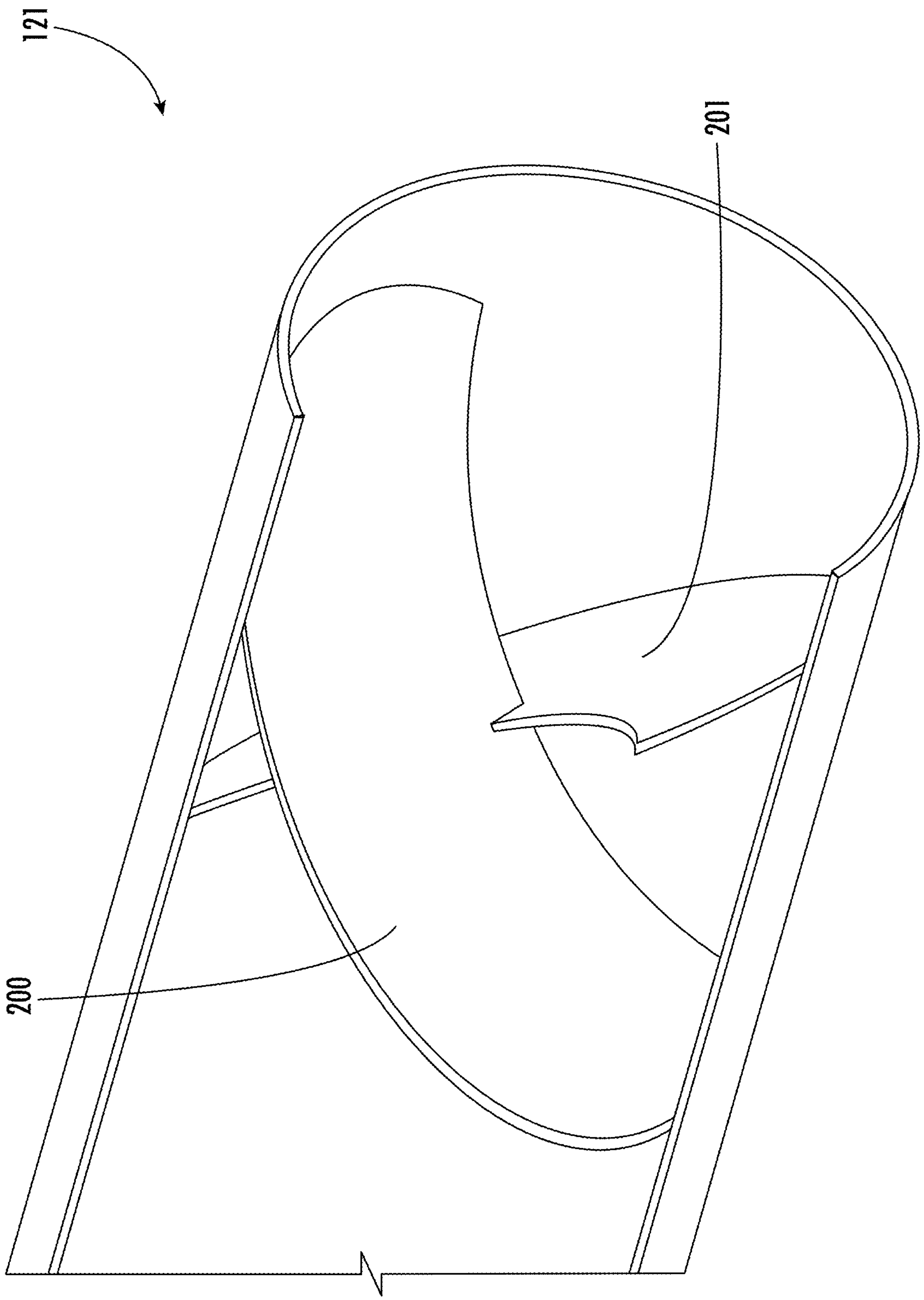
FIG. 36 is a perspective view of the exhaust aftertreatment system of FIG. 3 with a portion of a tubular conduit hidden, according to various embodiments.

FIG. 36 illustrates another embodiment where the first mixing plate 200 and the second mixing plate 201 intersect one another. This intersection increases bulk swirl intensity and reduces the tumble flow of the exhaust to an area of the first mixing plate 200 before the intersection. The depth of the intersection, and therefore the overlap of the first mixing plate 200 and the second mixing plate 201, is varied so as to tailor the mixer 121 for a target application. In various embodiments, the depth of the intersection is between 0.01R1 and 0.5R1, inclusive.

Figure 37:
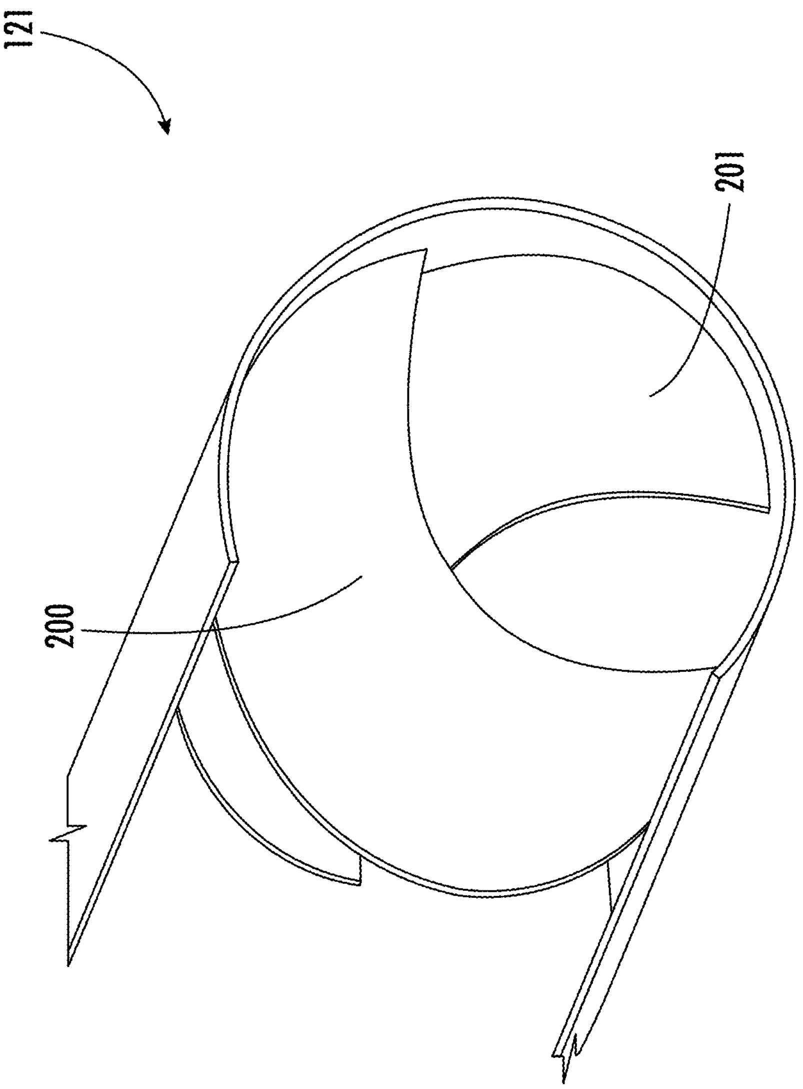
FIG. 37 is a perspective view of the exhaust aftertreatment system of FIG. 3 with a portion of a tubular conduit hidden, according to various embodiments.
Figure 38:
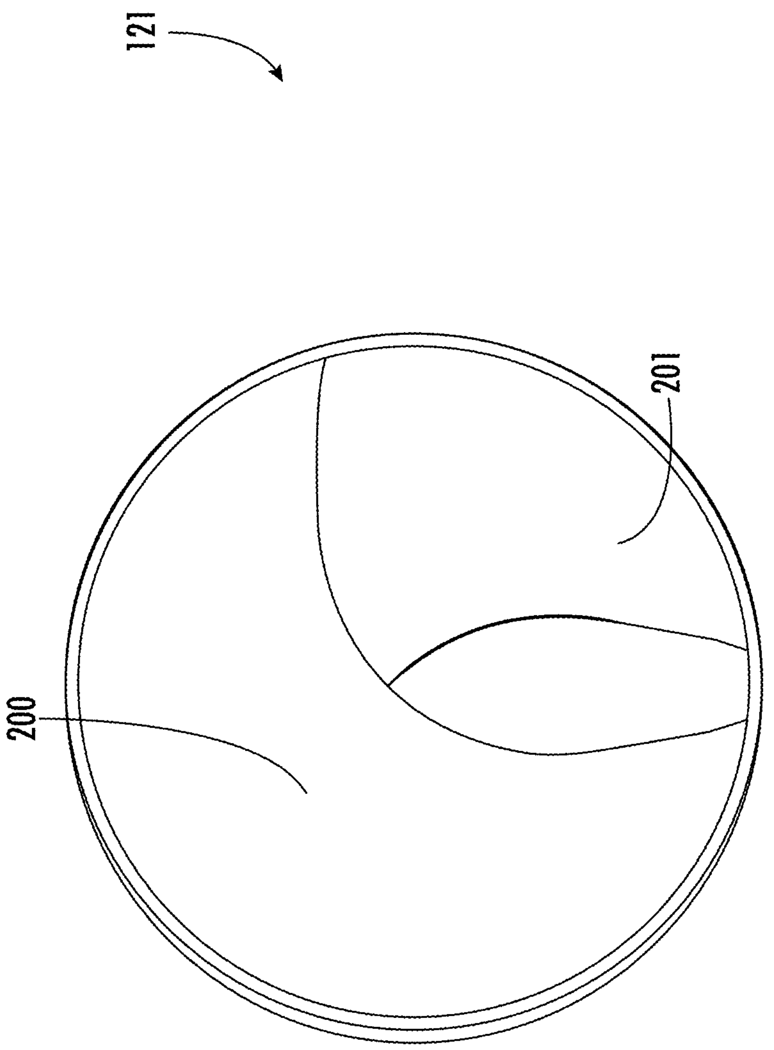
FIG. 38 is an end view of the exhaust aftertreatment system of FIG. 3, according to various embodiments.
Figure 39:
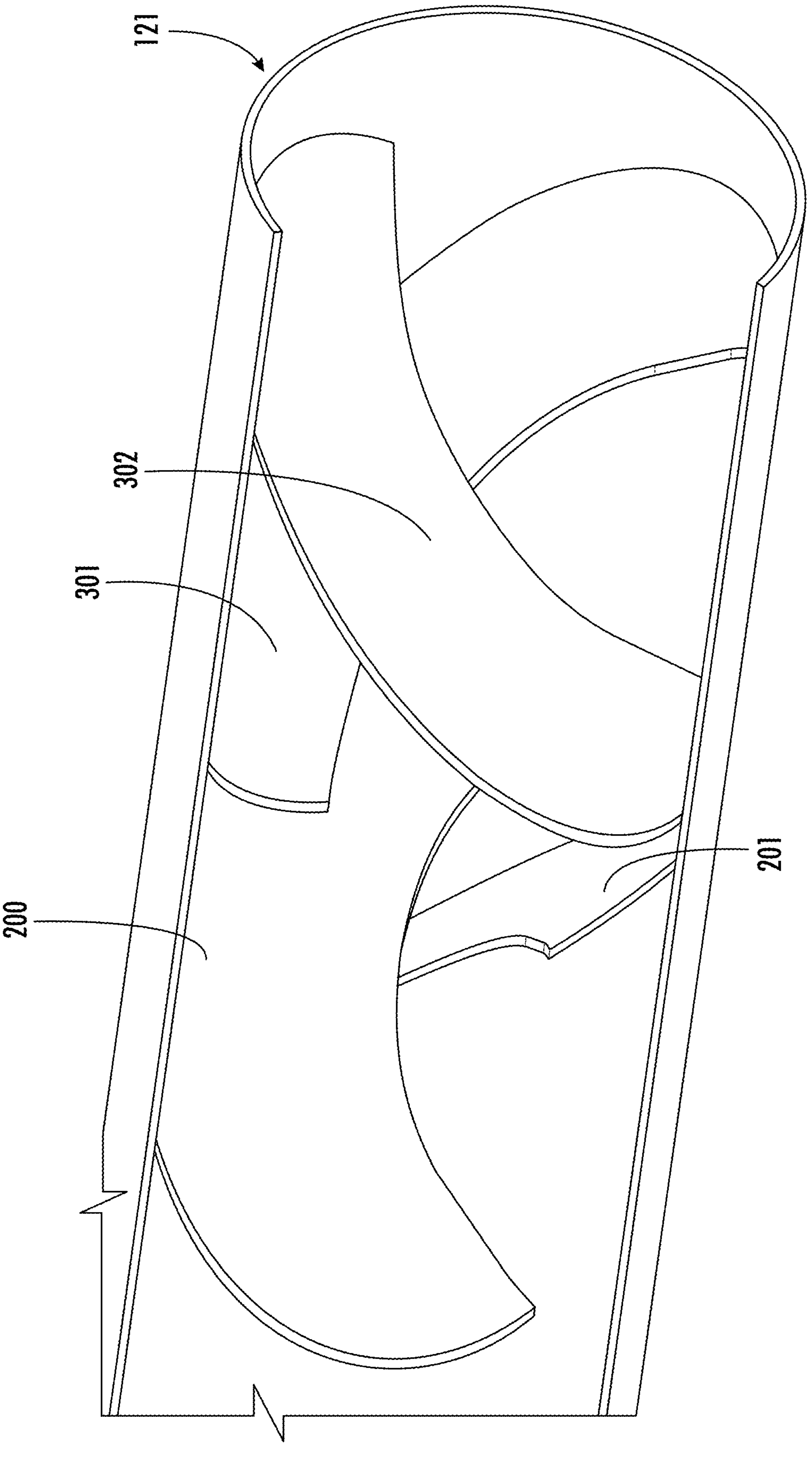
FIG. 39 is a perspective view of the exhaust aftertreatment system of FIG. 3 with a portion of a tubular conduit hidden, according to various embodiments.

FIGS. 37 and 38 illustrate another embodiment where the first mixing plate 200 and the second mixing plate 201 are rotated at angles about the central axis 205 of the tubular conduit 108 such that the mixer 121 is asymmetric when viewed from a downstream end or an upstream end. Such an arrangement may be beneficial when the inlet of the tubular conduit 108 receives asymmetrical flow. Additionally, such an arrangement may provide decreased backpressure, or provide desirable flow to the exhaust, which are desirable in various applications. FIGS. 39-45 illustrate a similar embodiment but additionally including the third mixing plate 301 and the fourth mixing plate 302.

Figure 40:
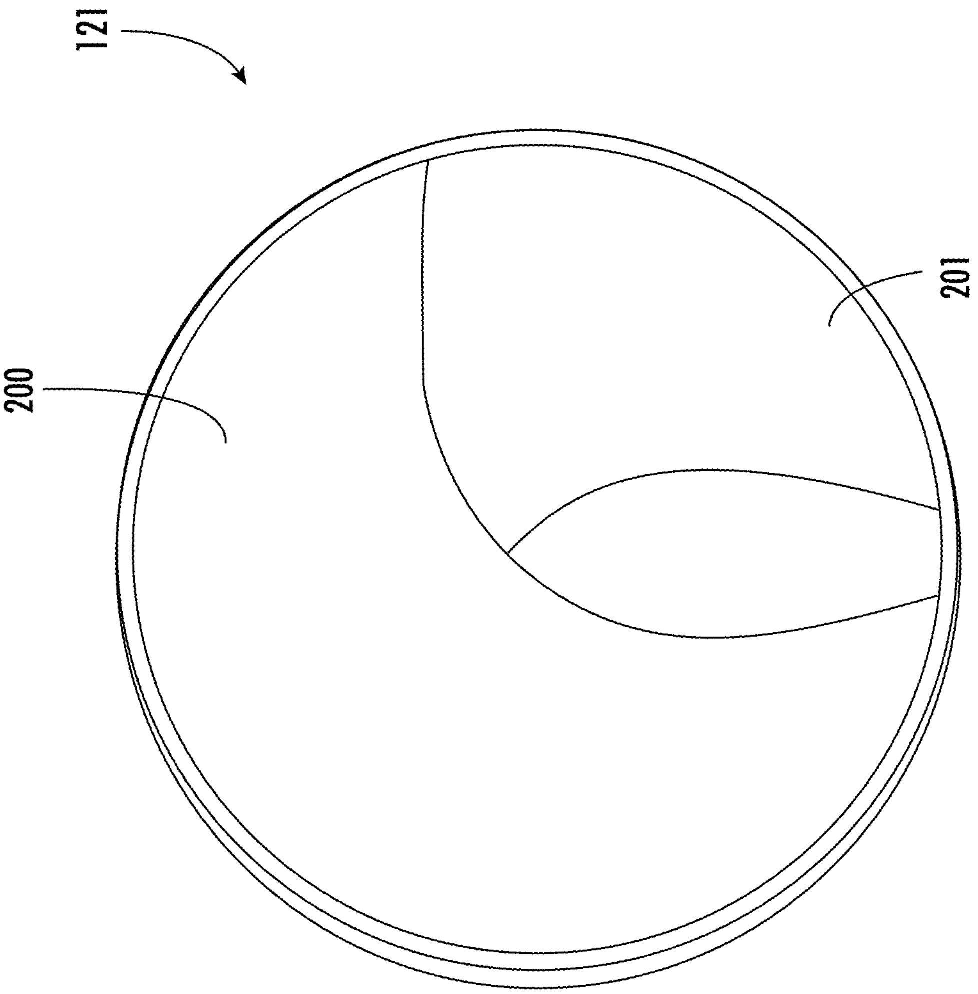
FIG. 40 is an end view of the exhaust aftertreatment system of FIG. 3, according to various embodiments.
Figure 41:
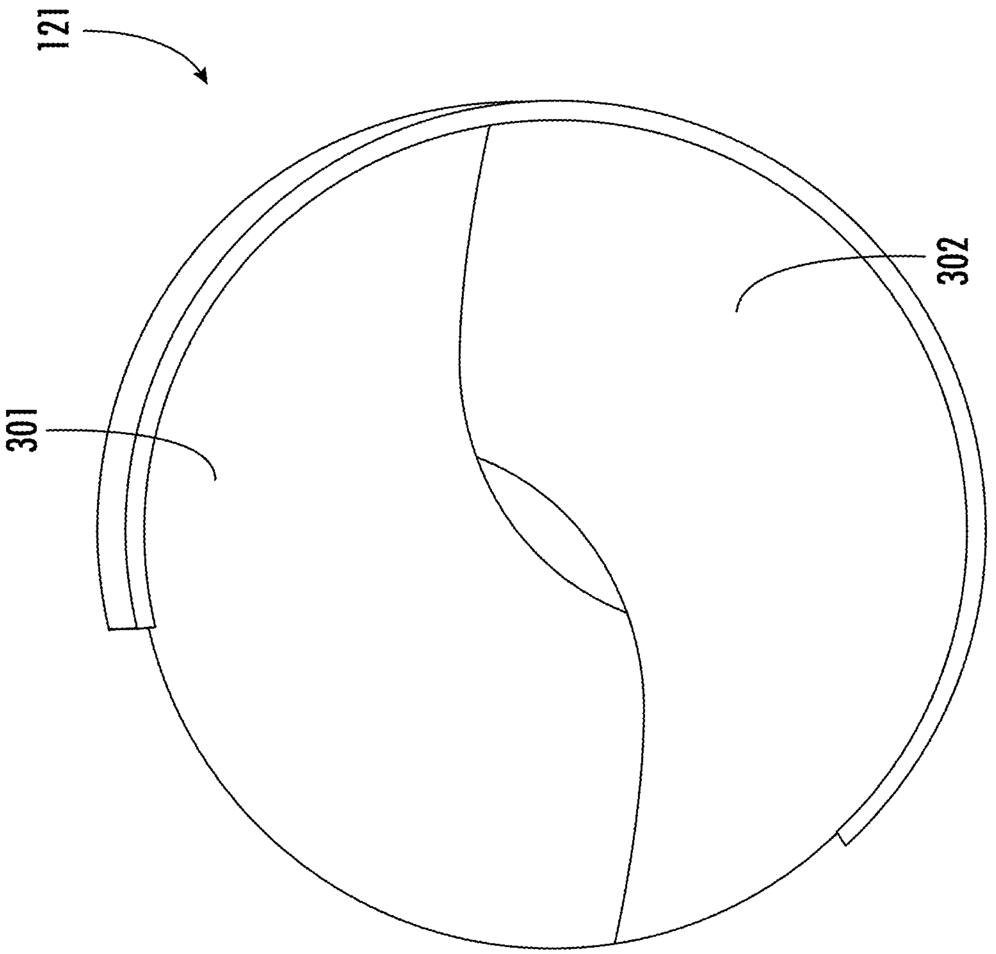
FIG. 41 is an end view of the exhaust aftertreatment system of FIG. 3, according to various embodiments.
Figure 42:
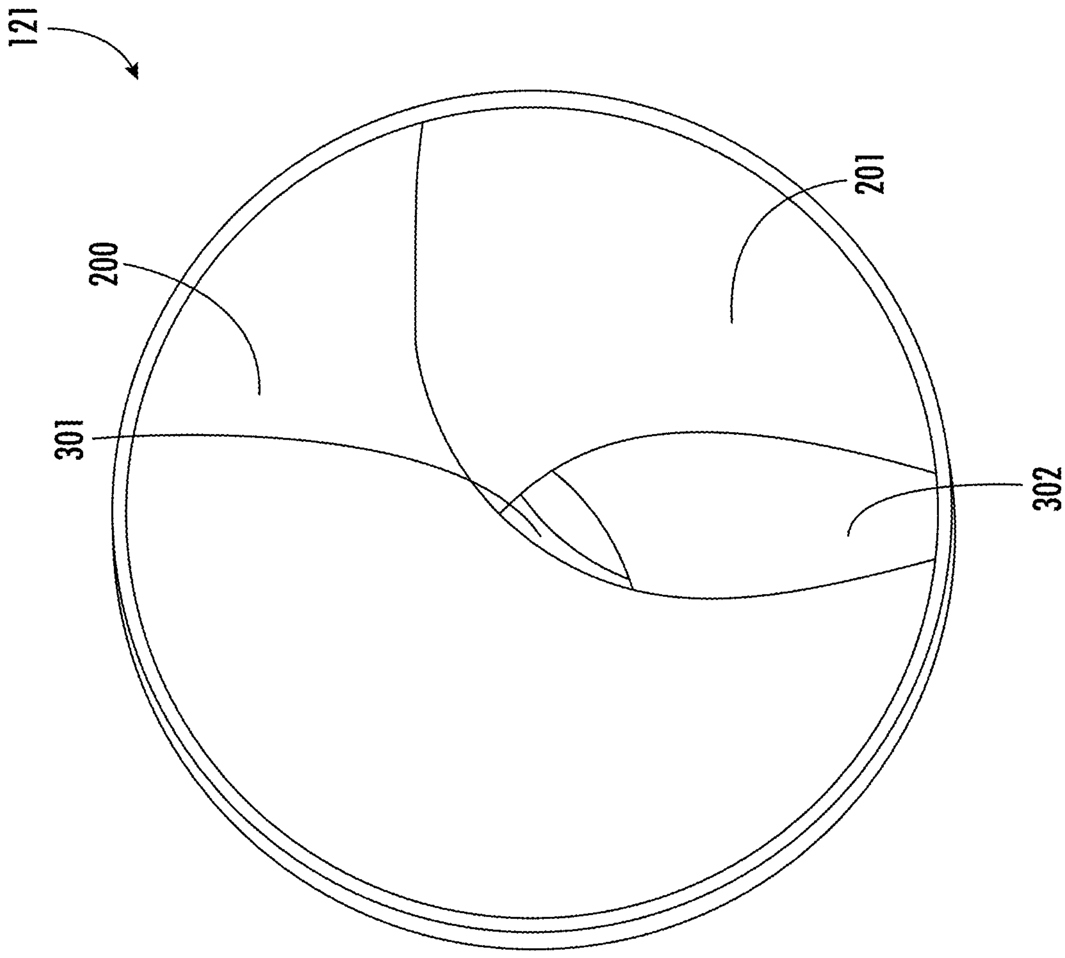
FIG. 42 is an end view of the exhaust aftertreatment system of FIG. 3, according to various embodiments.

FIGS. 40-42 illustrate one arrangement. As shown in FIG. 40, the first mixing plate 200 is angularly separated from the second mixing plate 201 by 60 degrees. As shown in FIG. 41, the third mixing plate 301 is angularly separated from the fourth mixing plate 302 by 180 degrees. A view of the mixer 121 from an upstream end of the mixer 121 looking downstream is provided in FIG. 41.

Figure 43:
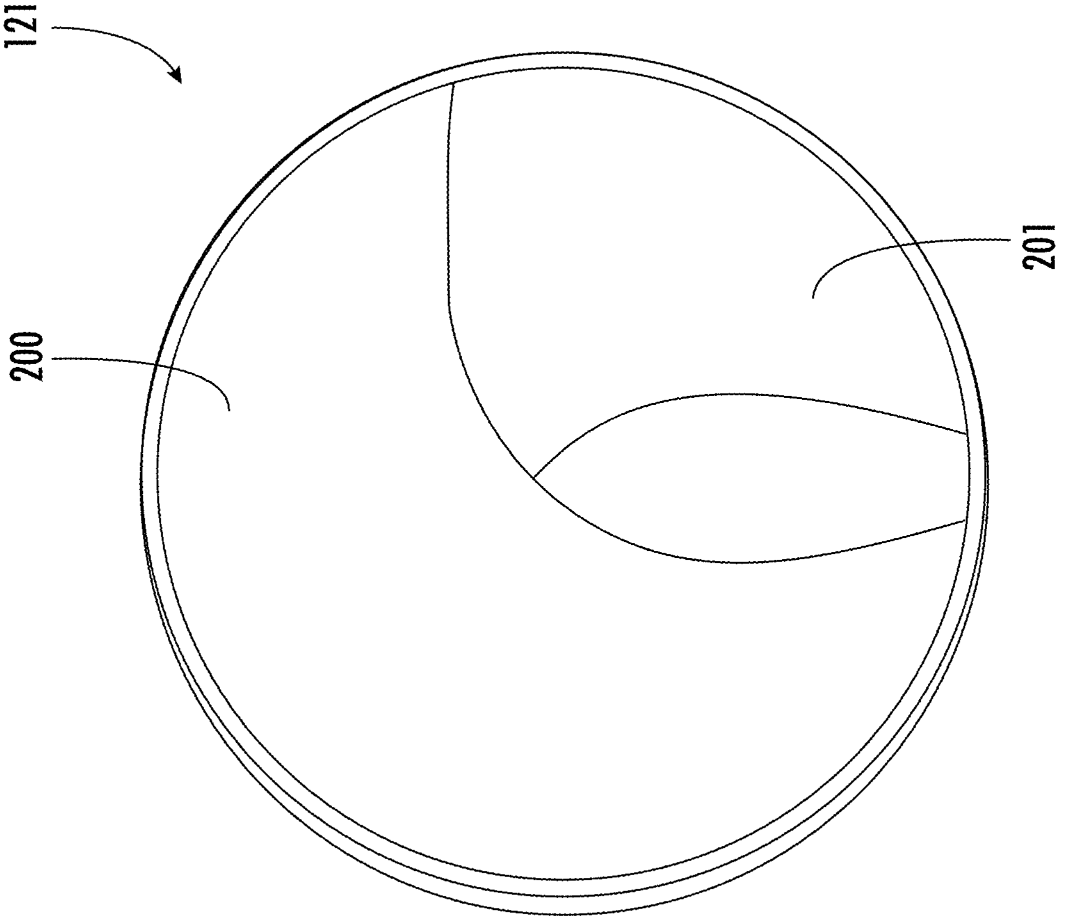
FIG. 43 is an end view of the exhaust aftertreatment system of FIG. 3, according to various embodiments.
Figure 44:
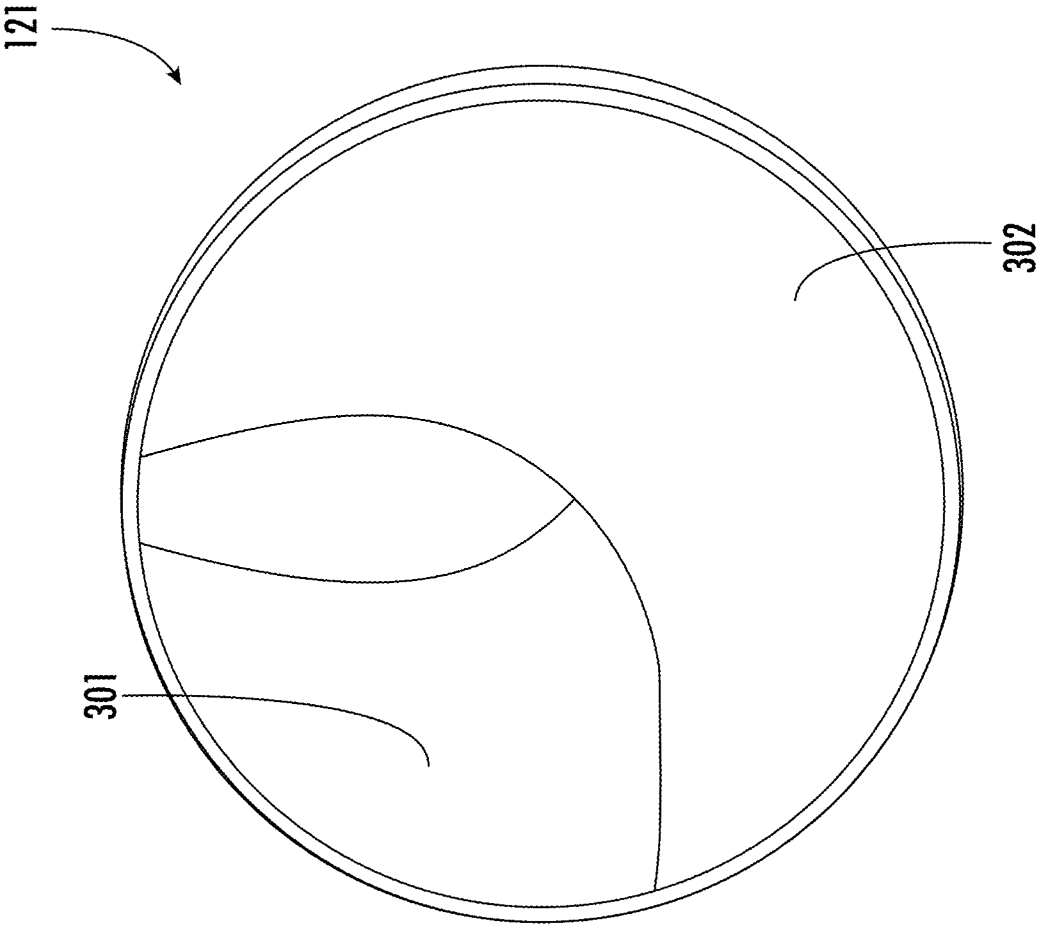
FIG. 44 is an end view of the exhaust aftertreatment system of FIG. 3, according to various embodiments.
Figure 45:
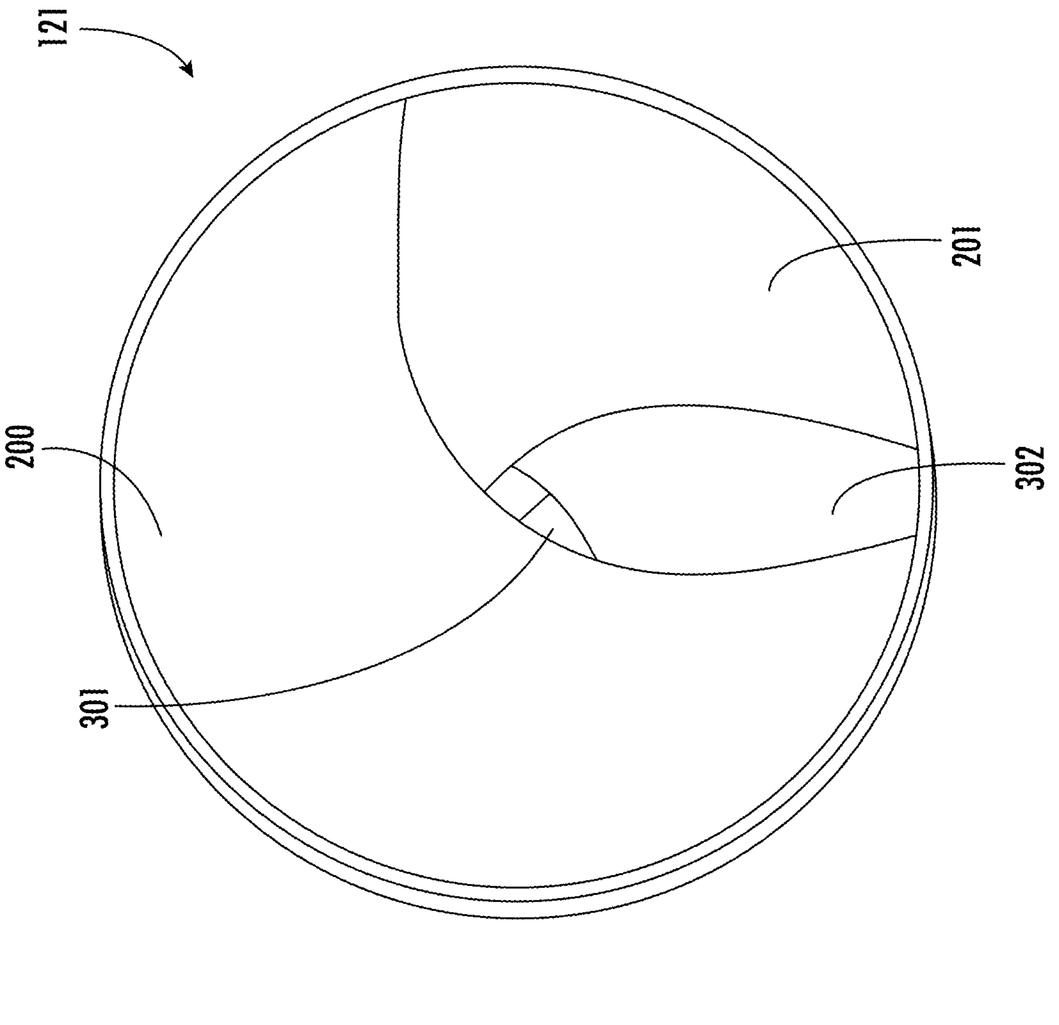
FIG. 45 is an end view of the exhaust aftertreatment system of FIG. 3, according to various embodiments.
Figure 46:
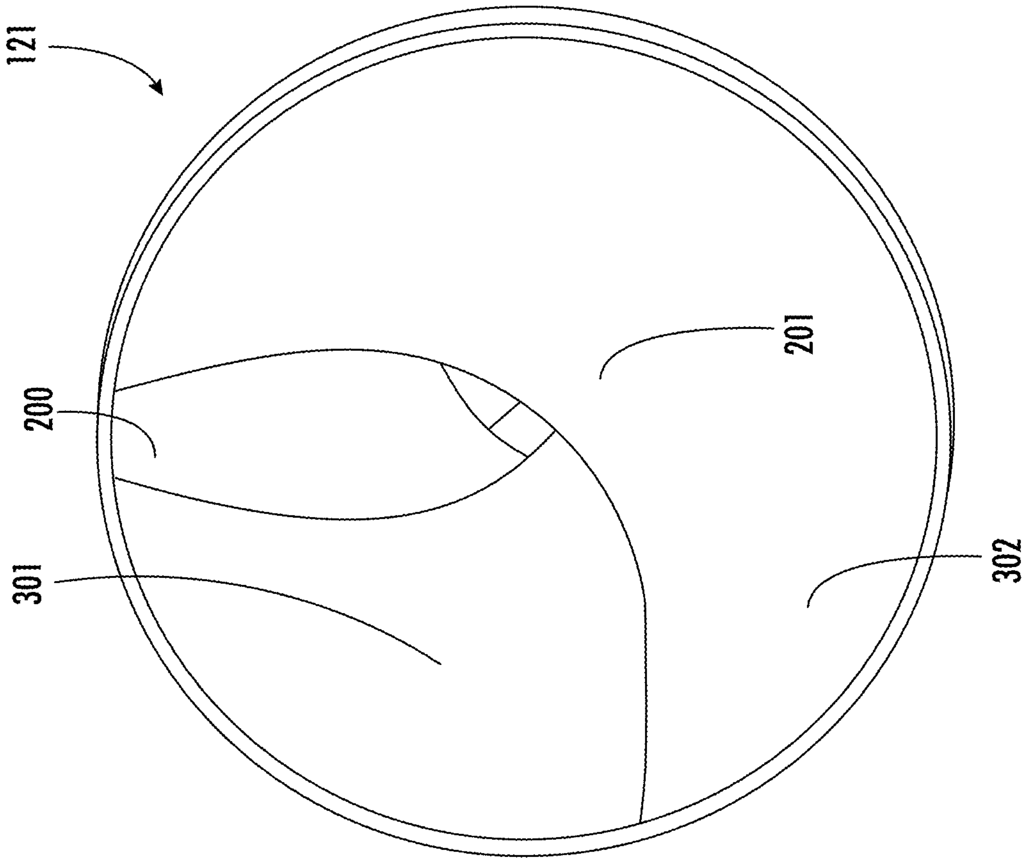
FIG. 46 is an end view of the exhaust aftertreatment system of FIG. 3, according to various embodiments.

FIGS. 43-46 illustrate another arrangement. As shown in FIG. 43, the first mixing plate 200 is angularly separated from the second mixing plate 201 by 60 degrees. As shown in FIG. 44, the third mixing plate 301 is angularly separated from the fourth mixing plate 302 by 60 degrees. However, in contrast to the arrangement of FIGS. 40-42, the second set of mixing plates (the third mixing plate 301 and the fourth mixing plate 302) is angularly separated (e.g., clocked) from the first set of mixing plates (the first mixing plate 200 and the second mixing plate 201). A view of the mixer 121 from an upstream end of the mixer 121 looking downstream is provided in FIG. 45, and a view of the mixer 121 from a downstream of the mixer 121 looking upstream is provided in FIG. 46.

Figure 47:
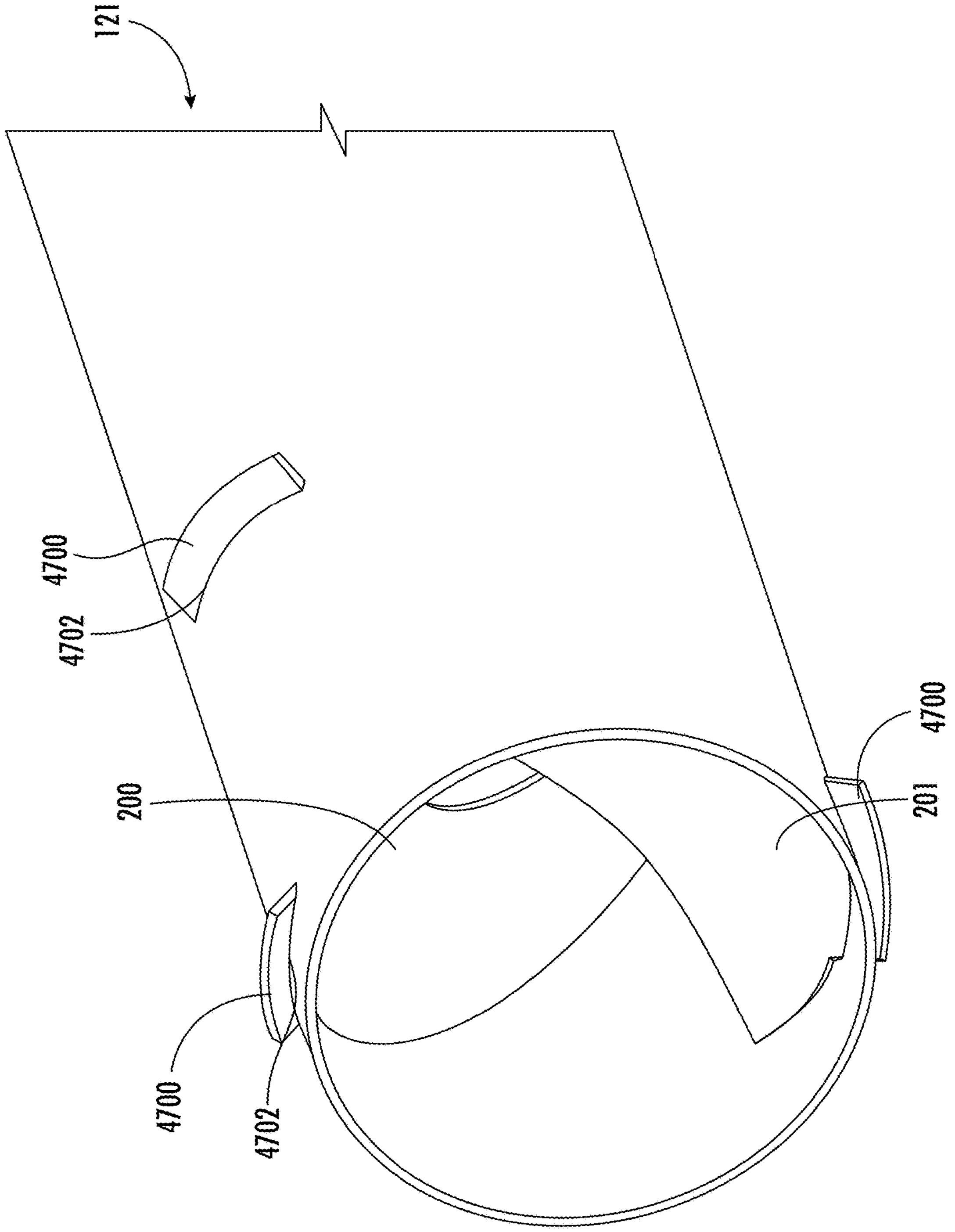
FIG. 47 is an end view of the exhaust aftertreatment system of FIG. 3, according to various embodiments.
Figure 48:
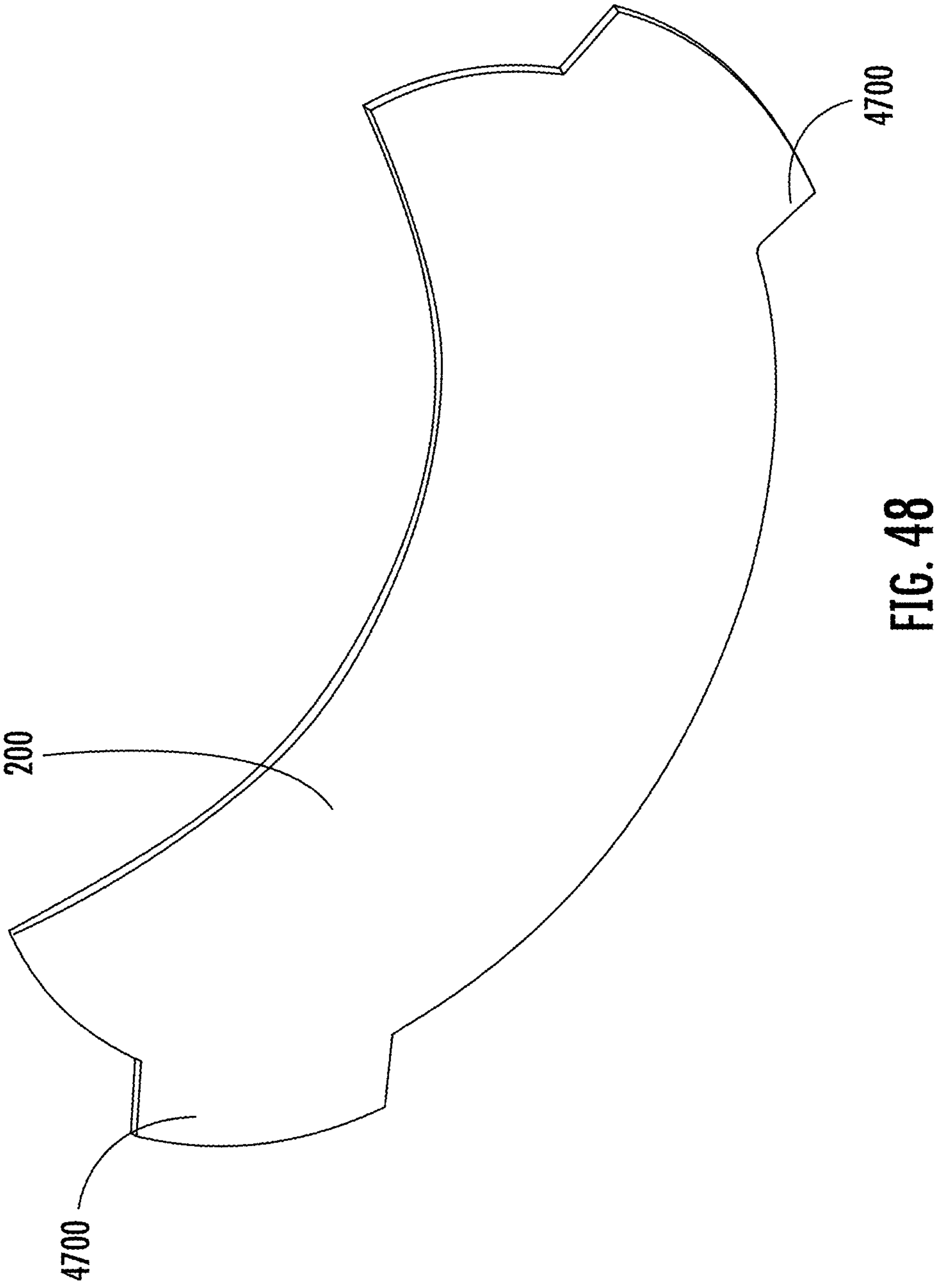
FIG. 48 is a perspective view of a first mixing plate, according to various embodiments.

In various embodiments, the first mixing plate 200 and the second mixing plate 201 are coupled to the tubular conduit 108 using tabs 4700 that extend through slots 4702 in the tubular conduit 108, as shown in FIG. 47. The tabs 4700 are positioned through the slots 4702 and are coupled (e.g., via welding, etc.) to the tubular conduit 108 (e.g., around the slots 4702, etc.). In some embodiments, the tabs 4700 and slots 4702 are asymmetrical or otherwise configured for poke-yoke installation of the first mixing plate 200 and the second mixing plate 201. The tabs 4700 are shown in FIG. 48. In some embodiments, the tabs 4700 are folded over prior to coupling to the tubular conduit 108.

Figure 49:
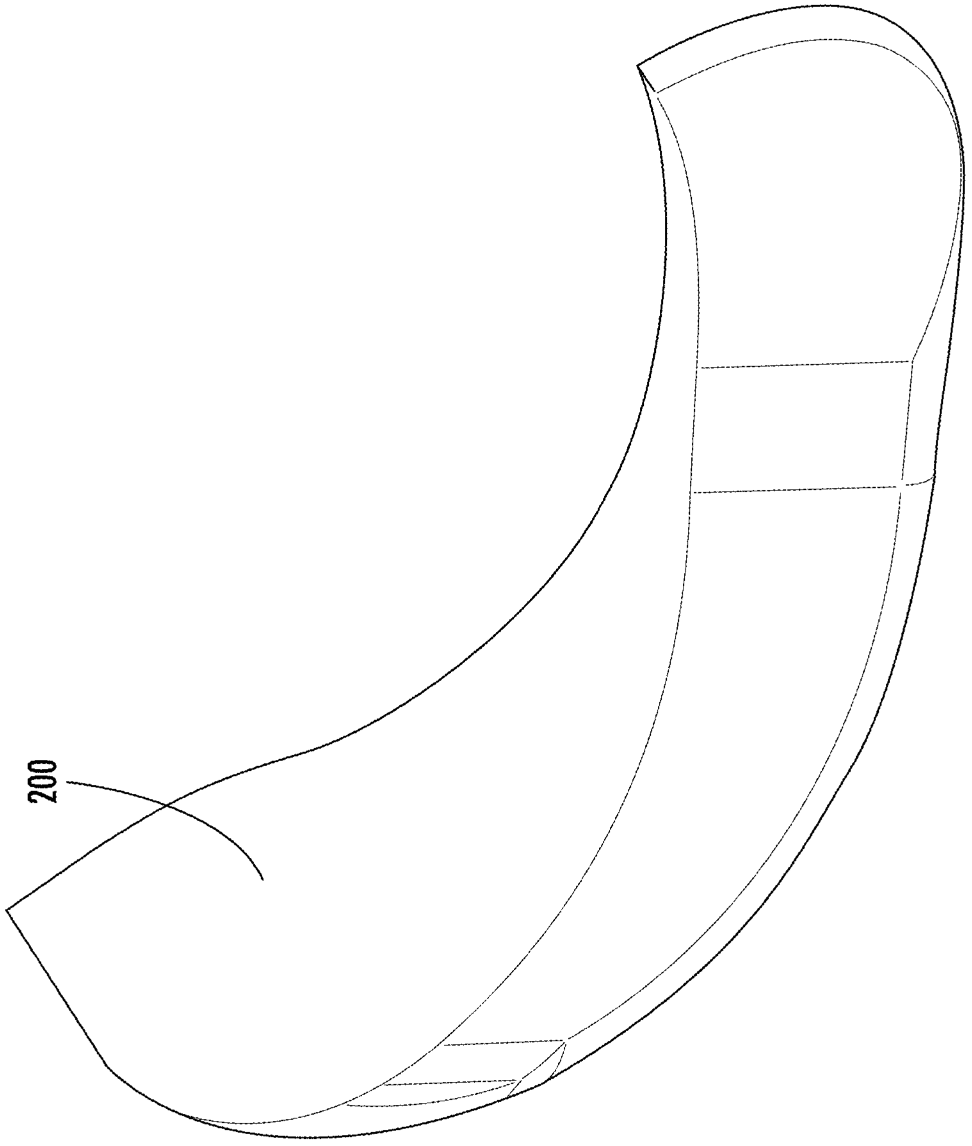
FIG. 49 is a perspective view of a first mixing plate, according to various embodiments.

FIG. 49 illustrates the first mixing plate 200 according to various embodiments. In these embodiments, the first mixing plate 200 is aerofoil shaped. As a result, the first mixing plate 200 extends from a face that is oriented towards the flow of the exhaust to a tail that is oriented away from the flow of the exhaust. The exhaust flows along extended sloped surfaces between the face and the tail. A thickness of the first mixing plate 200 may be varied between the face and the tail. For example, the first mixing plate 200 may be thicker at the tail than the face, or may be thicker at the face than the tail.

Figure 50:
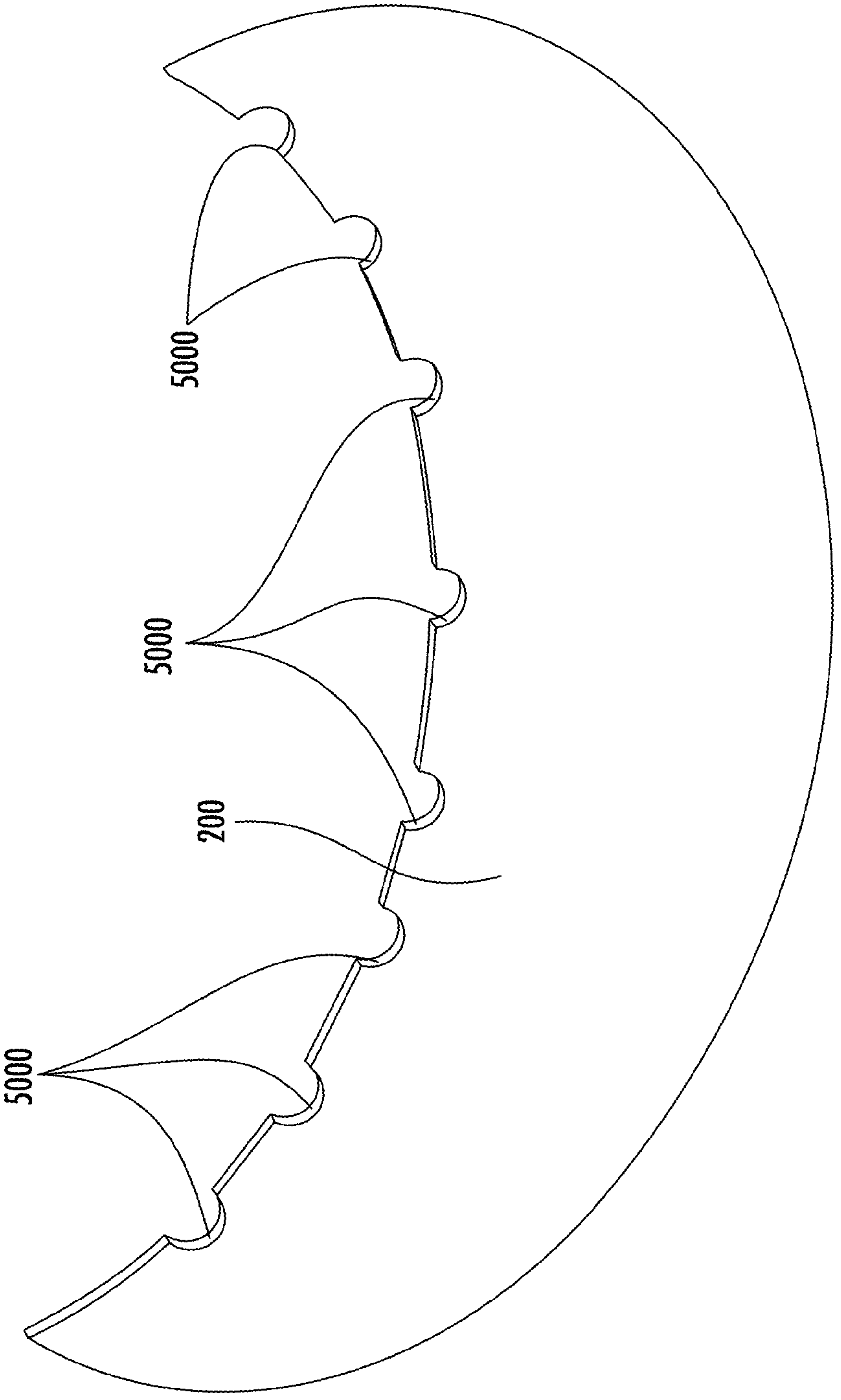
FIG. 50 is a perspective view of a first mixing plate, according to various embodiments.
Figure 51:
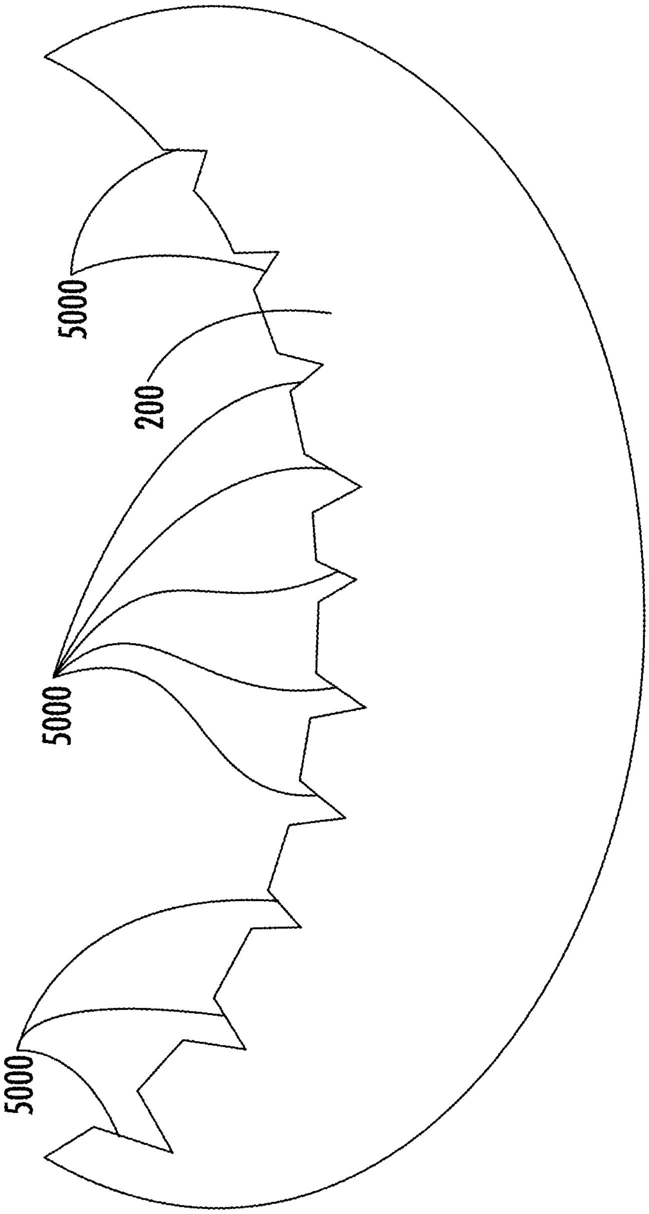
FIG. 51 is a perspective view of a first mixing plate, according to various embodiments.

In various embodiments, as shown in FIGS. 50 and 51, the first mixing plate 200 includes a plurality of notches 5000 (e.g., cutouts, etc.) in the first plate concave edge 210. These notches 5000 provides higher localized shear stress that can reduce deposit formation along the first plate concave edge 210. Additionally, the notches 5000 can be utilized to tailor the pressure drop provided by the first mixing plate 200, and/or to cause the first mixing plate 200 to provide swirl. The shape, size, arrangement, and pattern (e.g., symmetric, asymmetric) of the notches 5000 may be varied such that the first mixing plate 200 is tailored for a target application.

Figure 52:
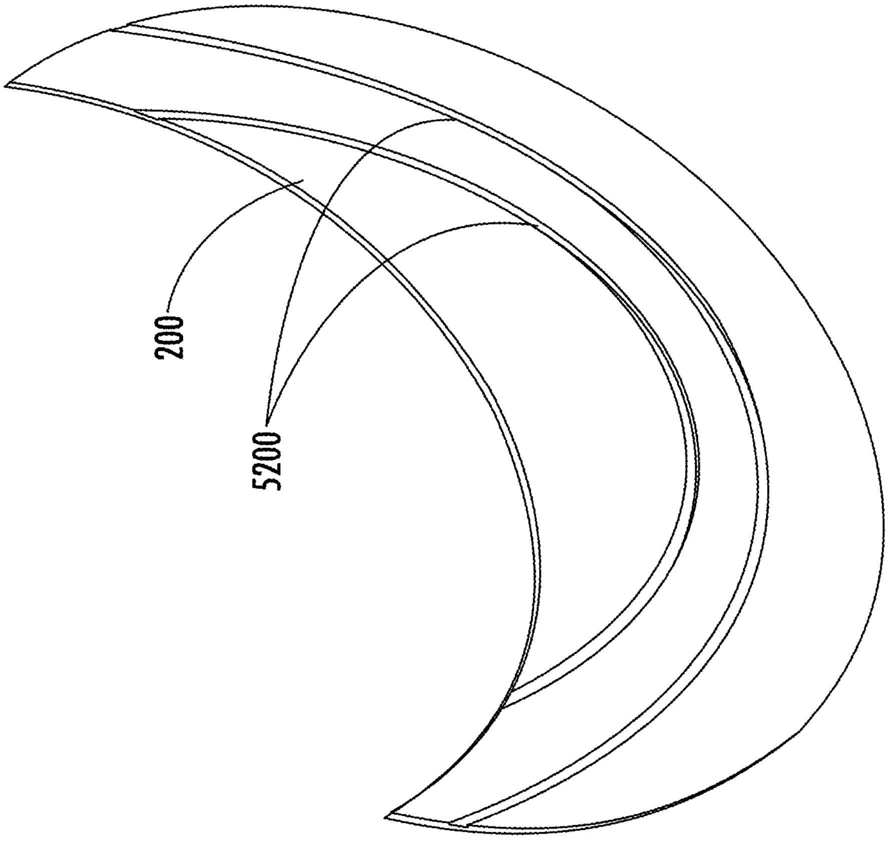
FIG. 52 is a perspective view of a first mixing plate, according to various embodiments.

As shown in FIG. 52, the first mixing plate 200 includes arcuate grooves 5200 on a face of the first mixing plate 200, according to various embodiments. In some embodiments, each of the arcuate grooves 5200 extends around the first plate concave edge 210, as shown in FIG. 52. The arcuate grooves 5200 guide the exhaust across the first mixing plate 200 to encourage swirl and reduce intensity of tumbling motion by mitigating movement of the flow away from the face of the first mixing plate 200.

Figure 53:
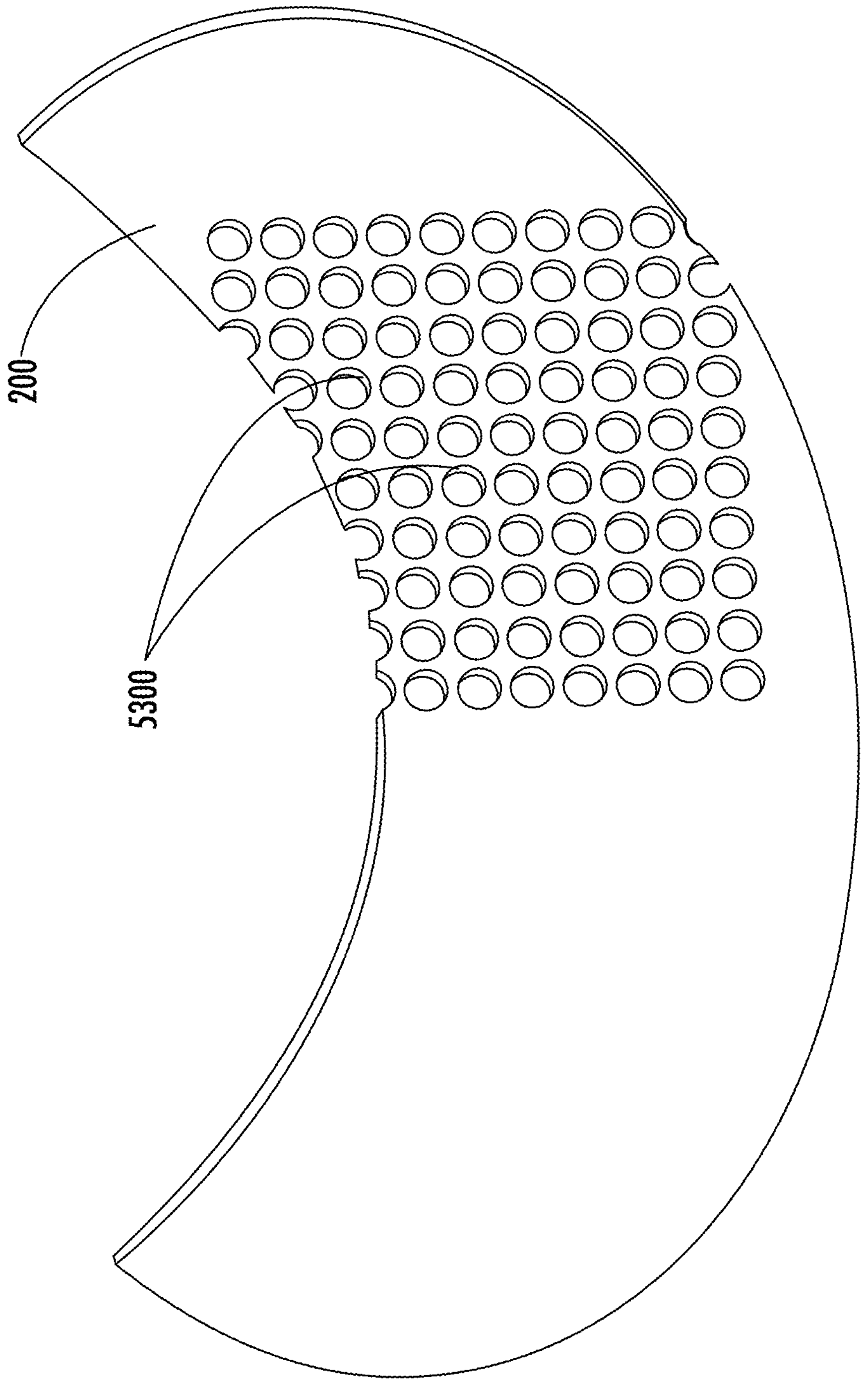
FIG. 53 is a perspective view of a first mixing plate, according to various embodiments.

In various embodiments, the first mixing plate 200 includes a perforated portion that includes a plurality of perforations 5300, as shown in FIG. 53. The perforations 5300 may be uniformly distributed within the perforated portion, as shown in FIG. 53. In some embodiments, the perforated portion is square. The perforations 5300 may also be distributed symmetrically or asymmetrically within the perforated portion. The perforations 5300 may be utilized to reduce backpressure of the first mixing plate 200, or to target regions of a flow to deliver increased or decreased amounts of the treatment fluid.

Figure 54:
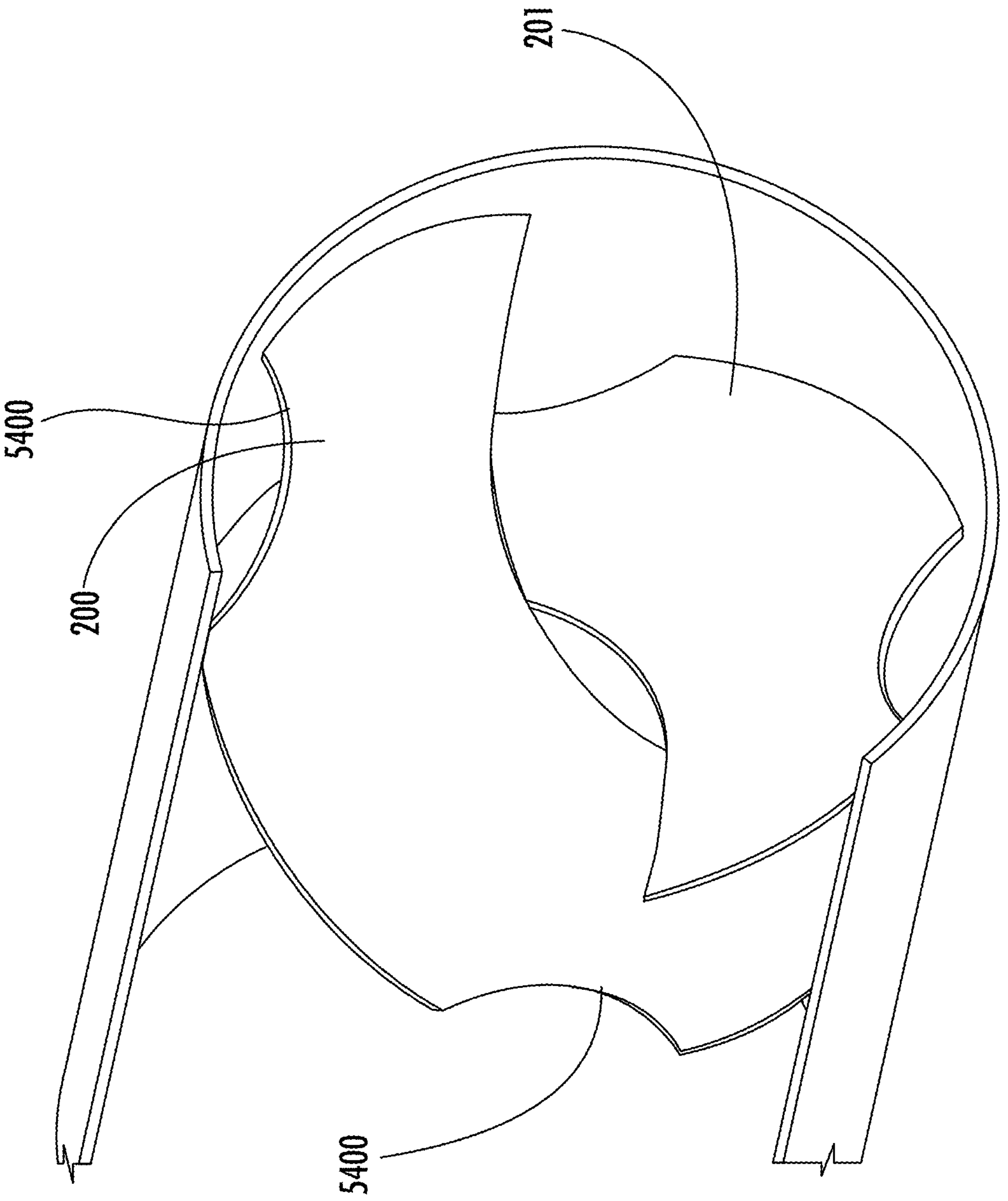
FIG. 54 is an end view of the exhaust aftertreatment system of FIG. 3, according to various embodiments.
Figure 55:
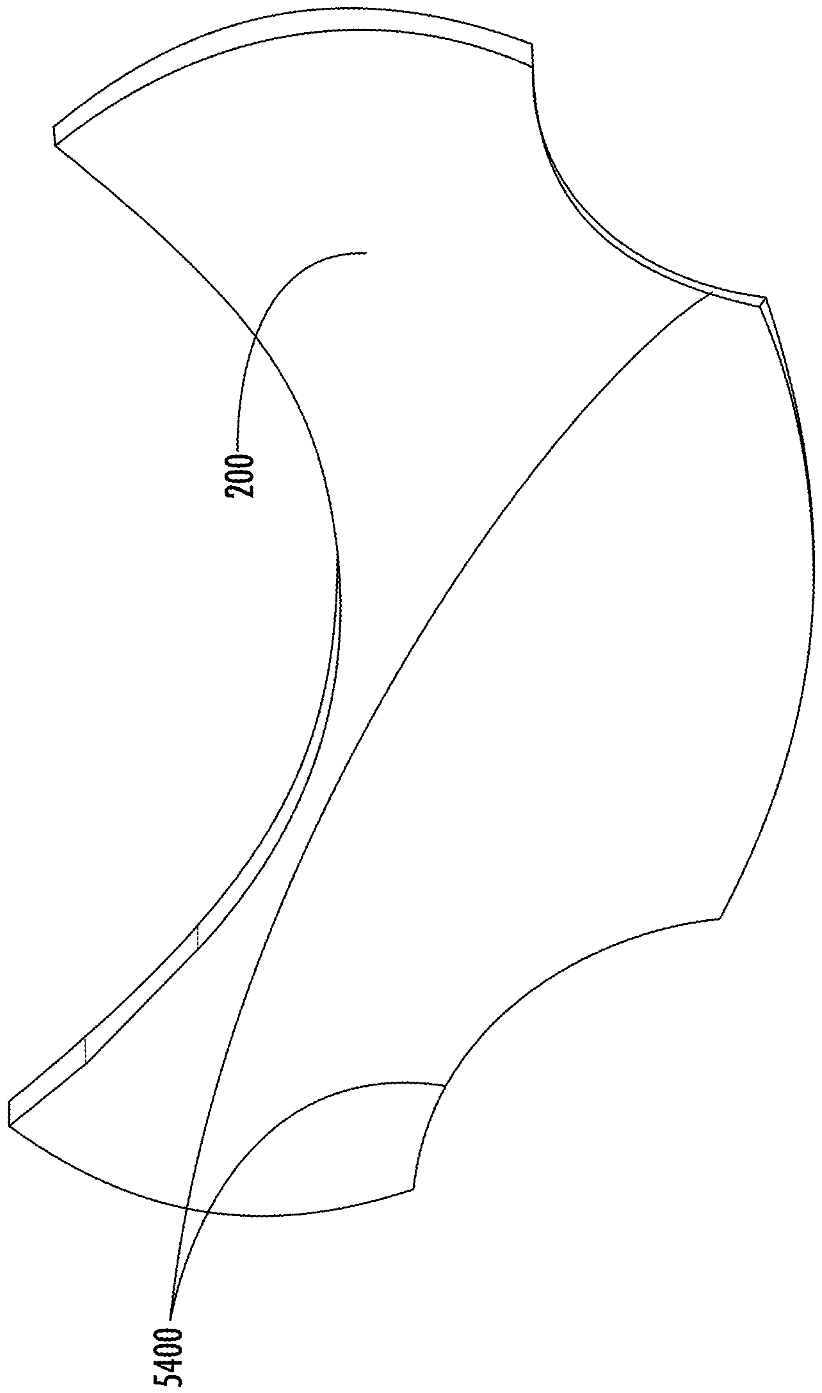
FIG. 55 is a perspective view of a first mixing plate, according to various embodiments.

As shown in FIGS. 54-55, the first mixing plate 200 and the second mixing plate 201 also include a plurality of connection cut-outs 5400. Each of the connection cut-outs 5400 is configured to facilitate flow of the exhaust between the first mixing plate 200 and the tubular conduit 108 and between the second mixing plate 201 and the tubular conduit. The connection cut-outs 5400 may be variously configured (e.g., symmetrical, asymmetrical, shape, size, etc.) such that the mixer 121 is tailored for a target application. The connection cut-outs 5400 may be utilized to reduce backpressure, or to target regions of a flow to deliver increased or decreased amounts of the treatment fluid. Additionally, the connection cut-outs 5400 provide increased wall shear along the tubular conduit 108 proximate the connection cut-outs 5400. This increased wall shear may mitigate formation of deposits.

Figure 56:
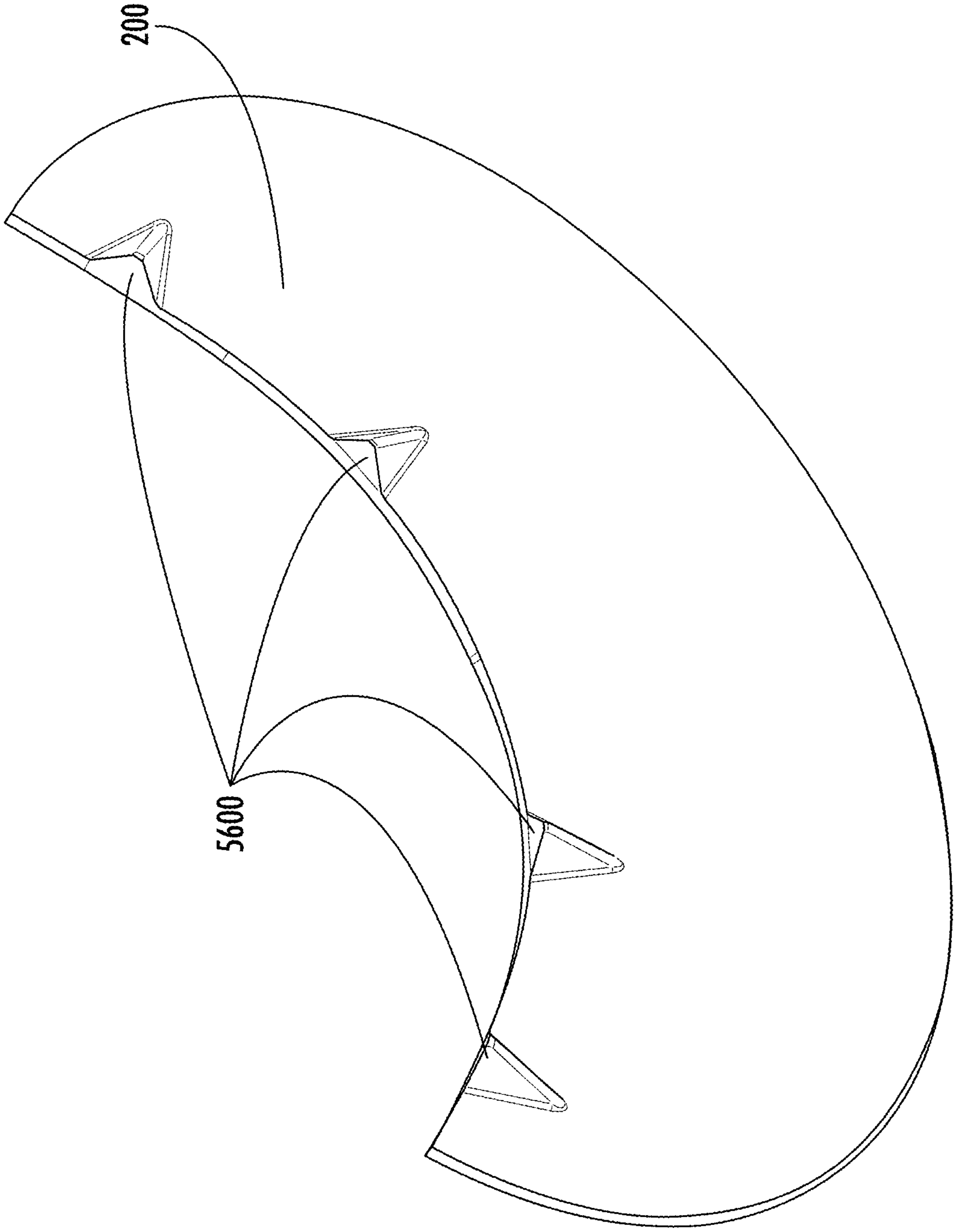
FIG. 56 is a perspective view of a first mixing plate, according to various embodiments.

In various embodiments, as shown in FIG. 56, the first mixing plate 200 includes a plurality of protrusions 5600 (e.g., ribs, etc.) along the first plate concave edge 210. Each of these protrusions 5600 provides a localized vortex generator for the exhaust.

IV. Configuration of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to" and the like, as used herein, mean the two components or objects have a pathway formed between the two components or objects in which a fluid, such as air, treatment fluid, an air-treatment fluid mixture, exhaust, hydrocarbon, an air-hydrocarbon mixture, may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (e.g., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

What is claimed is:

1. An exhaust aftertreatment assembly comprising:
a tubular conduit including a central axis; and
a mixer disposed in the tubular conduit, the mixer comprising:
a crescent shaped first mixing plate including:
a first plate convex edge attached to the tubular conduit, and
a first plate concave edge that intersects the first plate convex edge at a first plate first point and a first plate second point; and
a crescent shaped second mixing plate including:
a second plate convex edge attached to the tubular conduit, and
a second plate concave edge that intersects the second plate convex edge at a second plate first point and a second plate second point;
wherein a first plane in which the first mixing plate extends and a second plane in which the second mixing plate extends are oblique to the central axis such that the first plane intersects the second plane inside of the tubular conduit.

2. The exhaust aftertreatment assembly of claim 1, wherein:
the first mixing plate is flat; and
the second mixing plate is flat.

3. The exhaust aftertreatment assembly of claim 1, wherein the first mixing plate and the second mixing plate are positioned relative to the tubular conduit such that the central axis extends between the first plate concave edge and the second plate concave edge.

4. The exhaust aftertreatment assembly of claim 1, wherein the first plane intersects the second mixing plate between the second plate first point and the second plate second point of the second plate convex edge.

5. The exhaust aftertreatment assembly of claim 1, wherein the first plate concave edge comprises:
a plurality slots; and
a plurality of tabs respectively positioned between adjacent slots of the plurality of slots, each tab extending away from a body of the first mixing plate.

6. The exhaust aftertreatment assembly of claim 5, wherein at least one first tab of the plurality of tabs extends over a side of the body of the first mixing plate, and at least one second tab of the plurality of tabs extends parallel to the side of the body.

7. The exhaust aftertreatment assembly of claim 1, wherein the mixer further comprises:
a third mixing plate arranged downstream of the first and second mixing plates, the third mixing plate including:
a third plate convex edge attached to the tubular conduit,
wherein, in a view along the central axis, a midpoint of the third plate convex edge is offset 90 degrees about the central axis relative to a midpoint of the first plate convex edge.

8. The exhaust aftertreatment assembly of claim 1, wherein the mixer further comprises:
a third mixing plate arranged downstream of the first and the second mixing plates,
wherein, in a view along the central axis, the third mixing plate is offset 90 degrees about the central axis relative to the first mixing plate or the second mixing plate.

9. The exhaust aftertreatment assembly of claim 8, wherein the mixer further comprises:
a fourth mixing plate positioned opposite the third mixing plate.

10. The exhaust aftertreatment assembly of claim 1, wherein the first mixing plate and the second mixing plate each include a first end portion, a second end portion, and a bent portion arranged between the first end portion and the second end portion.

11. The exhaust aftertreatment assembly of claim 1, wherein the first mixing plate is bent a first angular amount about a first axis of the first mixing plate and a second angular amount about a second axis of the first mixing plate, the first angular amount being greater than the second angular amount.

12. The exhaust aftertreatment assembly of claim 1, wherein the mixer further comprises:
a third mixing plate;
a fourth mixing plate;
a fifth mixing plate positioned between the first mixing plate and the second mixing plate; and
a sixth mixing plate positioned between the third mixing plate and the fourth mixing plate.

13. The exhaust aftertreatment assembly of claim 1, wherein the mixer further comprises:
a third mixing plate attached to the tubular conduit such that the first mixing plate, the second mixing plate, and the third mixing plate are offset from each other by 120 degrees about the central axis.

14. The exhaust aftertreatment assembly of claim 1, wherein the first mixing plate intersects the second mixing plate.

15. The exhaust aftertreatment assembly of claim 1, wherein the first mixing plate and the second mixing plate are positioned at angles about the central axis such that the mixer is asymmetric when viewed from an upstream or downstream end of the tubular conduit.

16. The exhaust aftertreatment assembly of claim 1, wherein the first mixing plate includes at least one of (a) a plurality of notches formed along the first plate concave edge (b) a plurality of arcuate grooves formed on a first face of the first mixing plate so as to extend around the first plate concave edge (c) a plurality of cut-outs formed along the first plate convex edge, or (d) a plurality of protrusions formed along the first plate concave edge.

* * * * *